United States Patent
Kikkoji et al.

(10) Patent No.: US 7,373,122 B2
(45) Date of Patent: May 13, 2008

(54) REPRODUCTION DEVICE INFORMATION SETTING METHOD, AND INFORMATION SETTING PROGRAM

(75) Inventors: Hiroyuki Kikkoji, Tokyo (JP); Nozomu Okuzawa, Tokyo (JP); Natsumi Saito, Kanagawa (JP); Shinsuke Yamashita, Kanagawa (JP); Jun Moriya, Tokyo (JP); Yasuhiro Murase, Tokyo (JP)

(73) Assignee: Sony Corporation, Tokyo (JP)

( * ) Notice: Subject to any disclaimer, the term of this patent is extended or adjusted under 35 U.S.C. 154(b) by 42 days.

(21) Appl. No.: 10/564,062

(22) PCT Filed: May 18, 2004

(86) PCT No.: PCT/JP2004/007023

§ 371 (c)(1),
(2), (4) Date: Jan. 10, 2006

(87) PCT Pub. No.: WO2005/006577

PCT Pub. Date: Jan. 20, 2005

(65) Prior Publication Data
US 2006/0259931 A1 Nov. 16, 2006

(30) Foreign Application Priority Data

| Jul. 14, 2003 | (JP) | ............................ 2003-274302 |
| Aug. 11, 2003 | (JP) | ............................ 2003-291741 |
| Sep. 4, 2003 | (JP) | ............................ 2003-313167 |
| Sep. 29, 2003 | (JP) | ............................ 2003-338520 |

(51) Int. Cl.
*H04B 1/18* (2006.01)
*H04H 1/00* (2006.01)

(52) U.S. Cl. .................. 455/186.1; 455/3.04; 725/63

(58) Field of Classification Search .............. 455/3.01, 455/3.02, 3.03, 3.04, 3.05, 3.06, 186.1, 7, 455/12.1, 150.1, 151.1, 154.1, 79.1, 188.1; 725/63; 700/94
See application file for complete search history.

(56) References Cited

U.S. PATENT DOCUMENTS 5,063,610 A * 11/1991 Alwadish ..................... 455/45
5,898,910 A * 4/1999 Miyake et al. ........... 455/186.1

(Continued)

FOREIGN PATENT DOCUMENTS

JP 6-260897 9/1994

(Continued)

*Primary Examiner*—Quochien B. Vuong
(74) *Attorney, Agent, or Firm*—Oblon, Spivak, McClelland, Maier & Neustadt, P.C.

(57) ABSTRACT

A setting information transmission means 1c transmits setting information (area information) concerning broadcast reception of a reproducing apparatus 1 itself and set by a user, to an external device. List information corresponding to the setting information and including broadcast station names, broadcast station identification information, and frequencies of broadcast stations which can be received by the reproducing apparatus 1 is returned to and received by a list information reception means 1d from the external device. The broadcast station names included in the received list information are displayed on the display means 1e. The user checks the displayed broadcast station names and makes an input operation. In response to this input operation, a recording means 1f records parts of the received list information (e.g., frequencies, broadcast station names, and broadcast station identification information) onto a recording medium, with the parts linked to each other.

14 Claims, 24 Drawing Sheets

U.S. PATENT DOCUMENTS

| | | | |
|---|---|---|---|
| 6,038,434 A * | 3/2000 | Miyake | 455/186.1 |
| 6,282,412 B1 * | 8/2001 | Lyons | 455/186.1 |
| RE38,600 E * | 9/2004 | Mankovitz | 348/473 |
| 7,050,870 B2 * | 5/2006 | Sueyoshi et al. | 700/94 |
| 7,200,611 B2 * | 4/2007 | Potrebic et al. | 707/104.1 |
| 2003/0027520 A1 * | 2/2003 | Yamashita | 455/3.04 |
| 2003/0078000 A1 * | 4/2003 | Tatsumi et al. | 455/3.06 |
| 2005/0060701 A1 | 3/2005 | Murase | |
| 2005/0091679 A1 | 4/2005 | Tanaka et al. | |
| 2005/0203992 A1 * | 9/2005 | Tanaka et al. | 709/203 |

FOREIGN PATENT DOCUMENTS

| | | |
|---|---|---|
| JP | 10-257402 | 9/1998 |
| JP | 2001-243190 | 9/2001 |
| JP | 2002-344407 | 11/2002 |
| JP | 2003-23577 | 1/2003 |
| JP | 2003-37788 | 2/2003 |
| JP | 2003-124827 | 4/2003 |
| JP | 2003-153218 | 5/2003 |

* cited by examiner

| AREA | RECEIVABLE BROADCAST STATIONS | | |
|---|---|---|---|
| | FREQUENCY (MHz) | BROADCAST STATION NAME | CALL SIGN |
| AREA A | 80.0 | FM○○ | JO** |
| AREA A | 81.3 | FM△△ | JO** |
| AREA A | 84.7 | ××FM | JO** |
| ⋮ | ⋮ | ⋮ | ⋮ |
| AREA B | 76.7 | □□□□FM | JO** |
| AREA B | 84.3 | FM○○ | JO** |
| ⋮ | ⋮ | ⋮ | ⋮ |

FIG. 8

REPRODUCTION DEVICE INFORMATION SETTING METHOD, AND INFORMATION SETTING PROGRAM

TECHNICAL FIELD

The present invention relates to a reproducing apparatus capable of receiving and reproducing broadcast signals selected by calling a previously set reception frequency, and an information setting method and, an information setting program for setting the reception frequency.

BACKGROUND ART

In recent years, broadcast stations of FM broadcast or the like often provide information concerning programs sent from their stations and songs broadcasted in the programs via the Internet. Hence, recent audio devices having a function to receive radio waves have been being provided with an Internet connection function, considering a service of allowing information related to broadcasted songs and the like to be obtained via the Internet by the audio devices. According to the service, when a user finds a favorite song among broadcasted songs while receiving an FM broadcast, the user can access the server which provides information, and can receive and display information related to the song on a display of the audio device. It is also possible to store the received related information.

Meanwhile, audio devices can receive a radio broadcast by tuning the reception frequency to a specific value. To facilitate this operation, recent audio devices have plural preset receivable frequencies, so that the audio device can be tuned by merely specifying a number through a button operation. Further, several audio devices have a function to set automatically receivable frequencies as described above.

To utilize such an information providing service as described above, it is necessary to specify a server or web page which provides information for broadcast stations corresponding to the preset receivable frequencies. Further, receivable areas of broadcast signals are respectively specific to radio stations, and hence, plural radio stations existing respectively in different areas may use one equal broadcast frequency, in several cases. Therefore, radio broadcast stations cannot be identified merely depending on broadcast frequencies. Identification numbers called "call signs" assigned to broadcast stations are used.

In the information providing service described previously, for example, a service management server for managing the information providing service described above is provided together with another server which provides other related information such as programs and broadcasted songs of each broadcast station. The service management server includes a table which links broadcast frequencies, areas, and call signs to each other, and another table which links the call signs to URLs (Uniform Resource Locators) of information providing sites corresponding to the broadcast stations of the call signs.

To preset a broadcast frequency in an audio device, the broadcast frequency and information specifying the receiving area thereof (such as a postal code or the like) are transmitted to the service management server. According to this information and the like received, the service management server specifies the call sign of the broadcast station whose signal is being received by the audio device, and notifies the call sign to the audio device. In this manner, the broadcast frequency and the call sign can be stored linked to each other in the audio device.

Further, to attain information related to a program or the like, the user specifies a broadcast station by a preset number via the audio device, and then, a corresponding call sign is transmitted to the service management server. The service management server transmits the URL of the information providing site corresponding to the call sign, to the audio device. As a result of this, the audio device can have access to the URL and can be provided with information related to programs, broadcasted songs, and the like.

Note that there has been a conventional receiver capable of tuning accurately receivable broadcast channels. Of information concerning tuning and previously stored in a memory, the receiver stores into a preset memory such information that concerns tuning of broadcast channels receivable within an area chosen by a user, linked to tuning operation keys of a key operation unit which the user can operate. At this time, information items respectively concerning tunings of plural broadcast channels identified as broadcasting the same program are stored close to each other along a tuning-variable direction of the tuning operation keys (for example, see Patent Document 1).

Patent Document 1: Japanese Patent Application Laid-Open Publication No. 11-308135 (paragraph numbers [0041] to [0078], FIG. 1)

As described above, when presetting a broadcast frequency or a call sign, there can actually be a case that the call sign cannot be specified properly, in the method of specifying the call sign from information specifying an area such as a postal code and the reception frequency thereof. For example, if radio broadcast is received by a cable television set, a different frequency from the original broadcast frequency may be assigned by the cable television station. In some cases, cable television broadcasts a radio broadcast which originally cannot be received in an area because it is specific to another distant area. In these cases, the service management server as described above cannot specify the call sign corresponding to the reception frequency of such broadcast.

DISCLOSURE OF THE INVENTION

The present invention has been made in view of the above situation and has an object of providing a reproducing apparatus which receives and reproduces broadcast signals and is capable of setting, in advance, a frequency and a call sign linked correctly to each other, in correspondence with a reception area and a reception method.

The present invention has another object of providing an information setting method capable of setting, in advance, a frequency and a call sign linked correctly to each other, in correspondence with a reception area and a reception method, in a reproducing apparatus which receives and reproduces broadcast signals.

The present invention has further another object of providing an information setting program capable of setting, in advance, a frequency and a call sign linked correctly to each other, in correspondence with a reception area and a reception method, when setting a frequency of a broadcast signal to be received.

To achieve the above objects, according to an aspect of the present invention, there is provided a reproducing apparatus capable of receiving and reproducing a broadcast signal selected by calling a reception frequency set in advance, characterized by comprising: a broadcast signal reception means which receives a broadcast signal of a specific frequency; a broadcast signal reproducing means which reproduces the broadcast signal received by the broadcast signal reception means; a setting information transmission means which transmits setting information concerning broadcast reception of the reproducing apparatus itself and set by a user, to an external device; a list information reception means which receives list information detected by the external device, as a list including broadcast station names of receivable broadcast stations corresponding to the setting information, broadcast station identification information of the stations, and frequencies of the stations; a display means which displays the names of the broadcast stations included in the list information received by the list information reception means; and a recording means which records parts of the received list information onto a recording medium, based on a user's input, with the parts linked to each other.

In this apparatus, the broadcast signal reception means receives a broadcast signal of a specific frequency, and the received broadcast signal is reproduced by the broadcast signal reproducing means. Also, the setting information transmission means transmits setting information set by a user and concerning broadcast reception of the apparatus itself, to an external device. For example, the external apparatus which has received this setting information detects the broadcast station names of the broadcast stations receivable by the reproducing apparatus, broadcast station identification information thereof, and frequencies thereof, and returns the information and frequencies as list information. The list information reception means receives the list information from this external device. Based on a user's input, the display means displays the broadcast station names included in the received list information, and the recording means records parts of the received list information onto a recording medium, with the parts linked to each other. Therefore, the user checks the names of the receivable broadcast stations on the display means, and carries out an input operation for making the recording means perform recording. Thus, the frequencies, broadcast station names, and broadcast station identification information of receivable broadcast signals can be recorded, correctly linked to each other. Further, these linked information items can be called back later to carry out tuning, and for example, information which identifies a selected broadcast station can be transmitted to the outside.

According to another aspect of the present invention, there is provided an information setting method of setting a reception frequency in advance in a reproducing apparatus which receives and reproduces a broadcast signal, characterized by comprising: a setting information transmission step of transmitting setting information concerning broadcast reception of the reproducing apparatus itself and set by a user, to an external device; a list information reception step of receiving list information detected by the external device, as a list including broadcast station names of receivable broadcast stations corresponding to the setting information, broadcast station identification information of the stations, and frequencies of the stations; a display step of displaying the names of the broadcast stations included in the received list information; and a recording step of recording parts of the received list information onto a recording medium, based on a user's input, with the parts linked to each other.

In this method, setting information set by a user and concerning broadcast reception of the apparatus itself is transmitted to an external device, in the setting information transmission step. For example, the external apparatus which has received this setting information detects the broadcast station names of the broadcast stations corresponding to the setting information and receivable by the reproducing apparatus, broadcast station identification information thereof, and frequencies thereof, and returns the information and frequencies as list information. In the list information reception step, the list information is received from this external device. In the display step, the broadcast station names included in the received list information are displayed. In the recording step, parts of the received list information are recorded onto a recording medium, based on a user's input, with the parts linked to each other. Therefore, the user checks the names of the receivable broadcast stations displayed by the display step, and carries out an input operation for recording onto the recording medium in the recording step. Thus, the frequencies, broadcast station names, and broadcast identification information of receivable broadcast signals can be recorded, correctly linked to each other. Further, these linked information items can be called back later to carry out tuning, and for example, information which identifies a selected broadcast station can be transmitted to the outside.

According to further another aspect of the present invention, there is provided a communication method in which: a reproducing apparatus which receives and reproduces a broadcast signal transmits setting information set by a user and concerning broadcast reception of the reproducing apparatus itself, together with user ID and a password, to a portal server; the portal server which issues an authentication ticket to allow the reproducing apparatus to access plural service servers performs an authentication processing, based on the user ID and the password, and transmits list information as a list including broadcast station names of receivable broadcast stations corresponding to the setting information, broadcast station identification information of the stations, and frequencies of the stations, when allowing authentication; and the reproducing apparatus displays the broadcast station names included in the received list information, and records parts of the received list information, onto a recording medium, with the parts linked to each other.

According to the reproducing apparatus of the present invention, the user checks the names of the receivable broadcast stations on the display means, and carries out an input operation for making the recording means perform recording. Thus, the frequencies, broadcast station names, and broadcast identification information of receivable broadcast signals can be recorded in advance, correctly linked to each other. Further, these linked information items can be called back later to carry out tuning, and for example, information which identifies a selected broadcast station can be transmitted to the outside, to specify correctly an information providing server corresponding to the selected broadcast station.

According to the information setting method of the present invention, the user checks the names of the receivable broadcast stations displayed by the display step, and carries out an input operation for recording onto the recording medium. Thus, the frequencies, broadcast station names, and broadcast station identification information of receivable broadcast signals can be recorded in advance, correctly linked to each other. Further, these linked information items can be called back later to carry out tuning, and for example, information which identifies a selected broadcast station can be transmitted to the outside, to specify correctly an information providing server corresponding to the selected broadcast station.

BRIEF DESCRIPTION OF THE DRAWINGS

FIG. 8 is a table showing an example of a database included in the total service server;

BEST MODE FOR CARRYING OUT THE INVENTION

An embodiment of the present invention will now be described in details with reference to the drawings.

Figure 1:
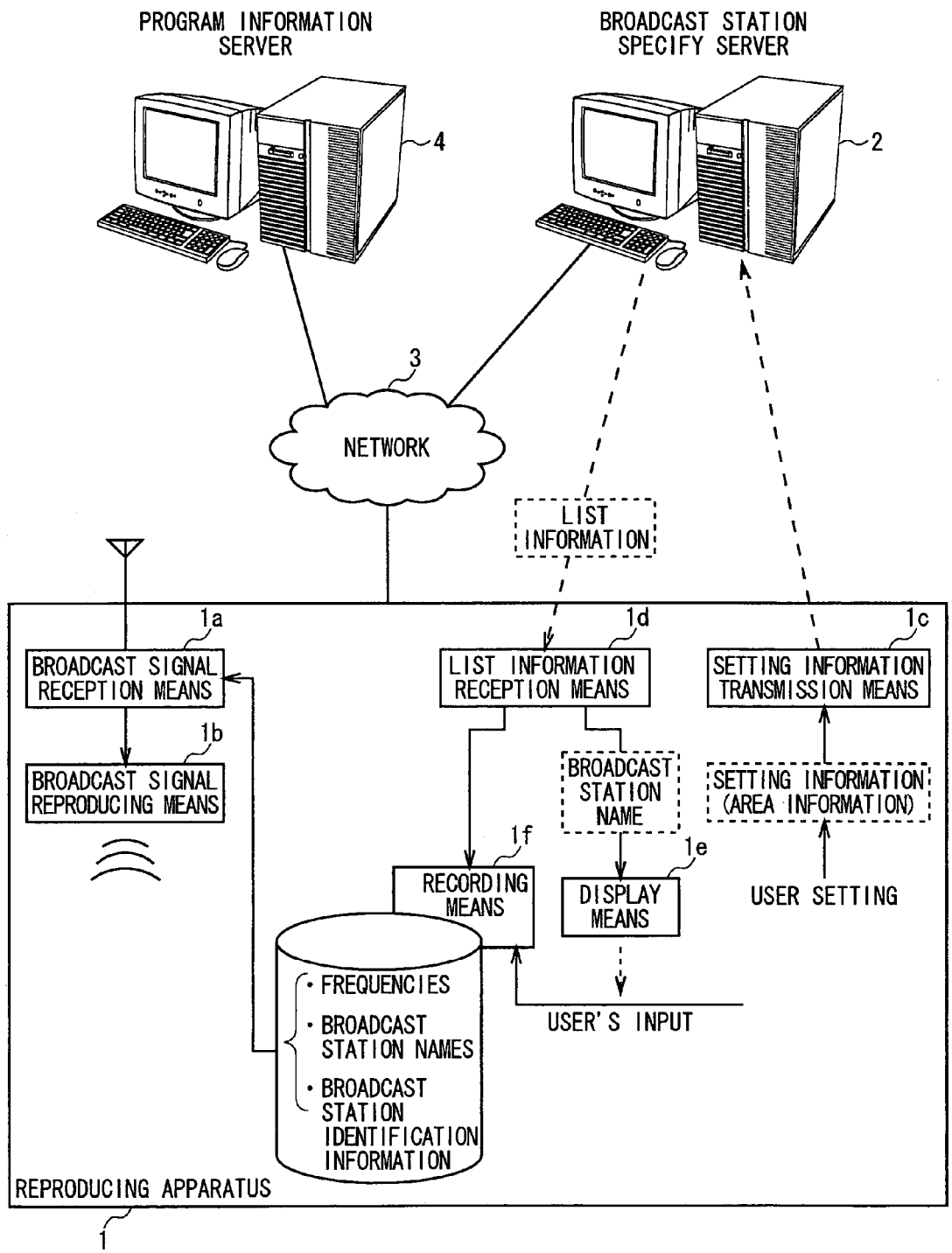
FIG. 1 is a diagram depicting operation principles of a network system to which the present invention is applied.

FIG. 1 is a view explaining the operation principles of a network system to which the present invention is applied. With reference to FIG. 1, the outline of the present invention will be described.

The network system shown in FIG. 1 has a structure in which a reproducing apparatus 1 to which the present invention is applied and a broadcast station specify server 2 which executes a processing for specifying a broadcast station are connected to each other via a network 3. The network 3 may further be connected to a program information server 4 which provides information related to programs and songs broadcasted by broadcast stations.

The reproducing apparatus 1 has a broadcast reception function to receive, reproduce, and output broadcast, and a setting function to transmit information and the like concerning the area where the reproducing apparatus 1 is installed, to the broadcast station specify server 2, to receive list information for specifying broadcast stations which are receivable, and to preset frequencies thereof. The broadcast reception function is realized by a broadcast signal reception means 1a which receives broadcast signals of a specific frequency from electric waves or a cable, and a broadcast signal reproducing means 1b which reproduces the received broadcast signal. Also, the setting function is realized by a setting information transmission means 1c, a list information reception means 1d, a display means 1e, and a recording means 1f.

The setting information transmission means 1c transmits setting information concerning reception of broadcast by the reproducing apparatus 1 itself, to an external device (e.g., the broadcast station specify server 2 in this case). The setting information is set by a user and includes, for example, area information or the like which indicates the area where the reproducing apparatus 1 is installed. This setting information may be inputted by a user immediately before the information is transmitted to the broadcast station specify server 2. Alternatively, information previously set by the user may be transmitted. For example, when making on-line registration to receive information providing services from the program information server 4, the registration information may once be recorded in the reproducing apparatus 1. The setting information transmission means 1c may read out and transmit part of the information as setting information.

The list information reception means 1d receives list information corresponding to the setting information detected by the broadcast station specify server 2. This list information is a list consisting of names of broadcast stations receivable by the reproducing apparatus 1, broadcast station identification information, and frequencies.

The display means 1e displays the broadcast station names in the list information received by the list information reception means 1d. In this manner, the user confirms receivable broadcast stations. The recording means 1f links parts of received list information to each other, based on an input made by the user, and records those parts into a recording medium. Thus, the user can preset names of receivable broadcast stations, broadcast station identification information thereof, and frequencies thereof linked to each other. Further, the user can select a station by calling preset information and setting a frequency in the broadcast signal reception means 1a.

Next, the operation of the network system described above will be described.

The setting information transmission means 1c operates when performing a processing of presetting the reception frequency in the broadcast signal reception means 1a. For example, a user varies the reception frequency of the broadcast signal reception means 1a, and presets orderly frequencies received. Alternatively, this kind of preset operation may be automatically performed by the reproducing apparatus 1. After presetting of a frequency is finished, the setting information transmission means 1c transmits setting information to the broadcast station specify server 2.

Upon receipt of setting information from the reproducing apparatus 1, the broadcast station specify server 2 searches a database not shown, to specify broadcast stations which are receivable by the reproducing apparatus 1 as a sender. Specifically, for example, broadcast stations which are receivable in the area where the reproducing apparatus 1 is installed are specified. Then, a list consisting of the names of those broadcast stations, broadcast station identification information thereof, and frequencies thereof is created and transmitted to the reproducing apparatus 1.

The reproducing apparatus 1 receives list information from the broadcast station specify server 2 by the list information reception means 1d. Then, the broadcast station names in the received list information are displayed by the display means 1e. The user watches and checks the broadcast station names in the list information by the display means 1e. Whether or not the names are correct as targets to be assigned to the frequencies which have already been preset is determined. Then, the user can preset parts of the list information such as frequencies, broadcast station names, and broadcast station identification information, linked to each other, into a recording medium by the recording means 1f.

Alternatively, after the list information is received by the list information reception means 1d, the broadcast station names and broadcast station identification information corresponding to those frequencies that are listed in the list information among the preset frequencies are automatically preset by the recording means 1f. If any frequencies then remain, the broadcast station names in the list information are displayed by the display means 1e, and may be recorded by the recording means 1f by a user's manual input, parts of the list information linked to the remaining frequencies.

According to the operation of the recording means 1f, the recording medium records, for example, frequencies actually receivable by the broadcast signal reception means 1a, the broadcast station names thereof, and broadcast station identification information thereof, linked to each other. When any broadcast is received later, the recorded information is called back and the frequency thereof is set in the broadcast signal reception means 1a. Tuning can thus be achieved.

Also, the reproducing apparatus 1 can obtain information related to programs received from broadcast stations and broadcasted songs, from the program information server 4. In order to take this service, it is necessary to know address information (URL or the like) of the program information server 4 or the information providing sites corresponding to broadcast stations. Further, to know such address information, target broadcast stations need to be specified correctly. The broadcast station identification information can be utilized to specify the stations.

For example, when a user would like to obtain information related to a song received by the broadcast signal reception means 1a and broadcasted from a broadcast station, the broadcast station identification information corresponding to the broadcast station is transmitted to the broadcast station specify server 2. Then, a URL corresponding to the broadcast station is received from the broadcast station specify server 2. Related information can be obtained by accessing the received URL.

According to the reproducing apparatus 1 as described above, the user can check the name of the broadcast station displayed on the display means 1e with respect to a preset frequency and can further preset information in the list information corresponding to the frequency, linked to the frequency, while thus checking the name. Therefore, particularly even in a case where frequencies received by the broadcast signal reception means 1a include such a frequency that is different from those that are originally receivable via electric waves, linking among frequencies, broadcast station names, and broadcast station identification information can be correctly carried out. This case can occur in a situation that radio broadcast is received via cable television and assignations of frequencies of radio broadcast differ from those of electric waves. Even in this case, the preset processing can be performed correctly with easy operations, and address information of servers and sites which provide information related to actually received programs from broadcast stations can be obtained correctly.

There can be such a frequency, among preset frequencies, that is not included in the received information, and the broadcast station name and broadcast station identification information thereof cannot be preset. In this case, transmission of list information including information concerning other broadcast stations which are not covered by the setting information already transmitted can be requested from the reproducing apparatus 1 to the broadcast station specify server 2. This situation can occur in a case where cable television makes it possible to receive radio broadcast from a distant broadcast station which is normally not receivable in a area via electric waves. Requested in this case is list information concerning broadcast stations which are not covered by local information as setting information, i.e., which are not receivable in the area.

Upon reception of the list information transmitted in response to this request from the broadcast station specify server 2, the list information reception means 1d displays broadcast station names included in the list information on the display means 1e, like the processing described previously. In this manner, names of broadcast stations which are not receivable in this area can be displayed on the display means 1e. Then, the user can select a broadcast station name among the displayed names, and can preset this broadcast station name and corresponding broadcast station identification information, linked correctly to an actually received frequency, by the recording means 1f.

Next, the embodiment of the present invention will now be described in more details, referring to an example of the above network system. In the following description, a processing of storing (stocking) related information concerning a song or a set of songs into a secondary storage will be called a "clip". Information thus stored by a clip will be called clipped information.

Figure 2:
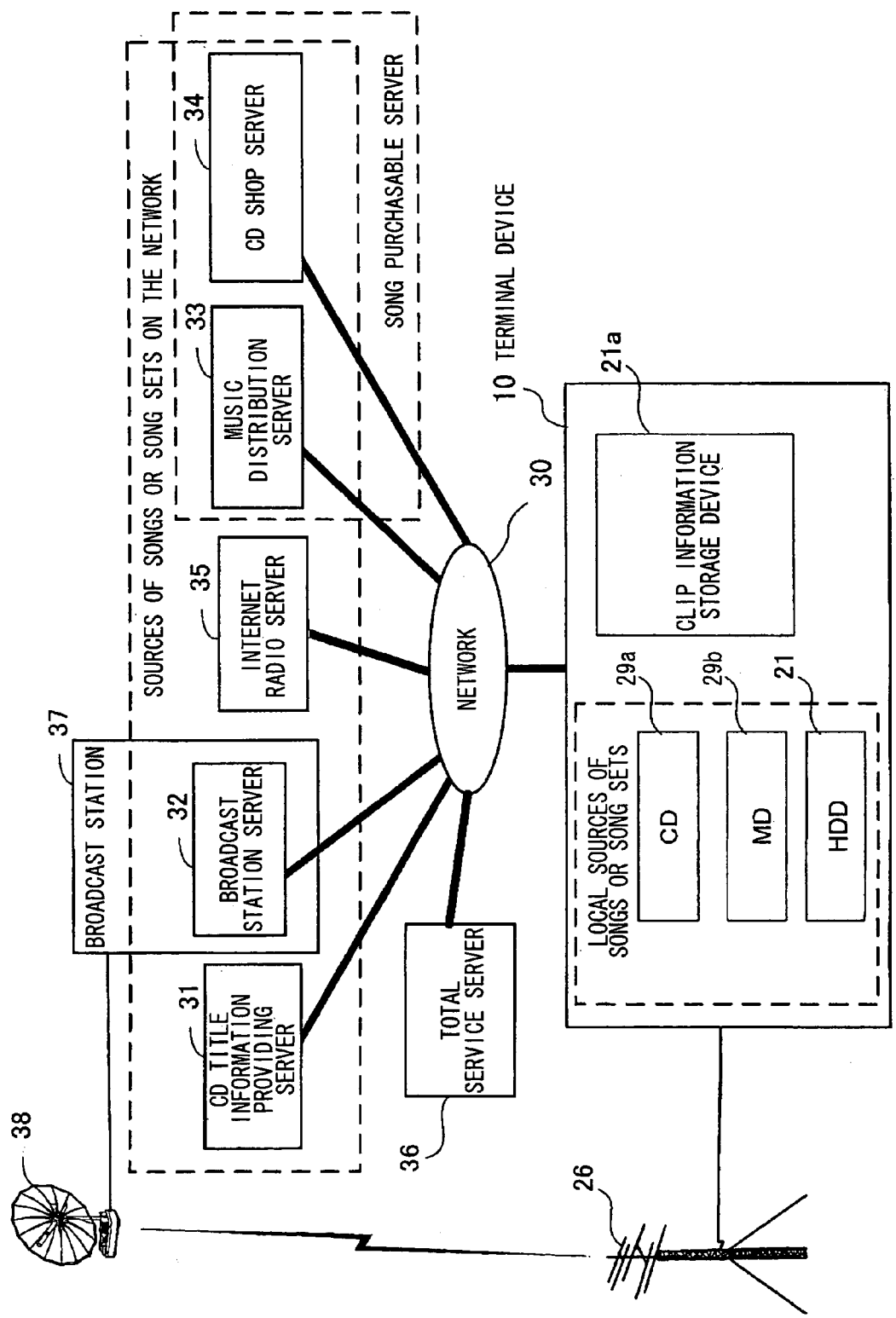
FIG. 2 is a diagram showing an example of the structure of a network system according to an embodiment of the present invention.

FIG. 2 shows an example of the configuration of a network system according to an embodiment of the present invention.

A terminal device 10 is connected to various servers via a network 30. The network 30 may be the Internet, for example. Servers may be a CD title information providing server 31, a broadcast station server 32, a music distribution server 33, a CD shop server 34, an Internet radio server 35, a total service server 36, etc.

The CD title information providing server 31 serves to provide titles of songs of music CDs (Compact Discs) commercially available and album titles thereof.

The broadcast station server 32 is a server managed by a broadcast station 37 of FM broadcast or television (TV) broadcast. The broadcast station 37 provides wireless broadcast via an antenna 38. The broadcast station server 32 provides a service of providing information related to broadcasted songs.

The function of providing related information, which is achieved by the broadcast station server 32, is roughly divided into two functions as follows. The first function is to provide information related to the song being currently broadcasted (now on air). The second function is to provide a list (on-air list) of songs which have already been broadcasted or will be broadcasted, in response to a request from the terminal device 10 (where the on-air list includes information related to the songs). For example, the broadcast station server 32 provides related information of a song broadcasted in a specified program or related information of a song broadcasted within a specified time band.

The music distribution server 33 is a server which serves to distribute digital audio data (song data) of songs. For example, the music distribution server 33 provides song data for a terminal device 10 of a user who completes a procedure of purchasing a song. Also, the music distribution server 33 can provide information related to songs to be distributed and demo audio data thereof.

The CD shop server 34 serves to receive orders of music CDs for correspondence sales. The CD shop server 34 also provides services of distributing demo audio data and providing information related to songs included in CDs on sale.

The internet radio server 35 is a server which provides audio programs via a wide-area network like the Internet or the like.

The total service server 36 functions as a contact (portal site) which provides services via the network 30, and works as an intermediator in providing various total services using the servers described above. For example, this server distributes information (e.g., URL) indicative of a provider source of information related to a song being broadcasted, to the terminal device 10. Also, the server distributes call signs of broadcast stations corresponding to frequencies in their receivable areas, to the terminal device 10. Further, the server performs processings for a registration procedure to be taken by users to utilize various total services described above and for an authentication procedure to be taken to utilize the services.

Thus, plural servers carries out services of providing information related to songs or sets of songs, on the network 30. That is, each server functions as a source of songs and sets of songs on the network 3-0.

The music distribution server 33 and the CD shop server 34 are song-purchasable servers. Therefore, if a user operates the terminal device 10 and accesses a song-purchasable server, the user can actually purchase a song or a set of songs via the network 30. The user of the terminal device 10 can take a purchase procedure at the music distribution server 33, and then can download song data from the music distribution server 33. Also, the user of the terminal device 10 can take a purchase procedure at the CD shop server 34, and then can ask the server to deliver a music CD to the user's own home.

The terminal device 10 locally stores a source of songs or sets of songs in a recording medium such as a CD 29*a*, MD (Mini Disc) 29*b*, hard disk drive (HDD) 21, or the like. The CD 29*a* and MD 29*b* are portable recording media, and can be easily attached to and detached from the terminal device 10. The kinds of local sources prepared for the terminal device 10 differ depending on the type and purposes of the terminal device 10. Also, the terminal device 10 can receive broadcasted contents via an antenna 26.

The local sources of songs or sets of songs, shown in FIG. 2, are merely examples. That is, any recording medium can be let function as a local source of a song or a set of songs by recording a song or a set of songs on the medium as far as the recording medium exists locally for the terminal device 10.

Also, the terminal device 10 has a clip information storage 21*a* for storing clipped related information (clip information). The clip information storage 21*a* is a secondary storage of the terminal device 10. For example, a part of a storage region of the HDD 21 or the like can be let function as the clip information storage 21*a*. Note that the terminal device 10 can clip both of songs and sets of songs. As a result, the whole of a FM program or CD album which contains a lot of interesting songs can be clipped, so that related information of a set of interesting songs can be recorded by one clip operation.

Figure 3:
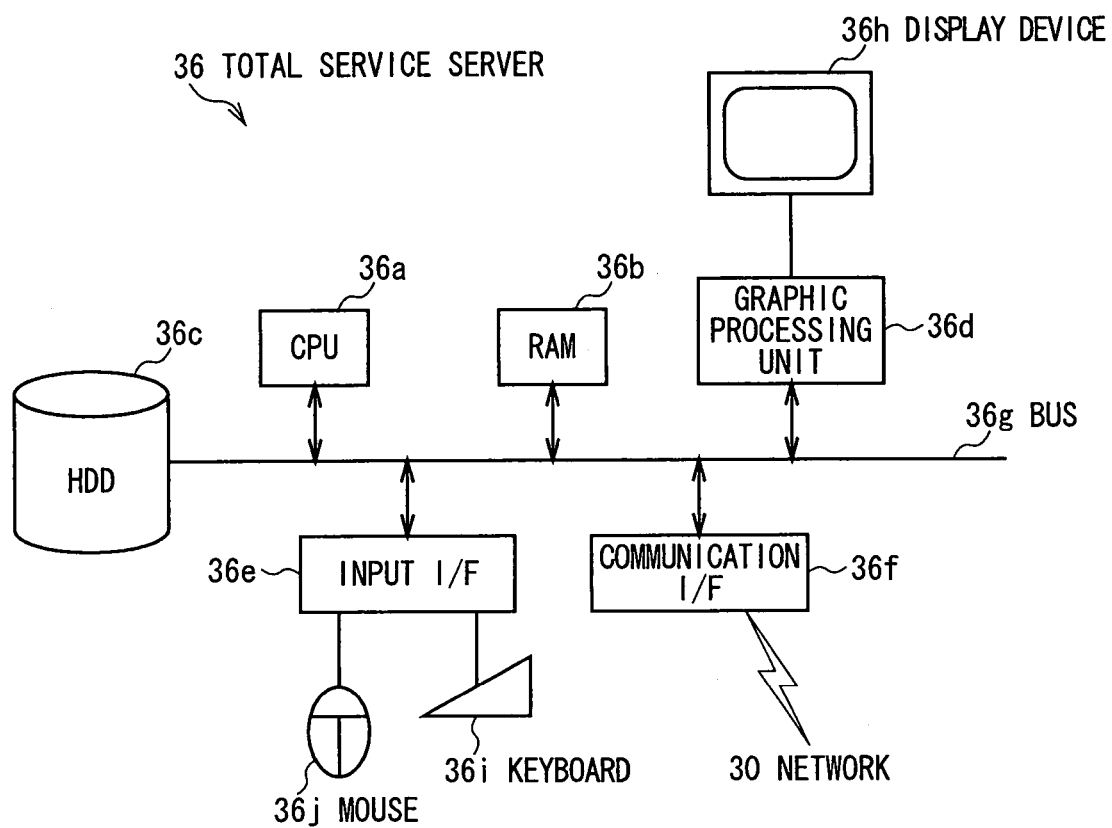
FIG. 3 is a diagram showing an example of the hardware configuration of a total service server according to the embodiment of the present invention.

FIG. 3 is a diagram showing an example of the hardware configuration of the total service server 36.

The whole total service server 36 is controlled by a CPU (Central Processing Unit) 36*a*. The CPU 36*a* is connected through a bus 36*g* to a RAM (Random Access Memory) 36*b*, a hard disk drive (HDD) 36*c*, a graphic processing unit 36*d*, an input interface (I/F) 36*e*, and a communication interface 36*f*.

The RAM 36*b* temporarily stores at least part of programs of the OS (Operating System) and application programs which are executed by the CPU 36*a*. Also, the RAM 36*b* stores various data necessary for processings executed by the CPU 36*a*. The HDD 36*c* stores the OS and application programs. Also, the HDD 36*c* stores a database which stores names of receivable broadcast stations, call signs described later, and frequencies linked to each other for every specific area, and a database which stores call signs and URLs of related-information providing servers of broadcast stations corresponding to the call signs.

The graphic processing unit 36*d* is connected to a display device 36*h*. The graphic processing unit 36*d* works to display images on the display device 36*h* in accordance with commands from the CPU 36*a*. The input interface 36*e* is connected to a keyboard 36*i* and a mouse 36*j*. The input interface 36*e* transmits signals sent from the keyboard 36*i* and the mouse 36*j*, to the CPU 36*a* through a bus 36*g*.

The communication interface 36*f* is connected to the network 30. The communication interface 36*f* transmits/receives data to/from other computers via the network 30.

According the hardware configuration as described above, the processing functions of the present embodiment can be realized. Although FIG. 3 depicts a typical hardware configuration of the total service server 36, other servers can each be realized by a similar hardware configuration.

The terminal device 10 in the present embodiment also works as an audio device having a function to play back songs.

Figure 4:
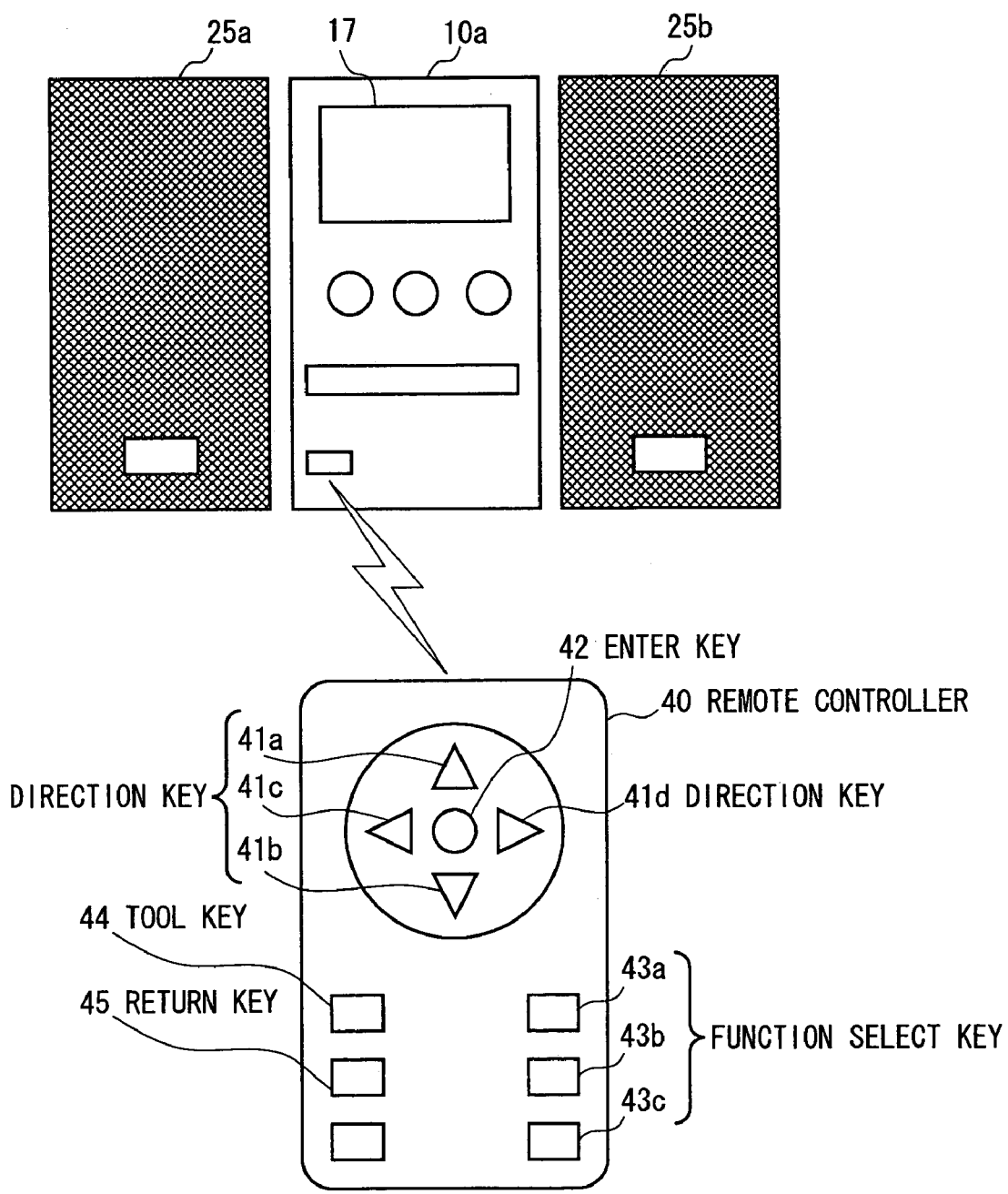
FIG. 4 is a view showing the appearance of a terminal device according to the embodiment of the present invention.

FIG. 4 shows an outer appearance of the terminal device 10.

As shown in FIG. 4, the terminal device 10 according to the present embodiment has an appearance similar to a system component generally used. The terminal device 10 includes a device body 10a, loudspeakers 25a and 25b, and a remote controller 40. The device body 10a has functions to play back CDs or DVDs (Digital Versatile Disc), to record/play back MDs, and to receive FM broadcast and TV broadcast. Audio signals generated by the device body 10a are supplied to the loudspeakers 25a and 25b, and then, sounds are outputted from the loudspeakers 25a and 25b.

Also, the device body 10a is provided with a display device 17. The display device 17 displays related information of a song being played, related information stored by clipping, and the like.

The remote controller 40 is an input device to control the device body 10a from a remote place. The remote controller 40 is provided with plural operation keys. When a user presses down an operation key, a signal corresponding to the pressed operation key is transmitted to the device body 10a from the remote controller 40.

Provided as the operation keys are direction keys 41a to 41d, an enter key 42, function select keys 43a to 43c, a tool key 44, a return key 45, and the like.

The direction keys 41a to 41d are used to move a cursor and a focus spot displayed on the display device 17. The four direction keys 41a to 41d respectively correspond to upward, downward, leftward, and rightward directions. The cursor or the like moves in the direction corresponding to the direction being pressed down.

The enter key 42 is used to fix any of contents displayed on the display device 17, for example.

The function select keys 43a to 43c are used to select functions. For example, the three function select keys 43a to 43c respectively correspond to a total service utilization function, a tuner function, and a local content management function. When any one of the function select keys 43a to 43c is pressed, the device body 10a switches into an operation mode of the function corresponding to the pressed function select key.

The tool key 44 is a button to display a tool menu on the display device 17. In the tool menu, commands corresponding to the contents displayed on the display device 17 are shown. The user can select an arbitrary command from the tool menu to make the terminal device 10 execute a processing corresponding to the command. For example, the user may select an arbitrary command by operating the direction keys 41a to 41d and further press the enter key 42. Then, a processing corresponding to the selected command is executed by the terminal device 10.

The return key 45 is a button to return the displayed contents of the display device 17 to status where the contents were in just before.

The remote controller 40 may further be provided with various other operation keys than those shown in FIG. 4. For example, a volume control key, a play key, a stop key, and the like for music CDs.

Next, the internal configuration of the terminal device 10 will be described.

Figure 5:
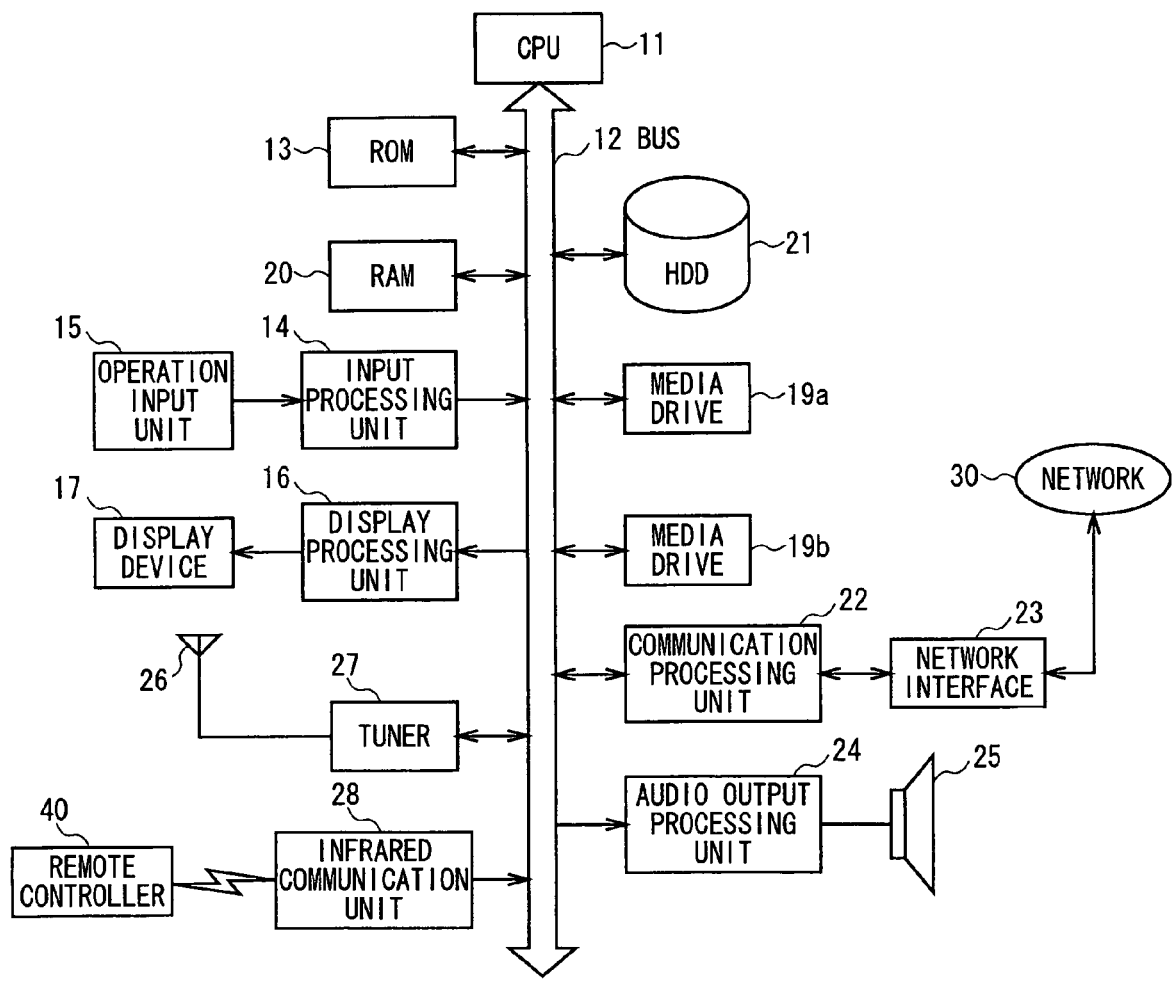
FIG. 5 is a block diagram showing the hardware configuration of the terminal device according to the embodiment of the present invention.

FIG. 5 is a block diagram showing the hardware configuration of the terminal device 10. The terminal device 10 as shown in FIG. 5 makes it possible to manage, record, and reproduce various sources such as songs and the like.

The CPU 11 performs total control and calculation processings of the whole terminal device 10, based on a program started up. For example, the CPU 11 performs communication operations via the network 30, input/output operations with respect to users, reproducing or clipping of contents from media, storing of contents into the HDD 21 and necessary management, and information search based on clipped information via the network 30. Content data which are compatible with and recordable/reproducible by the terminal device 10 of the present invention are audio content data, video content data, and the like. The CPU 11 exchanges control signals and data with respective circuit units via the bus 12.

A ROM (Read Only Memory) 13 stores operation programs to be executed by the CPU 11, program loaders, various calculation coefficients, parameters used for programs, and the like. A RAM 20 develops programs to be executed by the CPU 11. The RAM 20 is also used as a data area and/or a task area necessary when the CPU 11 executes various processings.

The operation input unit 15 has various operators such as operation keys and a jog dial provided on the housing of the terminal device 10, a touch panel, and the like. A keyboard and a mouse for operating the GUI (Graphical User Interface) may be provided as the operation input unit 15. Information inputted through the operation input unit 15 is subjected to a predetermined processing by the input processing unit 14, and is transferred as an operation command to the CPU 11. The CPU 11 performs necessary calculations and controls so that operations as devices corresponding to inputted operation commands can be attained.

For example, a liquid crystal display (LCD) or the like is connected as the display device 17, to display various information. When the CPU 11 supplies a display processing unit 16 with display information in accordance with various operation states, input states, and communication states, the display processing unit 16 then makes the display device 17 execute display operations, based on the supplied display data. For example, the display device 17 displays the contents of related information provided from a server or the like, or the contents of clipped information. If a song is searched for via the network 30, the search result is displayed on the display device 17.

Media drives 19a and 19b are drives each capable of recording/reproducing (only reproducing in some recording media) contents such as songs recorded on a portable recording medium. Note that the type of recording media which can be recordable or reproducible by each of the media drives 19a and 19b is not limited to one type. That is, it is possible to record/reproduce data on/from plural types of recording media. For example, the media drive 19a serves to reproduce contents from CDs and DVDs while the media drive 19b may record/reproduce contents on/from MDS.

Portable type recording media for recording contents such as songs and the like should not be limited to optical recording media such as CDs and DVDS. For example, contents may be stored into a recording medium constituted by a semiconductor memory, like a flash memory. In this case, a reader/writer for the flash memory is connected to the bus 12.

The user inserts recording media (CD, DVD, MD, or the like) in which arbitrary contents have been recorded, into the media drives 19a and 19b, and makes a predetermined operation on the remote controller 40. Then, the user can enjoy songs and the like. For example, when the user operates the remote controller 40 to give a instruction for reproduction from the media drive 19a, the CPU 11 instructs the media drive 19a to reproduce a content. In response, the media drive 19a accesses the inserted recording medium for the instructed content, and reads out the content.

If the content thus read is an audio content, the content is subjected to a decode processing and the like by the CPU 11, if necessary, and then transferred to an audio output processing unit 24. The audio output processing unit 24 performs processings such as a sound-field processing by equalizing, volume control, D/A conversion, amplification, and the like. Then, sounds are outputted from a loudspeaker unit 25. Note that the loudspeaker unit 25 is constituted by plural loudspeakers 25a and 25b as shown in FIG. 4, and can output stereo sounds.

Contents reproduced by the media drives 19a and 19b can be stored as audio data files in the HDD 21 under control by the CPU 11. The format of the audio data files may be of digital audio data according to 16-bit quantization at a sampling frequency 44.1 KHz, which corresponds to the music CD format. Alternatively, to save the volume of the HDD 21, the format may be of compressed audio data which is subjected to a compression processing according to a predetermined method. Although the compression method is not specifically limited, it is possible to use the ATRAC (Advanced TRansform Acoustic Coding: trademark) method, MP3 (MPEG Audio Layer-3) method, or the like.

The tuner 27 is, for example, an AM/FM radio tuner and demodulates broadcast signals received by the antenna 26, based on control by the CPU 11. Of course, the tuner 27 may alternatively be a television tuner, satellite broadcast tuner, or digital broadcast tuner. Demodulated broadcast audio signals are subjected to necessary processings by the audio output processing unit 24 and outputted as broadcasted sounds from the loudspeaker unit 25.

A communication processing unit 22 performs an encode processing on transmission data as well as a decode processing on reception data, based on control by the CPU 11. The network interface 23 transmits the transmission data encoded by the communication processing unit 22, to a predetermined external network-compatible device via the network 30. Also, the network interface 23 transfers signals transmitted from the external network-compatible device, to the communication processing unit 22. The communication processing unit 22 transfers received information to the CPU 11. Information received via the network 30 may be, for example, related information of programs being FM-broadcasted, information of songs included in titles of music CDs, and the like.

An infrared communication unit 28 communicates with the remote controller 40 via a wireless communication means such as infrared rays. Further, the infrared communication unit 28 performs a predetermined processing on signals supplied from the remote controller 40, and feeds the signals as operation commands to the CPU 11. The CPU 11 performs necessary calculations and controls to attain operations as devices which respond to inputted operation commands.

The configuration of the terminal device 10 is not limited to that shown in FIG. 5 but may be further be varied. For example, a modification may be made so that interfaces to peripheral devices can be added according to communication methods such as USB (Universal Serial Bus), IEEE (Institute of Electrical and Electronic Engineers) 1394, Bluetooth, and the like. The HDD 21 can be made store audio contents downloaded via the network 30 through the network interface described above and audio contents transferred through an interface according to the USB, IEEE 1394, or the like. In addition, there can be provided terminals for connection to a microphone, external headphones, and the like, a video output terminal corresponding to DVD playback, a line connection terminal, an optical digital connection terminal, and the like. Further, a PCMCIA (Personal Computer Memory Card International Association) slot, a memory card slot, or the like may be provided to enable data exchange with external information processing devices and audio devices.

Next, a description will be made of the configuration of program modules in the system of the present embodiment. Note that the program modules are information which describes processings to be executed by the terminal device 10, which can perform predetermined functions based on the program modules. In the following description, the functions realized by executing the program modules will be called the names of the program modules.

Figure 6:
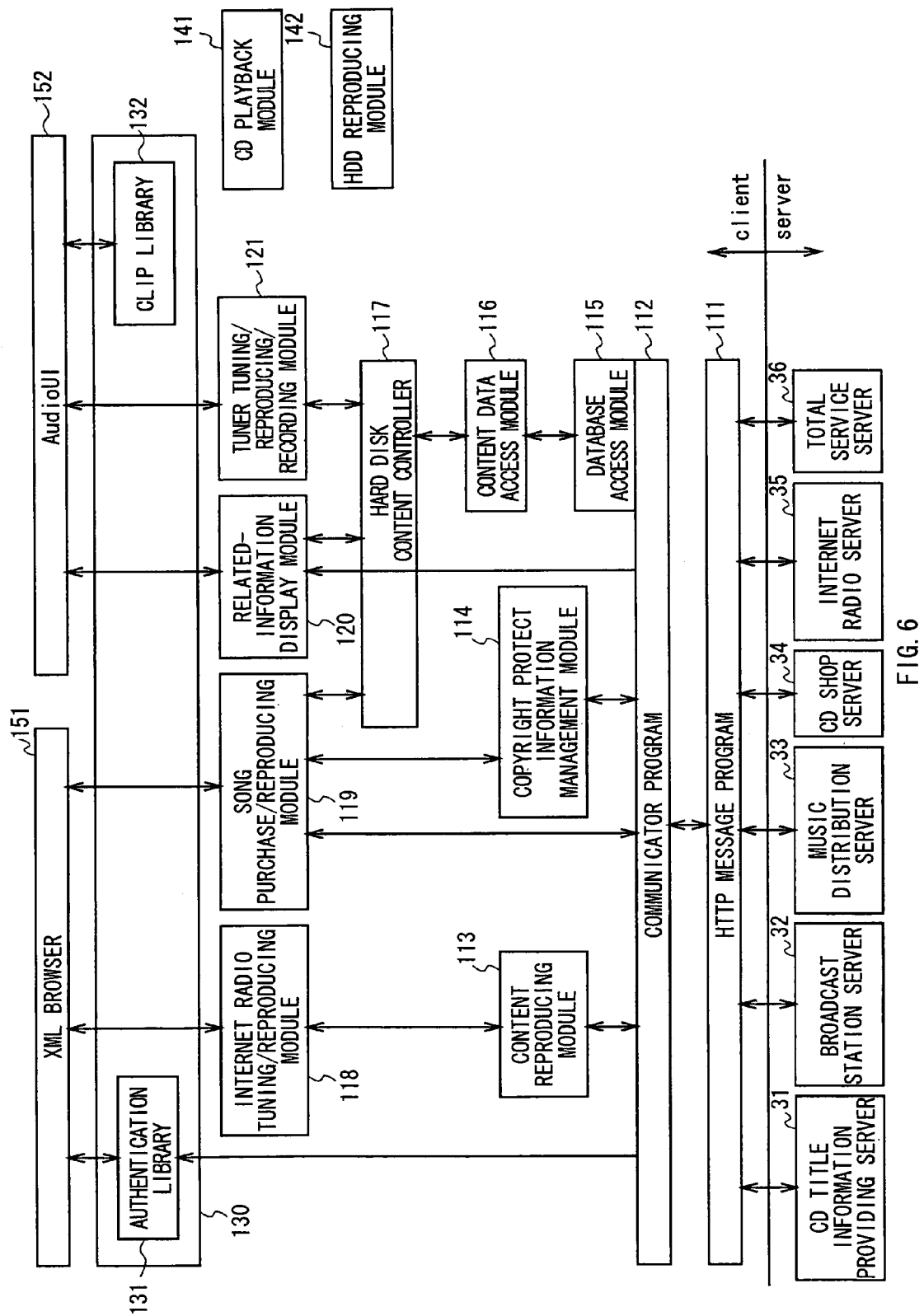
FIG. 6 is a diagram showing the program module configuration of the terminal device according to the embodiment of the present invention.

FIG. 6 is a diagram showing the configuration of the program modules.

The program modules of the terminal device 10 are constructed to operate on the OS. The terminal device 10 can communicate with the CD title information providing server 31, broadcast station server 32, music providing server 33, CD shop server 34, total service server 36, internet radio server 35, and other various servers, due to the functions of the program modules.

A HTTP (Hyper Text Transfer Protocol) message program 111 achieves various transactions among various servers including the CD title information providing server 31, broadcast station server 32, CD shop server 34, total service server 36, and the like by HTTP communication. A communicator program 112 is a communication module which enables various communication with the total service server 36 and the like.

Provided in the higher-level side of the communicator program 112 are a content reproducing module 113 which interprets CODECs of contents to reproduce the contents, and a copyright protect information management module 114 which deals with information concerning copyright protection. In the higher-level side of the content reproducing module 113, there is provided an internet radio tuning/reproducing module 118 which performs tuning and reproducing of internet radio broadcast. A song purchase/reproducing module 119 which manages purchase of songs and playback of demo songs is provided in the higher-level side of the copyright protect information management module 114.

An XML (extensible Markup Language) browser 151 is provided in the higher-level side of the Internet radio tuning/reproducing module 118 and the song purchase/reproducing module 119. The XML browser 151 interprets the contents of XML files sent from various servers and displays the contents on the screen of the display device 17. When the terminal device 10 is in a total service utilization mode, the contents of inputs made by the user are interpreted by the XML browser 151. Further, processing requests corresponding to the contents of the inputs are sent to other modules from the XML browser 151. For example, a song selected by a user through the XML browser 151 is purchased by the song purchase/reproducing module 119, and is written into the HDD 21 through the hard disk content controller 117.

The communicator program 112 is connected to an authentication library 131 of a library 130. The authentication library 131 performs a processing for authenticating the total service server 36 and other various servers.

Further in the higher-level side of the communicator program 112, there are provided a database access module 115, a content data access module 116, and a hard disc content controller 117. The database access module 115 accesses various databases constructed in the HDD 21. The content data access module 116 accesses contents stored in the HDD 21. The hard disc content controller 117 manages contents stored in the HDD 21.

In the higher-level side of the hard disc content controller 117, there are provided a related-information display module 120, tuner tuning/reproducing/recording module 121, and song purchase/reproducing module 119. The related-information display module 120 displays titles and artist names of songs broadcasted by radio stations, on the display device 17. The tuner tuning/reproducing/recording module 121 performs tuning for a radio station and records contents of songs received from the radio station into the HDD 21.

For example, a song received from a radio station through the audio user interface (Audio UI) 152 is written into the HDD 21 through a content data access module 116.

The related-information display module 120 receives the title and/or artist name of a song being currently broadcasted from a radio station, as related information from the CD title information providing server 31, the broadcast station server 32, or the like through the tuner tuning/reproducing/recording module 121 via the HTTP message program 111. The module 120 then displays the related information on the display device 17 through the audio user interface 152.

Note that the related information displayed on the display device 17 through the audio user interface 152 can be temporarily stored into the clip library 132 of the library 130. Also, the related information can be finally stored into the HDD 21 through the database access module 115 in accordance with a user's instruction.

Further, program modules included in the terminal device 10 are a CD playback module 141 and a HDD reproducing module 142 for reproducing data from the HDD 21. Reproduced results are outputted through the audio output processing unit 24 and the loudspeaker unit 25.

Next, a clip processing using the above terminal device 10 will be described.

The terminal device 10 can clip information concerning songs and sets of songs existing in the storage media in the terminal device 10 and on the network 30, and can store the information as clipped information. One of the most basic clip processings is to obtain information related to a song being broadcasted (now on air), from a corresponding broadcast station server 32, while receiving FM broadcast or the like. In this case, for example, the terminal device 10 accesses, at constant time intervals of 30 seconds or so, the broadcast station server 32 corresponding to the broadcast station 37 whose waves are currently received, to obtain the newest related information (concerning any song that has already been or will be broadcasted). When the terminal device 10 detects a clip operation taken by a user, the terminal device 10 stores, as clipped information, related information which has been obtained at this time point.

The clipped related information includes not only the name of the song and the artist name thereof but also the name and the identification ID of an album containing the song. The user then uses, for example, the terminal device 10 to access the music distribution server 33, the CD shop server 34, and the like, and notifies these servers of the identification ID of the album in the clipped information. Thus, the user can carry out a procedure of purchasing the album.

In the clip processing, it is possible to store information as clipped information not only in units of songs but also in units of song sets. For example, in a clip processing while receiving broadcast, a list (on-air list) of songs broadcasted in the program being broadcasted at the time of clipping can be taken as a unit and can be stored as one clip information item.

Information from the broadcast server 32 which is obtained by the clip processing and can be stored is not limited to songs or sets of songs including the song now on air. The user may specify a date and/or time band as a search condition by the terminal device 10, and transmits the condition to the broadcast station server 32. Then, the user obtains a song or a set of songs as a search result. From the obtained information, the user selects and clips a desirable portion, and stores it as clipped information.

To obtain thus related information from broadcast station server 32 by clipping, the terminal device 10 needs to obtain and know an information source of the broadcast station corresponding to a reception frequency. In the network system according to the present embodiment, the total service server 36 provides a service of searching for the URL of related-information provider of each broadcast station. In this service, call signs are used as identification information for specifying broadcast stations. Hence, the terminal device 10 transmits a call sign to the total service server 36, and then receives a URL searched for by the total service server 36, thus enabling access to the URL.

In addition, receivable areas of broadcast signals from FM radio stations are limited. There is a case that an equal broadcast frequency is used by plural radio stations positioning in distant areas. Therefore, reception frequencies do not always correspond to call signs. The total service server 36 hence provides a service of receiving area information which specifies an area from the terminal device 10 and of supplying a broadcast station list as information which lists up correspondences among names of broadcast stations receivable in the area, call signs, and frequencies.

Figure 7:
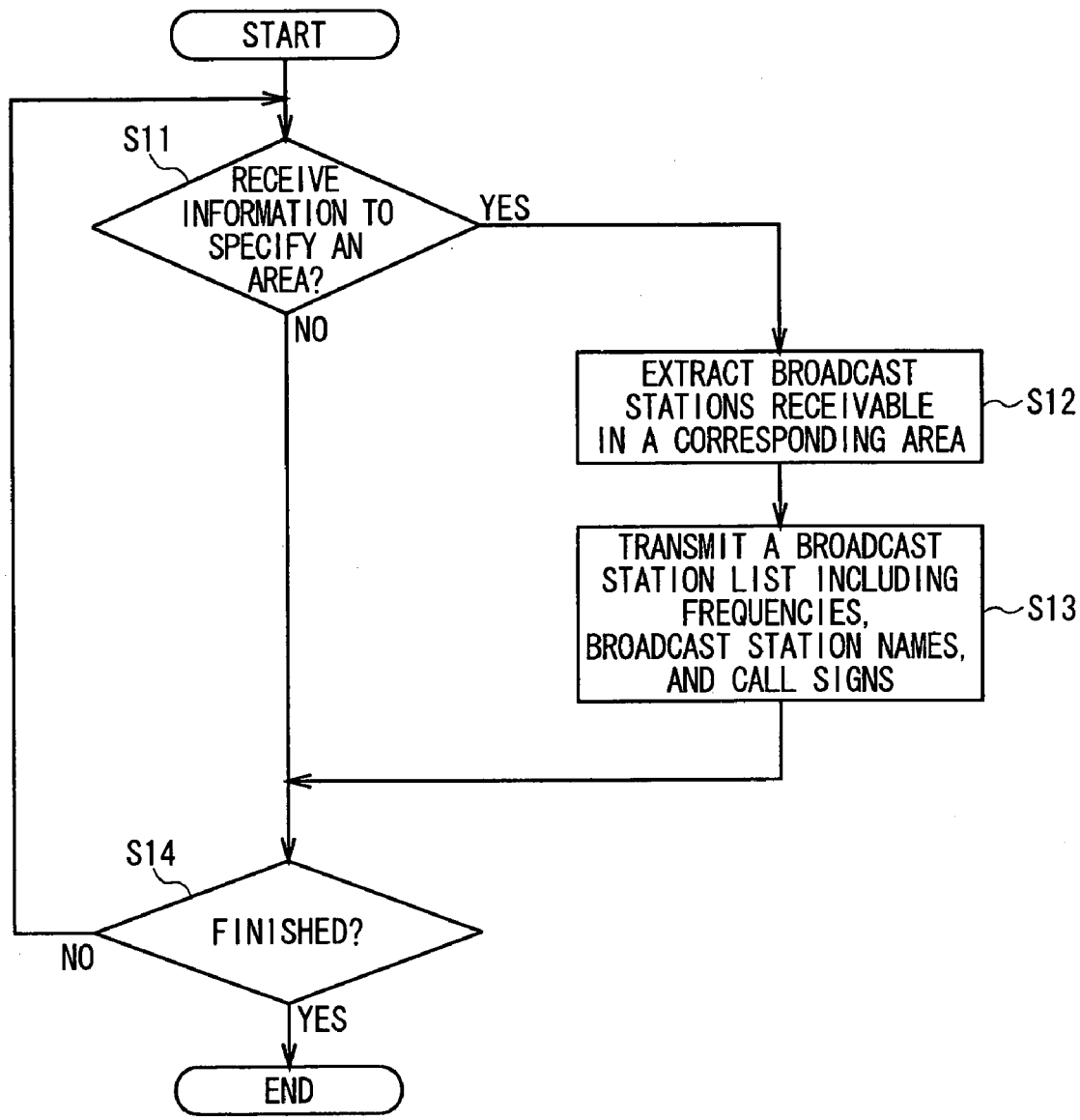
FIG. 7 is a flowchart showing the flow of processings in a total service server when providing a call sign and URL specify service.

FIG. 7 is a flowchart showing a processing flow of the total service server 36 when providing a broadcast station list.

In step S11, information which specifies an area is received from the terminal device 10. The server determines that a reception request for a broadcast station list has been received, and goes to step S12. Information received at this time may include a prefecture name, postal code, long-distance code, area name, or the like.

In step S12, the area corresponding to the received information is specified, and information concerning broadcast stations receivable in the area is extracted from a database in the HDD 32c.

In step S13, broadcast station list information as a list of correspondence information including frequencies, broadcast station names, call signs, and the like linked to each other is transmitted to the terminal device 10, based on the extracted information.

In step S14, completion of the processing is determined. If the processing is not completed yet, the flow returns to step S11 and waits for a signal from the terminal device 10.

In the processing described above, plural frequencies may be received together with information which specifies the area, such as a prefecture name or postal code. If a frequency of a broadcast station receivable in the corresponding area is equal to a received frequency, the broadcast station name and the call sign of the frequency may be transmitted. Further, in this processing, if there is such a frequency among frequencies received from the terminal device 10 that is not equal to any of frequencies of receivable broadcast stations, a list of frequencies, broadcast station names, and call signs of other broadcast stations receivable in the area may be transmitted.

FIG. 8 is a table showing an example of a database which the total service server 36 includes to provide broadcast station lists.

As shown in FIG. 8, the total service server 36 has a database in which frequencies of electric waves transmitted, broadcast station names thereof, and call signs are stored liked respectively to receivable areas where the waves are receivable. Therefore, when an area is instructed as a search key, a list of information which combines frequencies receivable in the area, broadcast station names thereof, and call signs thereof is extracted and transmitted as a broadcast station list. The total service server 36 further has a database which links various information items for specifying areas, such as postal codes and prefecture names, to area names on the database shown in FIG. 8.

Meanwhile, the terminal device 10 has a function of storing (presetting) frequencies to be received and preset numbers linked to each other, in advance, and of selecting and receiving corresponding one of the frequencies as one of the preset numbers is instructed. Therefore, when presetting reception frequencies, the terminal device 10 utilizes a service of the total service server 36 as described above, to preset names and call signs of broadcast stations receivable by the terminal device 10, linked to the reception frequencies. Then, the terminal device 10 can obtain and access the URL of a related-information provider. It is accordingly possible to utilize easily a service of obtaining related information from the broadcast station server 32.

However, the terminal device 10 does not always receive radio broadcast via electric waves. For example, there is a case that the terminal device 10 receives radio broadcast via a cable of cable television. In this case, sometimes, the frequencies at which radio broadcasts are sent differ from the frequencies of electric waves transferring the radio broadcasts. In another case, radio broadcasts from distant broadcast stations which are not usually receivable in the present area may be transferred and supplied. In these cases, the terminal device 10 cannot link frequencies to call signs, according only to the area information.

The terminal device 10 hence lists up and displays broadcast station names in broadcast station list information on the display device 17, when frequencies receivable in an area, which are included in the broadcast station list information received from the total service server 36, do not agree with preset frequencies. Thus, the user can take an input operation to make a selection from the names, so that presetting can be carried out by an accurate and easy operation, in accordance with the area or reception method.

Figure 9:
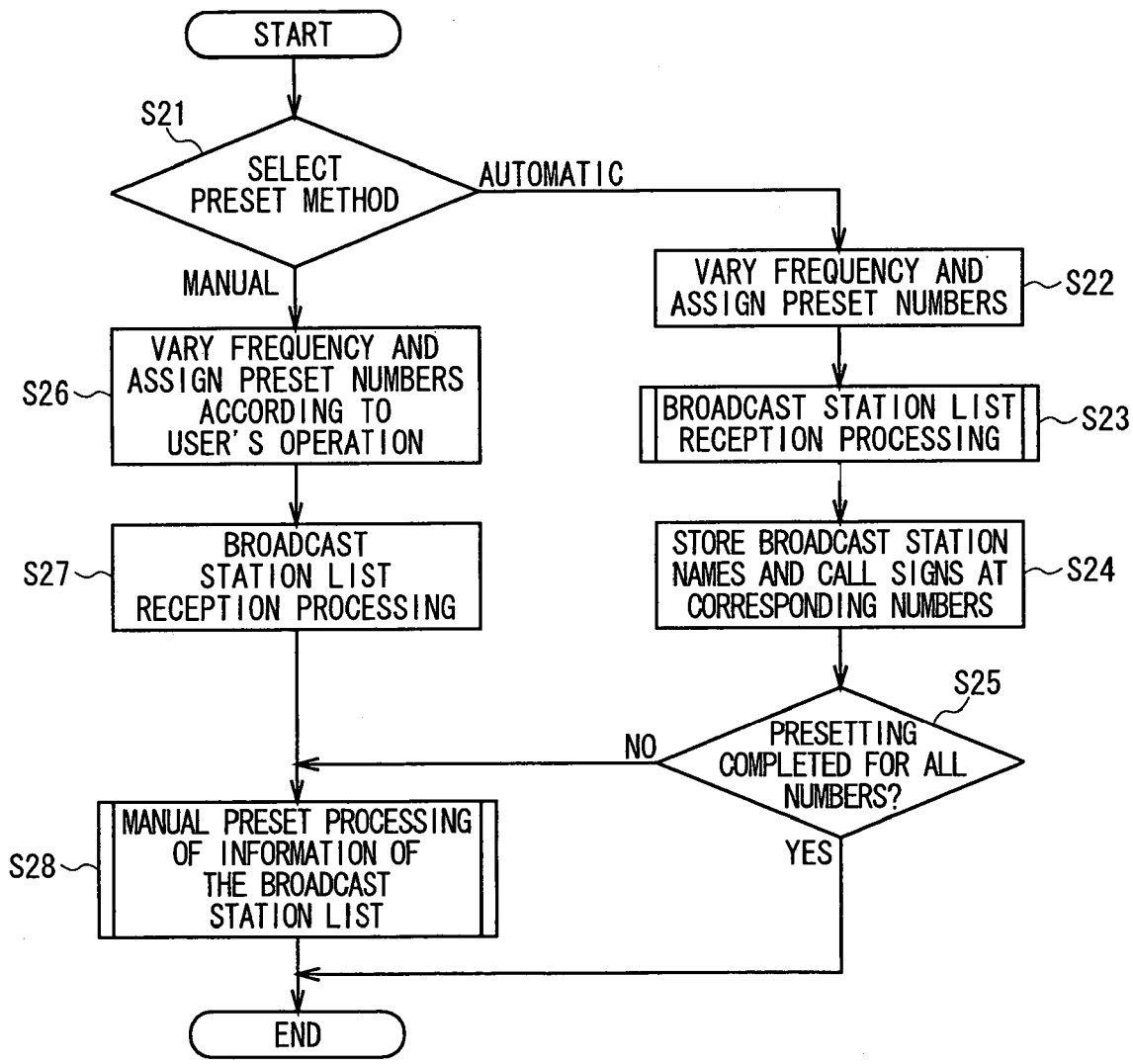
FIG. 9 is a flowchart showing-the flow of entire processings in the terminal device when presetting frequencies.

Processings in the terminal device 10 when presetting frequencies will now be described in more details. FIG. 9 is a flowchart showing the flow of the entire processings in the terminal device 10 when presetting frequencies.

In the present embodiment, two kinds of preset methods are prepared for the terminal device 10, i.e., automatic presetting and manual presetting. The user can select and use either one. In the automatic presetting, frequencies at which broadcasts can be received are automatically detected (auto-tuning) and are assigned to preset numbers. Further, the detected frequencies are stored, automatically linked to broadcast station names and call signs. In manual presetting, these processings are carried out in accordance with operation inputs from the user. Operation inputs from the user are basically given by the remote controller 40.

In step S21, a preset method is selected in accordance with a user's operation input. If the automatic presetting is selected, the flow goes to step S22. Otherwise, if the manual presetting is selected, the flow goes to step S26.

In step S22, the reception frequency is gradually varied to automatically detect frequencies at which broadcasts are received. Then, the detected frequencies are stored orderly, assigned with preset numbers.

In step S23, the terminal device 10 transmits information which specifies the area where the terminal device 10 is installed, and executes a processing of receiving a broadcast station list from the total service server 36. The processing of step S23 will be described in details later with reference to FIG. 12.

In step S24, frequencies which agree with those preset in step S22 are picked up one after another from the received broadcast station list, and broadcast station names and call signs linked to the frequencies are stored, linked to corresponding preset numbers.

In step S25, whether or not broadcast station names and call signs have been stored with respect to all the preset numbers stored in step S22 is determined. If the names and signs have been stored with respect all the numbers, the processing ends. Alternatively, if there are any preset numbers at which other frequencies than those included in the broadcast station list are stored, the processing goes to step S28 in which presetting is carried out by manual inputs from the user with respect to those preset numbers.

Otherwise, if manual presetting is selected in step S21, the reception frequency is varied in accordance with user's operations, in step S26. Frequencies at which broadcasts are received are stored, with preset numbers assigned to the frequencies.

In step S27, the terminal device 10 transmits information which specifies the area where the terminal device 10 is installed, and executes a processing of receiving a broadcast station list from the total service server 36. This step is the same as step S23 and will be described in details with reference to FIG. 12.

In step S28, a processing of storing information of a received broadcast station list in accordance with user's operations is carried out for every preset number.

Figure 10:
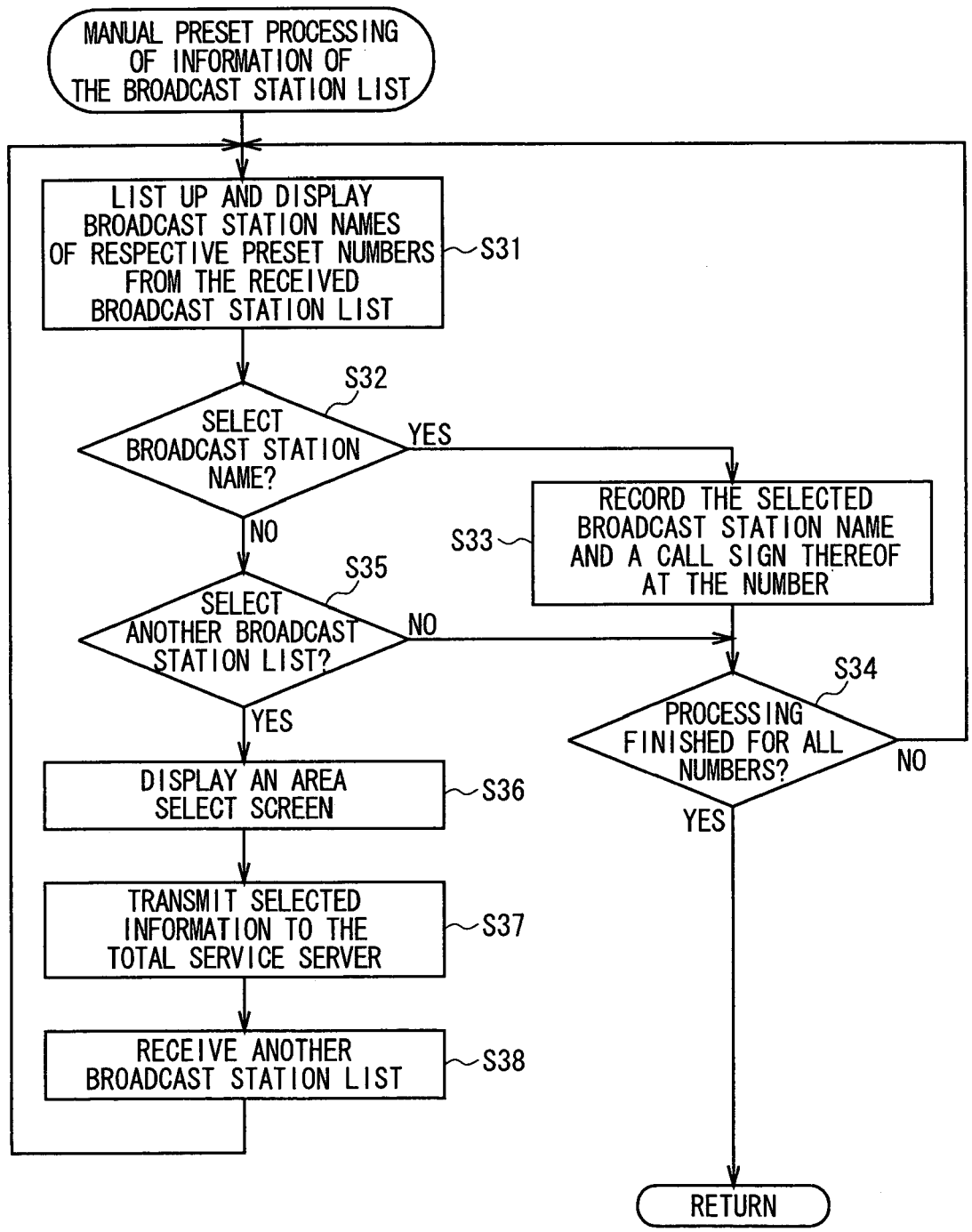
FIG. 10 is a flowchart showing the flow of processings in the terminal device when manually presetting information concerning a broadcast station list.

FIG. 10 is a flowchart showing the flow of a processing of presetting information of a broadcast station list by manual operations, which corresponds to step S28 described above.

Figure 11:
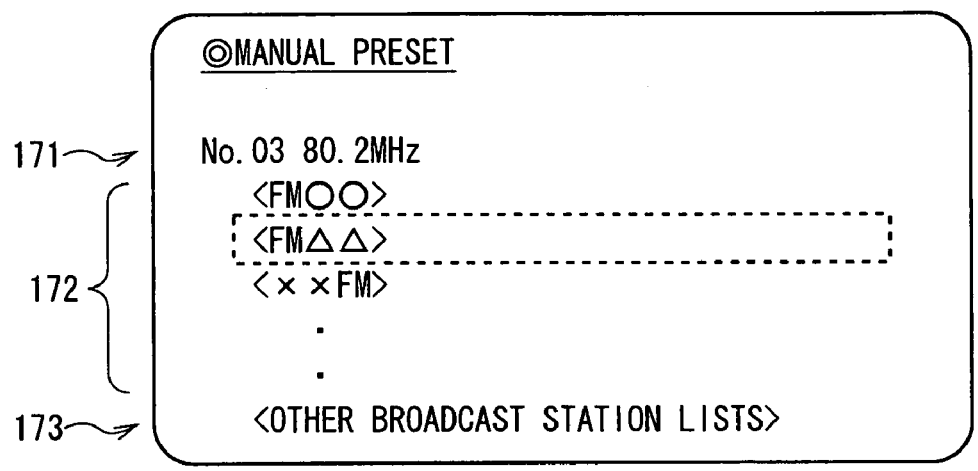
FIG. 11 is a view showing an example of the screen display of the screen listing and displaying broadcast station names.

In step S31, broadcast station names are listed up and displayed on the display device 17 to allow the user to make selection, for every preset number at which neither broadcast station name nor call sign is stored. In this processing, broadcast station names are extracted, listed up, and displayed, from a broadcast station list received in the foregoing step S23 or S27 or in step S38 described later. This screen also displays an instruction item to display a list of names of broadcast stations in another area than that listed and displayed. The user is thus allowed to select the item. An example of the screen display at this time is shown in FIG. 11 described later.

In step S32, a broadcast station name is selected from the displayed list and fixed, by using the direction keys 41a and 41b and enter key 42 of the remote controller 40. Then, the flow goes to step S33.

In step S33, the broadcast station name selected in step S32 and a corresponding call sign are extracted from the received broadcast station list, and are stored linked to the corresponding present number.

In step S34, if the processing has not been completed for all the preset numbers, the flow returns to step S31 and continues the processing for a next preset number at which neither broadcast station name nor call sign is not yet stored.

In step S35, if no broadcast station name is selected from the display screen listing the broadcast station names displayed in step S31 but the item for requesting list display of broadcast stations of another area than the area being listed, the flow goes to step S36. Otherwise, if presetting of broadcast station names is not carried out for the current preset number, the flow goes to step S34.

In step S36, a screen for selecting a reception area is displayed on the display device 17. The user selects and fixes an area by using the direction keys 41a and 41b and enter key 42.

In step S37, information indicative of the selected area is transmitted to the total service server 36, to request a broadcast station list corresponding to this area.

In step S38, the broadcast station list corresponding to the area requested is received. Then, the processing returns to step S31 in which names of broadcast stations in the received broadcast station list are displayed as a list, and a further user's operation input is waited for. If the flow goes from this processing to steps S35 to S38, it is possible to select and preset a name and call sign of any broadcast station of further another area.

FIG. 11 shows an example of screen display listing up and displaying names of broadcast stations in the foregoing step S31.

In the screen shown in FIG. 11, a selected preset number and a reception frequency are displayed in a display part 171, and names of broadcast stations in a broadcast station list are listed up and displayed in a list display part 172. Displayed below the part 172 is an instruction item 173 for requesting list display of broadcast stations of another area. Further, the focus is moved to any one of the broadcast station names in the list display part 172 by the direction keys 41a and 41b, and the broadcast station name is fixed by the enter key. Thus, the broadcast station name and a corresponding call sign can be preset. In addition, the focus can be moved to the instruction item 173 and this item is fixed. Thus, broadcast station names and call signs of another area can be obtained from the total service server 36, and the broadcast station names can be displayed on a similar screen.

In the processing described above, names of broadcast stations which are receivable via electric waves in the area where the terminal device 10 is installed and call signs thereof are displayed in form of a list, and the user makes selection from the list. As a result, information of these kinds can be stored accurately linked to preset numbers and frequencies by a simple operation, not only when manual presetting is selected but also when automatic presetting is selected. Therefore, even when radio broadcasts are transferred via cable television at frequencies different from those transferred via electric waves, broadcast station names and call signs can be easily and correctly preset.

An instruction item for requesting a list displaying broadcast stations of another area is provided on the list display screen showing broadcast station names. A corresponding list of broadcast station names is obtained, and the broadcast station names are further listed, displayed, and made selectable. Thus, even when broadcasts of another area which are not receivable via electric waves are transferred via cable television or the like, names and call signs of the broadcast stations thereof can be easily preset.

By using a call sign preset by this kind of processing, the URL of a corresponding broadcast station server 32 is obtained from the total service server 36. Related information of a program of the broadcast station being received can be obtained by accessing the URL. Accordingly, initial setting for obtaining related information of the program of the broadcast station being actually received by the terminal device 10 can be carried out correctly by an easy operation, regardless of the form of receiving broadcast.

Next, a supplemental explanation will be added to the broadcast station list reception processing in steps S23 to S27 in FIG. 9.

To receive a broadcast station list, information which specifies an area may be transmitted to the total service server 36, as described above. The most basic method thereof is to make the user input and transmit a prefecture name, postal code, long-distance code, or the like by the user's operation. However, since the terminal device 10 does not have ten-keys, character-input keyboard, or the like, input operations for information of this kind had better be simplified as much as possible or necessity for input operations had better be eliminated.

On the other side, to receive a service of providing related information concerning programs and songs (now on air) from the broadcast station server 32, a preliminary registration procedure is needed. In the present embodiment, this registration procedure is carried out by the total service server 36.

In the registration procedure, a user ID and password for identifying a user are registered in the total service server 36, together with user's personal information such as the user's name and address. It is also possible that one user uses plural terminal devices to receive the service. Therefore, the user can register an arbitrary name for every terminal device. Further, when the user accesses the total service server 36 from a terminal device and transmits a call sign, the user is authenticated by notifying the user's ID, password, and the name of the terminal device. If the user is determined as a valid user, the user can obtain the URL of the broadcast station server 32 corresponding to the call sign, and can utilize the service.

Accordingly, information (e.g., address, postal code, or the like) which specifies an area is included in the registration information of every of the users registered for the service providing related information. By using the information when requesting a broadcast station list, the user can avoid an input operation. For example, this is realized by recording the registration information in the registration processing, into the terminal device.

Figure 12:
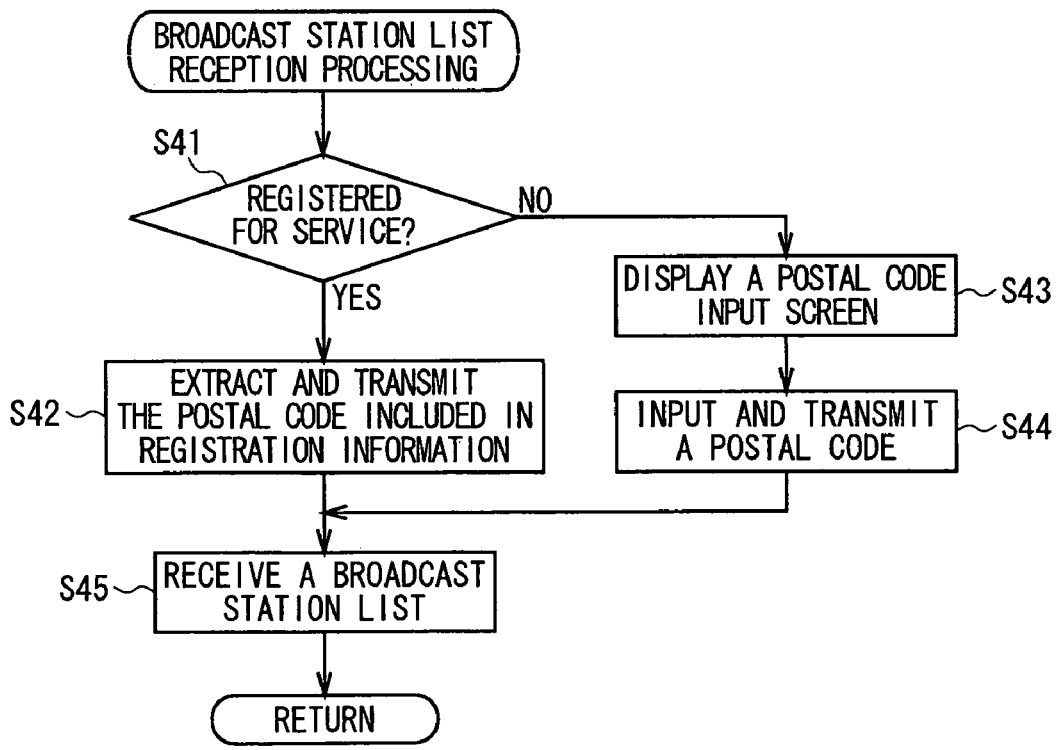
FIG. 12 is a flowchart showing the flow of a broadcast station list reception processing.

FIG. 12 is a flowchart showing the flow of a processing of receiving a broadcast station list. In the following processing, for example, a postal code is used as information which specifies an area.

In step S41, whether or not registration for the service of providing related information has been completed is determined. This determination is made depending on, for example, whether registration information exists in the HDD 21 of the terminal device 10. If registration information exists, the flow goes to step S42. If no registration information exists, the flow goes to step S43.

In step S42, the postal code in the user's address is extracted from the registration information stored in the terminal device 10 and transmitted to the total service server 36. Then, the processing flow goes to step S45.

On the other side, in step S43, an input screen for postal codes is displayed on the display device 17. Further, in step S44, an inputted postal code is transmitted to the total service server 36 and the flow goes to step S45.

In step S45, a broadcast station list transmitted from the total service server 36 is received. The received broadcast station list is temporarily stored in the RAM 20, for example.

Thus, if registration has been carried out in advance with respect to the related-information providing service, it is unnecessary to input information for specifying an area, and accordingly, the operation ability for the user can be improved. Registration information stored in the terminal device is used in the processing example described above. However, the total service server 36 may extract area information such as a postal code or the like from the registration information of the user who accessed the server to request a broadcast station list, and a broadcast station list corresponding to the request may be transmitted. In this case, for example, the user ID, password, and name of the terminal device of the user are notified in accordance with the user's input operations, when accessing the total service server 36 from the terminal device.

The processing function of the terminal device 10 as described above is realized as a program describing the contents of this processing is executed by the CPU 11 in the terminal device 10. Alternatively, a similar program may be executed by the CPU of a computer, so that the processing function as described above is realized by the computer. The program describing the contents of the processing may be recorded on a recording medium readable from the terminal device 10 or computers. Recoding media of this kind are a magnetic recording device, optical disc, magneto-optical recording medium, semiconductor memory, and the like. The magnetic recording device may a HDD, flexible disc (FD), magnetic tape, or the like. The optical disc may be a DVD, DVD-RAM, CD-ROM, CD-R (Recordable)/RW (Re-Writable), or the like. The magneto-optical recording medium may be an MO (Magneto-Optical disc) or the like.

In case of distributing programs, for example, portable recording media such as DVDs, CD-ROMS, and the like which record the program are sold. Alternatively, the program may be stored in a storage of a server computer from which the program may be transferred to another computer via a network.

The terminal device 10 or computer which executes the program firstly stores the program recorded a portable recording medium or transferred from a server computer into the storage device of the terminal device 10. In case of the terminal device 10, for example, the program is stored in the HDD 21 or the like. The terminal device 10 or computer then reads the program from its own storage device and executes processings according to the program. Note that the terminal device 10 or computer may directly read the program from a portable recording medium and execute processings according to the program. Alternatively, every time when the program is transferred from a server computer, processings according to the received program may be executed.

As described above, this network system is constructed to realize a service of providing now-on-air information for the terminal device 10 while the terminal device 10 is receiving broadcast from a preset broadcast station. Next, a music-related service providing system 1000 shown in FIG. 13 will be described as a specific example of this network system with reference to FIGS. 14 to 25. This music-related service providing system 1000 has a single sign-on function.

Figure 25:
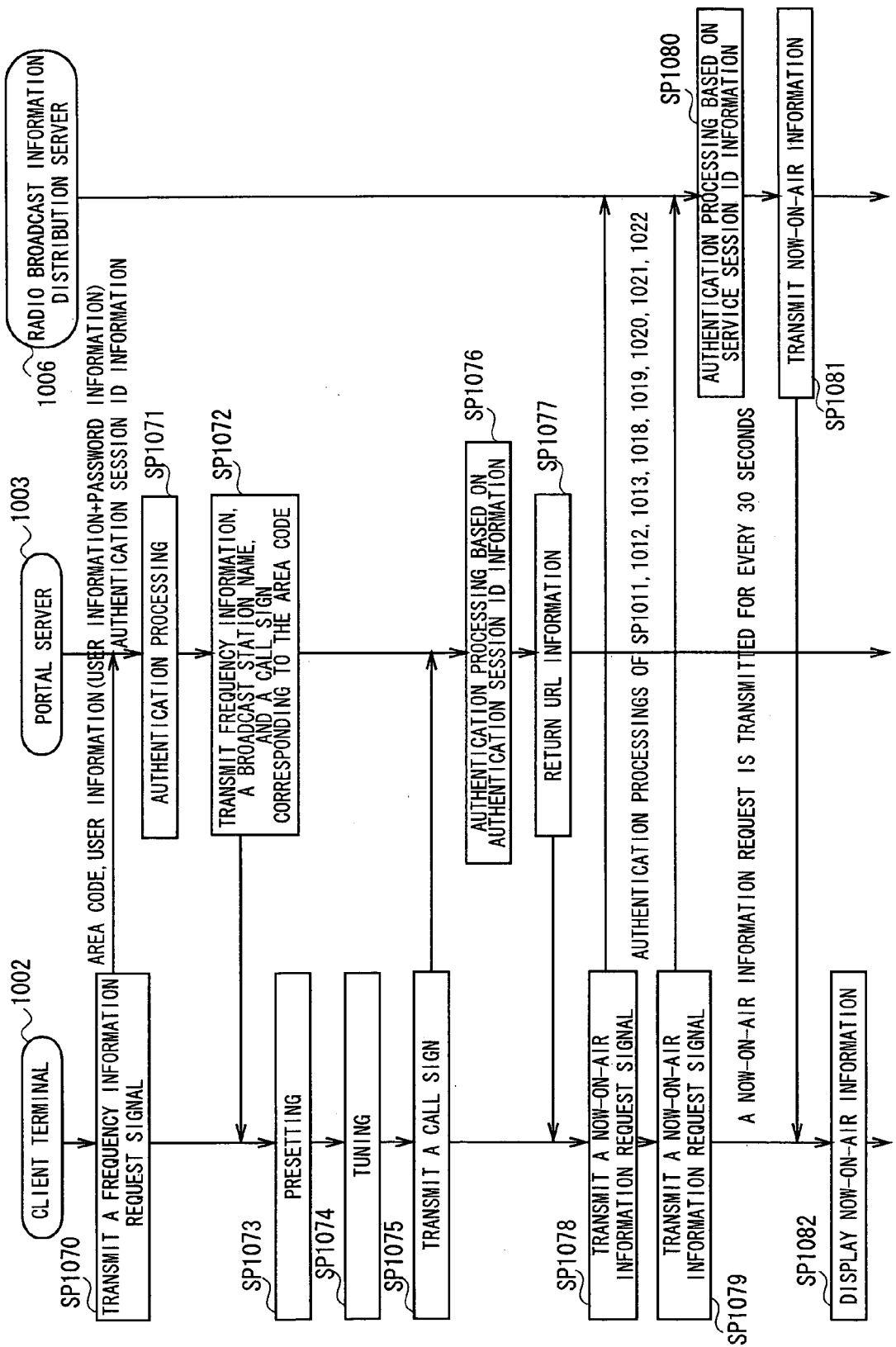
FIG. 25 is a sequence chart showing a radio broadcast information (now-on-air information) distribution service providing processing procedure (2).

The service of providing now-on-air information will be described in details later mainly referring to FIG. 25. In this case, the program information server 4 described above corresponds to a radio broadcast information distribution server 1006. The broadcast station specify server 2 described above corresponds to, for example, a portal server 1003. The reproducing apparatus 1 (terminal device 10) described above corresponds to, for example, a client terminal 1002. The network 3 described above corresponds to, for example, a network NT 1000.

(1) Music-Related Service Providing System (1-1) System Configuration

Figure 13:
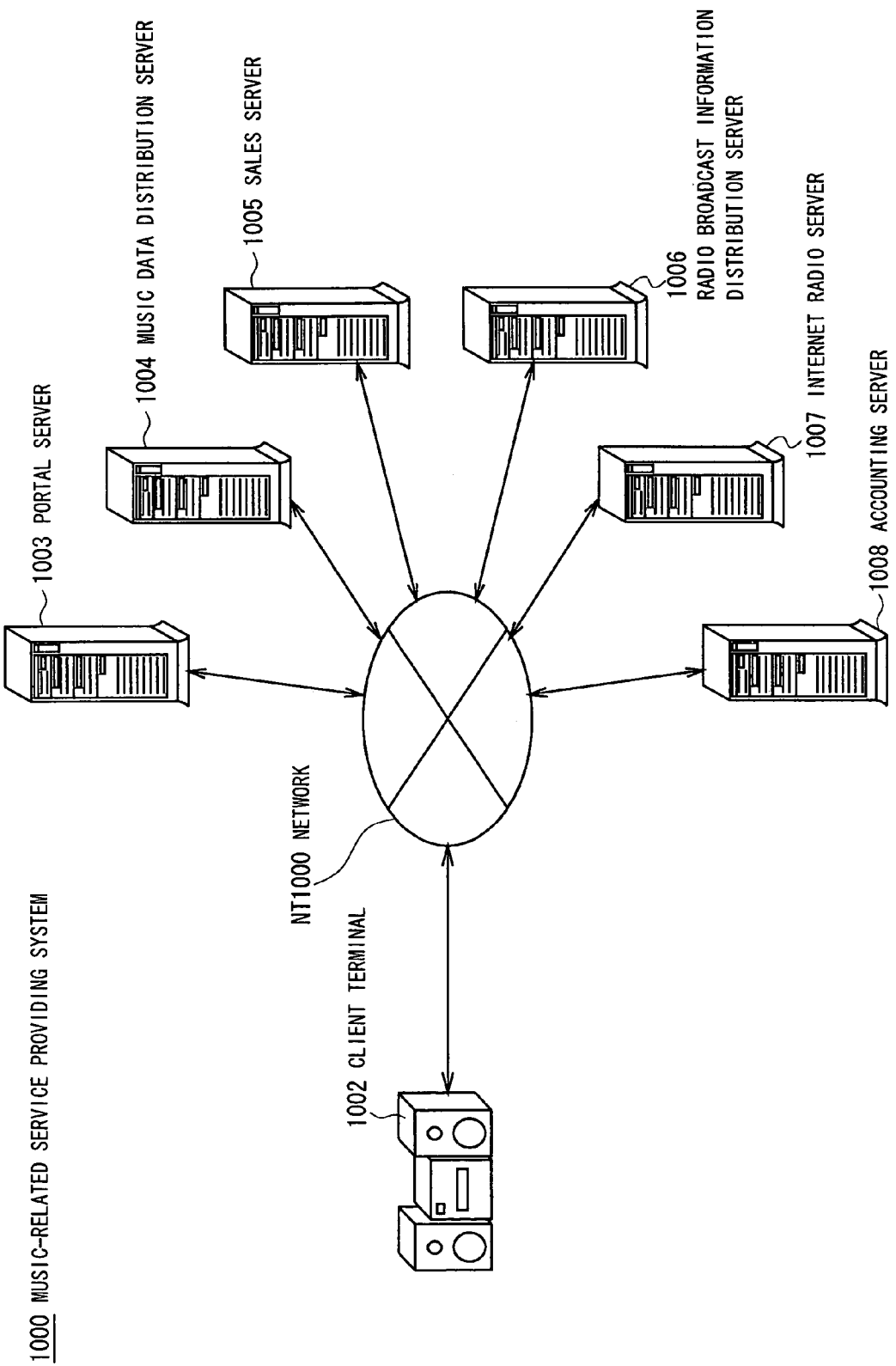
FIG. 13 is a schematic diagram showing the entire configuration of a music-related service providing system in the present embodiment.

In FIG. 13, the reference numeral 1000 denotes a music-related service providing system as a whole, which includes a client terminal 1002 of the user who signed up a contract with a management agency of the music-related service providing system 1000, a portal server 1003 which manages the client terminal 1002, plural servers 1004 to 1008 which provide various services concerning music for the client terminal 1002.

In case of this embodiment, the music data distribution server 1004 provides a music data distribution service of providing music data for the client terminal 1002, where the music data has a format according to ATRAC3 (Adaptive Transform Acoustic Coding 3), AAC (Advanced Audio Coding), WMA (Windows Media Audio), Real AUDIO G2 Music Codec, MP3 (MPEG Audio Layer-3), or the like.

A sales server 1005 provides a sales service of selling CDs (Compact Discs) and DVDs (Digital Versatile Discs) to the user via the client terminal 1002.

Further, a radio broadcast information distribution server 1006 provides a radio broadcast information distribution service of distributing radio programs, music, and the like in radio broadcasts sent from radio stations, to the client terminal 1002.

Further, the internet radio server 1007 provides an internet radio broadcast service which broadcasts radio broadcast data in the form of streaming distribution toward the client terminal 1002 via the network NT 1000 corresponding to the Internet.

In addition, an accounting server 1008 is configured to execute an accounting processing to charge users various fees in response to requests from the portal server 1003 and the like.

(1-2) Configuration of the Client Terminal 1002

(1-2-1) Function Circuit Block Configuration of the Client Terminal 1002

Figure 14:
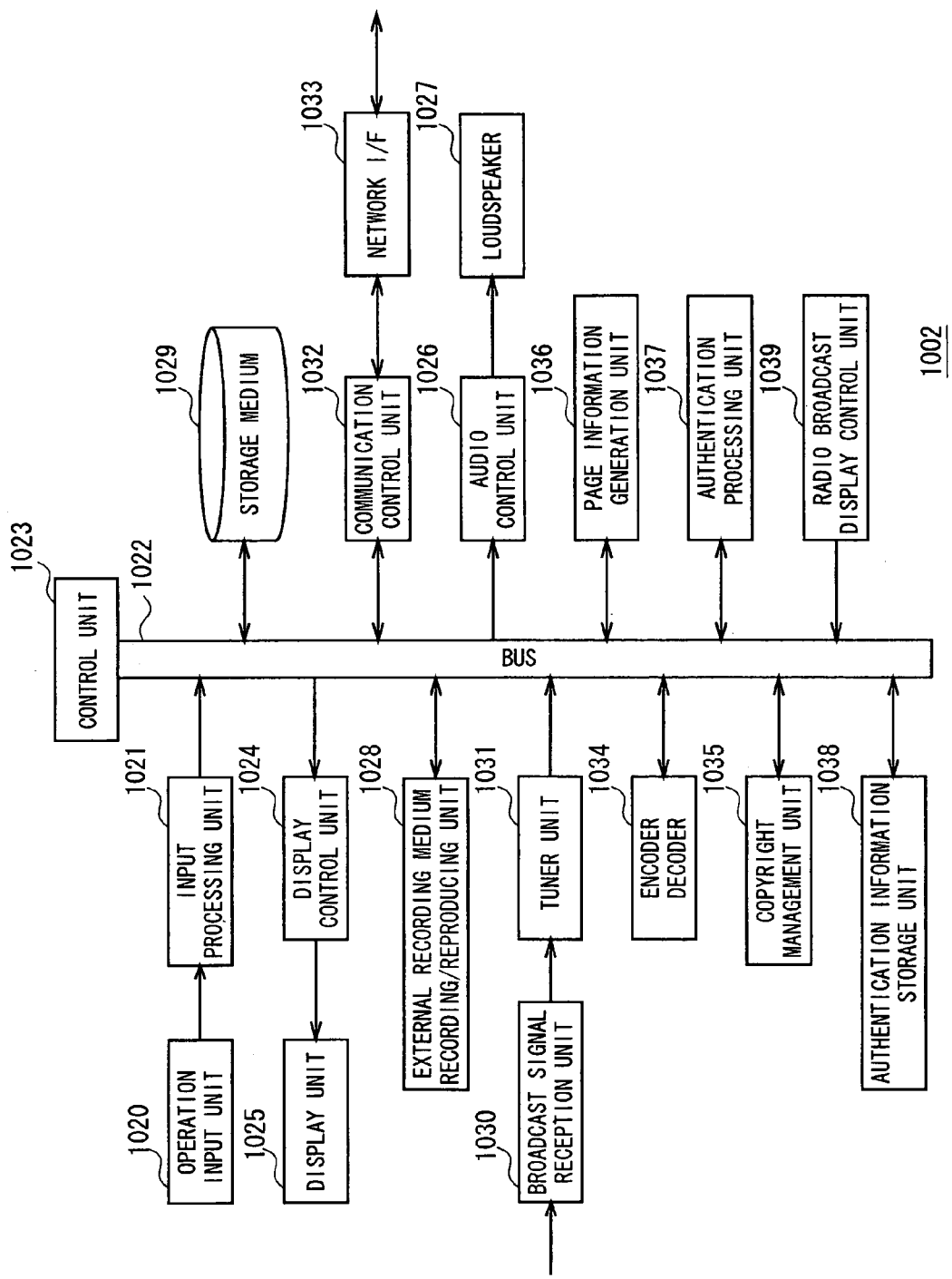
FIG. 14 is a block diagram showing the hardware configuration of function circuit blocks of a client terminal.

Next, the hardware configuration of the function circuit block of the client terminal 1002 will be described. As shown in FIG. 14, when an operation input unit 1020 constituted by various operation buttons provided on the surface of the housing of the client terminal 1002 or a remote controller (not shown) is operated by the user, the client terminal 1002 recognizes the operation and sends an operation input signal corresponding to the operation, to an input processing unit 1021.

The input processing unit 1021 converts the operation input signal given from the operation input unit 1020 into a specific operation command and sends the command to a control unit 1023 via a bus 1022.

The control unit 1023 controls operation, based on commands and control signals given from circuits connected through the bus 1022.

The display control unit 1024 performs a digital/analog conversion processing on-video data supplied thorough the bus 1022, and sends analog video signals obtained as a result of conversion to the display unit 1025.

The display unit 1025 is, for example, a display device such as a liquid crystal display or the like, which is directly mounted on the surface of the housing in some cases or is provided externally in other cases.

As processing results from the control unit 1023 or various video data as analog video signals through the display control unit 1024 are supplied to the display unit 1025, the display unit 1025 displays videos based on the analog video signals.

An audio control unit 1026 performs a digital/analog conversion processing on audio data supplied via the bus 1022, and sends analog audio signals obtained as a result, to a loudspeaker 1027. The loudspeaker 1027 outputs sound based on the analog audio signals supplied from the audio control unit 1026.

An external recording medium recording/reproducing unit 1028 reads and reproduces content data recorded on an external recording medium such as a memory stick (trademark) or the like in which a flash memory is contained in a outer casing, or records content data as a recording target onto the external recording medium.

When the external recording medium recording/reproducing unit 1028 reads video data as content data from the external recording medium, the unit supplies the read video data to the display control unit 1024 through the bus 1022.

Then, the display control unit 1024 converts the video data read as content data from the external recording medium by the external recording medium recording/reproducing unit 1028, into analog video signals, and supplies the signals to the display unit 1025.

When the external recording medium recording/reproducing unit 1028 reads audio data as content data from the external recording medium, the unit 1028 supplies the read audio data to the audio control unit 1026 through the bus 1022.

The audio control unit 1026 then converts the audio data read as content data from the external recording medium by the external recording medium recording/reproducing unit 1028, into analog audio signals, and supplies the signals to the loudspeaker 1027.

Further, the control unit 1023 sends content data read from the external recording medium by the external recording medium recording/reproducing unit 1028, to a storage medium 1029 in the client terminal 1002 through the bus 1022, and stores the content data into the storage medium 1029 (hereinafter the operation of storing content data into the storage medium 1029 will be called ripping).

When video data such as image data or video data is read as content data from the storage medium 1029, the control unit 1023 supplies the read video data to the display control unit 1024 through the bus 1022.

Also, when audio data such as audio data is read as content data from the recording medium 1029, the control unit 1023 supplies the read audio data to the audio control unit 1026 through the bus 1022.

In addition, the control unit 1023 can read and transfer music data from the storage medium 1029 to the external recording medium recording/reproducing unit 1028, thereby to make the external recording medium recording/reproducing unit 1028 record the music data into the external recording medium.

A broadcast signal reception unit 1030 receives radio-broadcast waves transmitted from radio stations and supplies the waves to a tuner unit 1031.

Under control from the control unit 1023, the tuner unit 1031 extracts radio broadcast signals of a broadcast frequency corresponding to a radio station instructed, for example, by the operation input unit 1020 among radio broadcast waves received by the broadcast signal reception unit 1030. The tuner unit 1031 performs a predetermined processing on the extracted signals and sends audio data obtained as a result of the predetermined processing, to the audio control unit 1026 through the bus 1022.

The audio control unit 1026 converts the audio data given from the tuner unit 1031 into analog audio signals and sends these signals to the loudspeaker 1027. Thus, sounds of the radio program broadcasted from the radio station are outputted from the loudspeaker 1027, and the user can thus be able to hear the sounds of the radio program.

Also, the control unit 1023 sends audio data obtained by the tuner unit 1031 to the storage medium 1029 and stores the audio data. Thus, sounds of radio programs can be recorded.

Further, the control unit 1023 can connect to the network NT 1000 continuously through a communication control unit 1032 and a network interface 1033, and can access the portal server 1003 or any of the other servers 1004 to 1007 on the network NT 1000. Thus, various information and data can be transmitted/received to/from the portal server 1003 or any of the other servers 1004 to 1007.

The encoder/decoder unit 1034 decodes compression-coded content data received from the network NT 1000 via the network interface 1033 and communication control unit 1032, or compression-coded content data read from the storage medium 1029 or an external recording medium. The unit 1034 then sends the decoded content data to the display control unit 1024, the audio control unit 1026, and the like.

Also, the encoder/decoder unit 1034 compression-codes uncompressed content data read from the external recording medium and audio data and the like given from the tuner unit 1031, and sends the compression-coded content data to the storage medium 1029.

Thus, the content data compression-coded by the encoder/decoder unit 1034 is stored into the storage medium 1029 under control from the control unit 1023.

A copyright management unit 1035 generates copyright management information corresponding to content data downloaded from the network NT 1000 sequentially through the network interface 1033 and the communication control unit 1032, and copyright management information corresponding to content data read from the external recording medium by the external recording medium recording/reproducing unit 1028.

The copyright management information generated by the copyright management unit 1035 is registered in the storage medium 1029, linked to content data under control from the control unit 1023.

Also, when the copyright management unit 1035 checks out content data linked to copyright management information between the storage medium 1029 and a specific external recording medium or checks in content data linked to the copyright management information between the specific external recording medium and the storage medium 1029, the copyright management unit 1035 appropriately updates the contents of the copyright management information corresponding to the content data, thereby to protect the copyright corresponding to the content data.

A page information generation unit 1036 interprets page information such as XML (extensible Markup Language) files or HTML (Hyper Text Markup Language) files received from the network NT 1000 continuously through the network interface 1033 and the communication control unit 1032, generates video data to be displayed on the display unit 1025, and sends the video data to the display control unit 1024.

An authentication processing unit 1037 executes an authentication processing to transmit authentication information via the communication control unit 1032 and the network interface 1033, to the portal server 1003 or any of the other servers 1004 to 1007 on the network NT 1000 connected through the network interface 1033.

An authentication information storage unit 1038 stores authentication information required when the authentication processing unit 1037 accesses the portal server 1003 or the any of the other servers 1004 to 1007.

A radio broadcast display control unit 1039 transmits a request signal for requesting radio broadcast information concerning the radio broadcast being received at present for user's listening, continuously through the communication control unit 1032 and the network interface 1033, to a radio broadcast information distribution server 1006 corresponding to the radio station broadcasting the radio broadcast being received.

As a result, the radio broadcast display control unit 1039 receives the radio broadcast information transmitted from the radio broadcast information distribution server 1006 on the network NT 1000 continuously through the network interface 1033 and the communication control unit 1032, and sends the received radio broadcast information to the display control unit 1024. Thus, the unit 1039 makes the display unit 1025 display the radio broadcast information consisting of the program name of the radio program being received currently, the tile and artist name of the song being received currently, and the like.

(1-2-2) Directory Management

Figure 15:
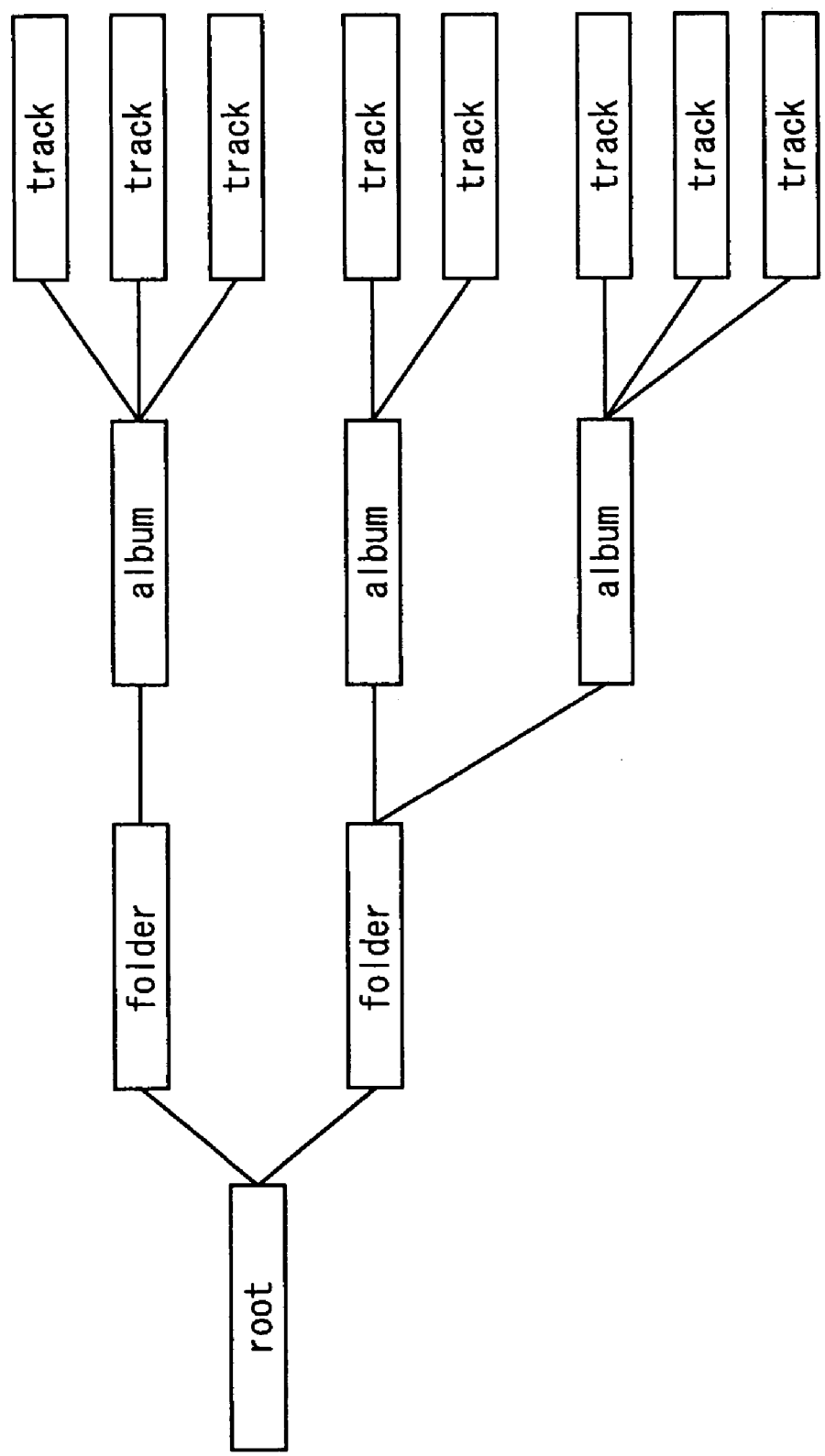
FIG. 15 is a tree view showing a directory structure.

The control unit 1023 of the client terminal 1002 manages the content data to be stored into the storage medium 1029, with use of a directory structure as shown in FIG. 15. At first, an arbitrary number of "folder" directories are created in the layer below the "root" directory wherein the number of "folder" directories is within a definite range. The "folder" directories are created, for example, corresponding to genres to which contents belong or owner users, respectively.

In the layer below the "folder" directories, an arbitrary number of "album" directories are created wherein the number of "album" directories is within a definite range. Every "album" directory corresponds to, for example, one album title. In the layer below the "album" directories, one or more "track" files which belong to any of the "album" directories are stored. Every "track" file constitutes one song, i.e., a content.

This kind of directory management concerning content data is carried out by database files stored in the storage medium 1029.

(1-3) Function Circuit Block Configuration of the Portal Server 1003

Next, the hardware configuration of the function circuit block of the portal server 1003 will be described with reference to FIG. 16. The control unit 1050 in the portal server 1003 controls operations of respective circuits connected though the bus 1051.

A communication control unit 1052 transmits/receives various information to/from the client terminal 1002 or any of the other servers 1004 to 1008 via the network interface 1053, under control from the control unit 1050.

User ID (Identification) information and password information of users who have already signed up a contract with the management agency of the music-related service providing system 1000 are linked to each other and registered as customer information in a customer database unit 1054.

A page information storage unit 1055 stores page information and the like which are managed by the management agency of the music-related service providing system 1000. The page information is written in the XML language or the like and includes URL (Uniform Resource Locator) information to access the music data distribution server 1004, sales server 1005, radio broadcast information distribution server 1006, internet radio server 1007, and the like.

When user ID information and password information transmitted from a client terminal 1002 continuously through the network interface 1053 and communication control unit 1052 are received, an authentication processing unit 1056 checks whether or not the received user ID information and password information have been registered as customer information in the customer database 1054, as a user authentication processing.

Upon completion of the user authentication processing, the authentication processing unit 1056 issues portal authentication result information (e.g., authentication session ID information described later) indicative of the user authentication processing result, and temporarily stores the issued portal authentication result information into the authentication information storage unit 1057.

At this time, if the user is authenticated to be a valid user as a result of the user authentication processing by the authentication processing unit 1056, the control unit 1050 transmits page information for contractants, which is stored in the page information storage unit 1055, to the client terminal 1002 continuously through the communication control unit 1052 and network interface 1053, together with the portal authentication result information.

The control unit 1050 may be arranged such that, if the user is not authenticated to be a valid user as a result of the user authentication processing by the authentication processing unit 1056, the control unit 1050 transmits authentication error information together with authentication-failure notification page information indicative of a failed authentication, to the client terminal 1002 continuously through the communication control unit 1052 and network interface 1053.

When the authentication processing unit 1056 receives, continuously through the network interface 1053 and communication control unit 1052, portal authentication result information (e.g., an authentication ticket described later) obtained and transmitted from the client terminal 1002 of a user as a result of execution of an authentication processing for the user by the music data distribution server 1004, sales server 1005, and radio broadcast information distribution server 1006, the authentication processing unit 1056 compares the received portal authentication result information with portal authentication result information corresponding to the user, which has been temporarily stored in an authentication information storage unit 1057.

In this manner, the authentication processing unit 1056 executes a confirmation processing to check whether the portal authentication result information is right or not, as an authentication processing with respect to the portal authentication result information received from the music data distribution server 1004, sales server 1005, and radio broadcast information distribution server 1006. The unit 1056 then sends confirmation result information indicative of the confirmation result back to the music data distribution server 1004, sales server 1005, and radio broadcast information distribution server 1006 continuously through the communication control unit 1052 and network interface 1053.

A frequency information storage unit 1058 stores area codes such as postal codes capable of specifying areas, frequency information indicative of broadcast frequencies of radio broadcasts receivable in the areas specified by the area codes, names of radio stations broadcasting the radio broadcasts (hereinafter called broadcast station names), and call signs as identification information unique to radio broadcast stations, linked to each other.

A URL storage unit 1059 stores the call signs respectively unique to radio stations for radio broadcasting, and URL information at which radio broadcast information (hereinafter called now-on-air information) can be obtained, with the call signs and the URL information linked to each other, wherein the radio broadcast information is provided from radio stations corresponding to the call signs, concerns radio programs being currently broadcasted, and contains names of the radio programs, titles of songs broadcasted at the current time point, and the like.

(1-4) Function Circuit Block Configuration of the Music Data Distribution Server 1004

Figure 17:
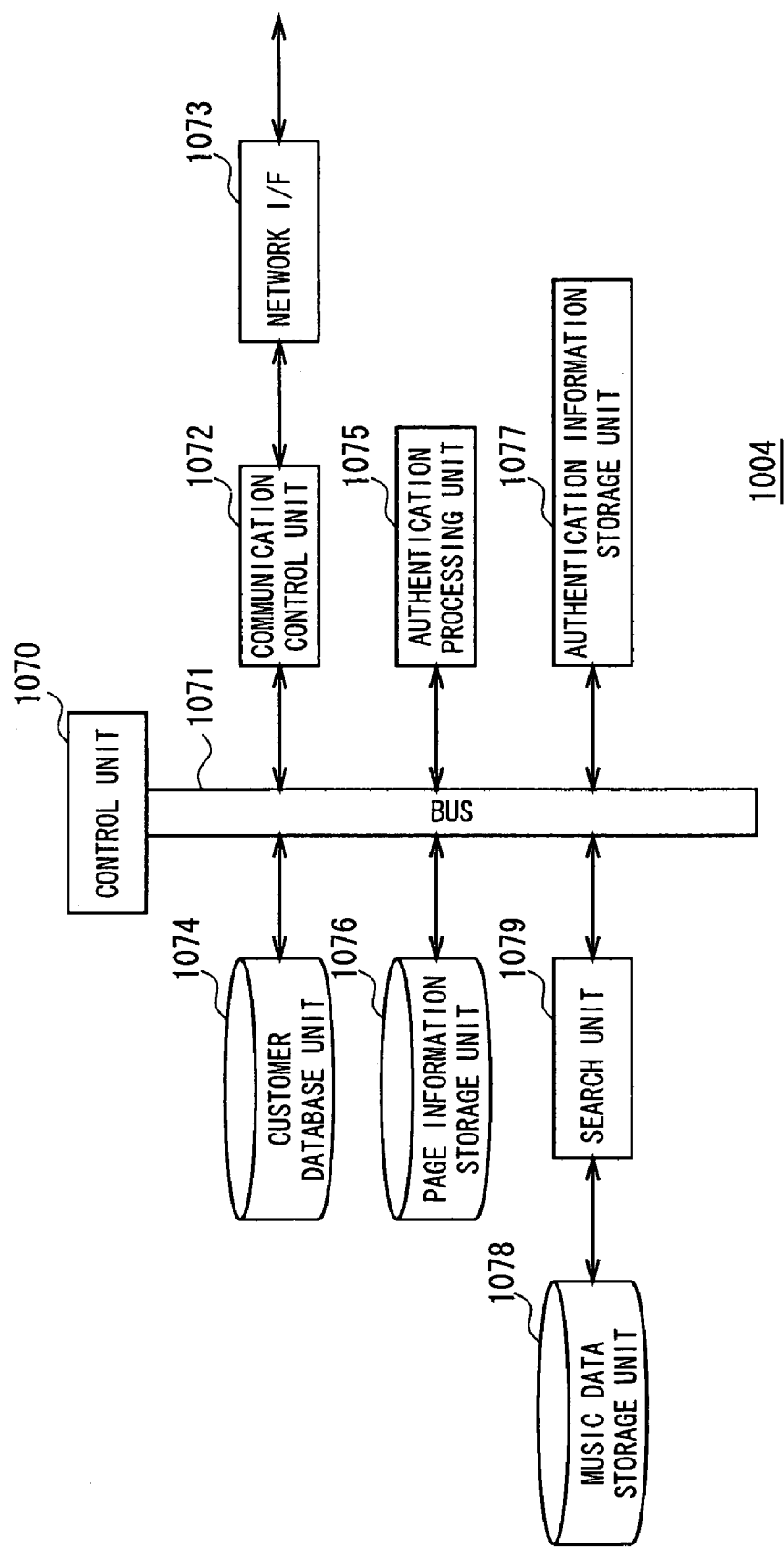
FIG. 17 is a block diagram showing the hardware configuration of function circuit blocks of a music data distribution server.

Next, with reference to FIG. 17, a hardware configuration based on the function circuit blocks of the music data distribution server 1004 will be described. A control unit 1070 in the music data distribution server 1004 controls operations of respective circuits connected through the bus 1071.

A communication control unit 1072 transmits/receives various information and various data such as content data and the like to/from the client terminal 1002, the portal server 1003, and the like through a network interface 1073, under control from the control unit 1070.

User ID information and password information of users who have already signed up a contract with the management agency of the music data distribution server 1004 are registered as customer information in a customer database unit 1074. However, if an authentication processing unit 1075 has a function to perform an authentication processing for authenticating a user based on portal authentication result information issued from the portal server 1003 and transmitted from the client terminal 1002, there is no need of providing the customer database unit 1074.

A page information storage unit 1076 stores page information for music data distribution, which introduces downloadable music data managed by the music data distribution server 1004.

The page information for music data distribution is written in the XML language or the like, and allows the user who uses the client terminal 1002 to select music data which the user desires.

When the control unit 1070 receives a page information obtaining request signal for requesting page information for music data distribution, which is transmitted from the client terminal 1002, through the network interface 1073 and communication control unit 1072, the control unit 1070 transmits page information for music data distribution stored in the page information storage unit 1076, to the client terminal 1002 continuously through the communication control unit 1072 and network interface 1073, in response to the received page information obtaining request signal.

When the authentication processing unit 1075 receives user ID information and password information of the user using the client terminal 1002, which are transmitted from the client terminal 1002, continuously though the network interface 1073 and communication control unit 1072, the authentication processing unit 1075 confirms whether or not the received user ID information and password information have been registered as customer information in the customer database unit 1074, as a user authentication processing.

In another user authentication method different from the user authentication processing using the user ID information and password information, the authentication processing unit 1075 receives portal authentication result information (e.g., an authentication ticket described later) issued by the portal server 1003 and transmitted from the client terminal 1002 continuously through the network interface 1073 and communication control unit 1072. The unit 1075 then transmits the received portal authentication result information to the portal server 1003 continuously through the communication control unit 1072 and network interface 1073.

In response to the transmission of the portal authentication result information to the portal server 1003, the authentication processing unit 1075 receives confirmation result information returned from the portal server 1003, as a result of execution of an authentication processing (the confirmation processing described above) on the portal authentication result information, continuously through the network interface 1073 and communication control unit 1072. Based on the received confirmation result information, the authentication processing unit 1075 confirms whether or not the user is a valid user who has signed up a contract with the management agency of the music-related service providing system 1000.

Upon completion of the user authentication processing, the authentication processing unit 1075 issues server authentication result information (e.g., service session ID information described later) indicative of a result of the user authentication processing.

At this time, if the user is authenticated as a valid user as a result of the user authentication processing by the authentication processing unit 1075, the control unit 1070 transmits page information for music data distribution, which is stored for contractants in the page information storage unit 1076, together with server authentication result information, to the client terminal 1002 continuously through the communication control unit 1072 and network interface 1073.

Otherwise, if the user is not authenticated as a valid user as a result of the user authentication processing by the authentication processing unit 1075, the control unit 1070 transmits authentication error information together with authentication failure notification page information indicative of a failure in the authentication, which is stored in the page information storage unit 1076, to the client terminal 1002 continuously though the communication control unit 1072 and network interface 1073.

Meanwhile, an authentication information storage unit 1077 temporarily stores server authentication result information issued by the authentication processing unit 1075, and also stores various authentication information which the authentication processing unit 1075 requires when performing a user authentication processing for the user using the client terminal 1002.

The music data storage unit 1078 stores plural music data items compression-coded in the above-mentioned ATRAC3 format, MP3 format, or the like, with the music data items linked respectively to search keys such as content ID information items.

When a download request signal is received continuously through the network interface 1073 and communication control unit 1072 wherein the download request signal contains a search key for searching for music data which the user desires to download and is transmitted from the client terminal 1002 as a result of having transmitted page information for music data distribution to the client terminal 1002 and the signal also requests download of the music data to be downloaded, a search unit 1079 picks up the search key from the download request signal.

Then, based on the search key, the search unit 1079 searches for music data which the user desires to download and satisfies a search condition suggested by the search key, among the plural music data items in the music data storage unit 1078.

Thus, the control unit 1070 transmits the desired music data to be downloaded, which has thus been searched for, to the client terminal 1002 continuously through the communication control unit 1072 and network interface 1073.

Also, the control unit 1070 transmits, at this time, fee charge information for a fee charge processing issued by download of music data to the client terminal 1002, to an accounting server 1008 continuously through the communication control unit 1072 and network interface 1073, thereby to make the accounting server 1008 execute a fee charge processing of charging the user a fee corresponding to the download of music data.

(1-5) Function Circuit Block Configuration of the Sales Server 1005

Figure 18:
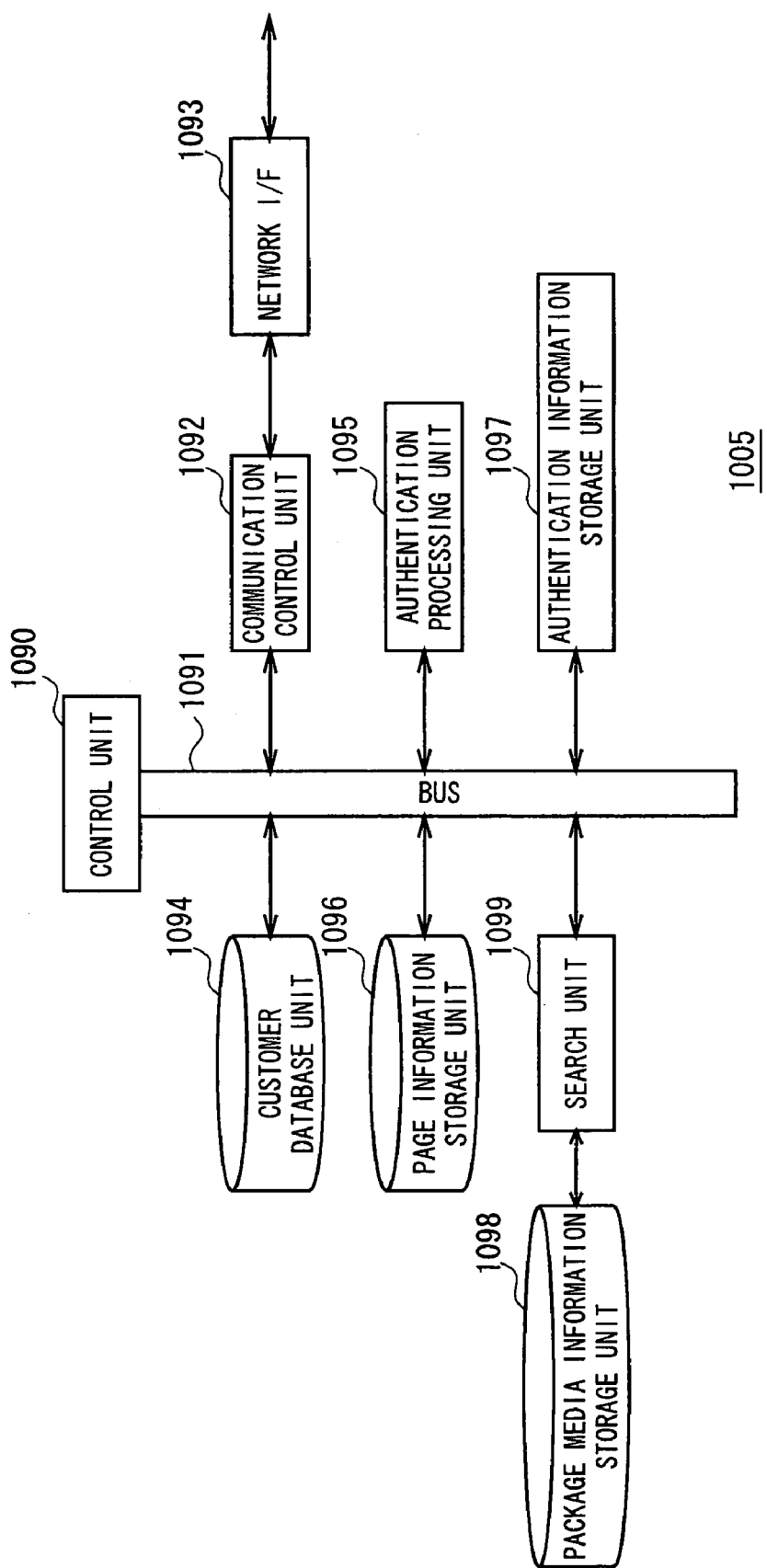
FIG. 18 is a block diagram showing the hardware configuration of function circuit blocks of a sales server.

Next, a hardware configuration based on the function circuit block of the sales server 1005 will be described with reference to FIG. 18. The control unit 1090 controls operation of respective circuits connected through a bus 1091.

A communication control unit 1092 transmits/receives various information to/from the client terminal 1002, the portal server 1003 and the like via the network interface 1093, under control from the control unit 1090.

User ID information and password information of users who have already signed up a contract with the management agency of the sales server 1005 are linked to each other and registered as customer information in a customer database unit 1094. However, if an authentication processing unit 1095 has a function to perform an authentication processing for authenticating a user based on portal authentication result information issued from the portal server 1003 and transmitted from the client terminal 1002, there is no need of providing the customer database unit 1094.

A page information storage unit 1096 stores page information for sales of package media and the like which are managed by the sales server 1005 and introduce package media such as CDs and DVDS to be sold.

Note that the page information for sales of package media is written in the XML language or the like and allows the user who uses the client terminal 1002 to select package media such as CDs, DVDS, and the like which the user desires to purchase.

When the control unit 1090 receives a page information obtaining request signal for requesting page information for package media sales, which is transmitted from the client terminal 1002, through the network interface 1093 and communication control unit 1092, the control unit 1090 transmits page information for package media sales stored in the page information storage unit 1096, to the client terminal 1002 continuously through the communication control unit 1092 and network interface 1093, in response to the received page information obtaining request signal.

When the authentication processing unit 1095 receives user ID information and password information of the user using the client terminal 1002, which are transmitted from the client terminal 1002, continuously though the network interface 1093 and communication control unit 1092, the authentication processing unit 1095 confirms whether or not the received user ID information and password information have been registered as customer information in the customer database unit 1094, as a user authentication processing.

In another user authentication method different from the user authentication processing using the user ID information and password information, the authentication processing unit 1095 receives portal authentication result information (e.g., an authentication ticket described later) issued by the portal server 1003 and transmitted from the client terminal 1002 continuously through the network interface 1093 and communication control unit 1092. The unit 1095 then transmits the received portal authentication result information to the portal server 1003 continuously through the communication control unit 1092 and network interface 1093.

In response to the transmission of the portal authentication result information to the portal server 1003, the authentication processing unit 1095 receives confirmation result information returned from the portal server 1003, as a result of execution of an authentication processing (the confirmation processing described above) on the portal authentication result information, continuously through the network interface 1093 and communication control unit 1092. Based on the received confirmation result information, the authentication processing unit 1095 confirms whether or not the user is a valid user who has signed up a contract with the management agency of the music-related service providing system 1000.

Upon completion of the user authentication processing, the authentication processing unit 1095 issues server authentication result information (e.g., service session ID information described later) indicative of a result of the user authentication processing.

At this time, if the user is authenticated as a valid user as a result of the user authentication processing by the authentication processing unit 1095, the control unit 1090 transmits page information for package media sales, which is stored for contractants in the page information storage unit 1096, together with server authentication result information, to the client terminal 1002 continuously through the communication control unit 1092 and network interface 1093.

Otherwise, if the user is not authenticated as a valid user as a result of the user authentication processing by the authentication processing unit 1095, the control unit 1090 transmits authentication error information together with authentication failure notification page information indicative of a failure in the authentication, which is stored in the page information storage unit 1096, to the client terminal 1002 continuously though the communication control unit 1092 and network interface 1093.

Meanwhile, an authentication information storage unit 1097 temporarily stores server authentication result information issued by the authentication processing unit 1095, and also stores various authentication information which the authentication processing unit 1095 requires when performing a user authentication processing for the user using the client terminal 1002.

A package media information storage unit 1098 stores information concerning plural package media such as CDS, DVDS, and the like to be sold (hereinafter called package media information), linked to search keys such as package media ID information and the like.

When a media information request signal is received continuously through the network interface 1093 and communication control unit 1092 wherein the media information request signal requests package media information concerning a specific package medium such as a CD, DVD, or the like, which is transmitted from the client terminal 1002 as a result of having transmitted page information for package media sales to the client terminal 1002, a search unit 1099 picks up a search key for searching for the specific package medium from the received media information request signal.

Then, based on the search key, the search unit 1099 searches for package media information of the specific package medium which satisfies a search condition suggested by the search key, among the plural package media information items in the package media information storage unit 1098.

Thus, the control unit 1090 transmits the package media information, which has thus been searched for, to the client terminal 1002 continuously through the communication control unit 1092 and network interface 1093. In this manner, the package media information concerning the specific package medium is thus presented to the user.

As a result, when the control unit 1090 receives a purchase request signal to request purchase of the specific package medium described above from the client terminal 1002 continuously through the network interface 1093 and communication control unit 1092, the control unit 1090 executes a purchase processing such as a shipping procedure or the like for shipping the specific package medium to the user using the client terminal 1002.

Also, the control unit 1090 transmits fee charge information for a processing of charging the user a fee issued by purchase of the specific package medium to the accounting server 1008 continuously through the communication control unit 1092 and network interface 1093, thereby to make the accounting server 1008 execute a fee charge processing of charging the user a fee corresponding to the purchase of the specific package medium.

Further, upon completion of the fee charge processing for the user by the accounting server 1008, the control unit 1090 transmits purchase completion page information indicative of completion of the purchase processing of the package medium to the client terminal 1002 continuously through the communication control unit 1092 and network interface 1093.

(1-6) Function Circuit Block Configuration of the Radio Broadcast Information Distribution Server 1006

Figure 19:
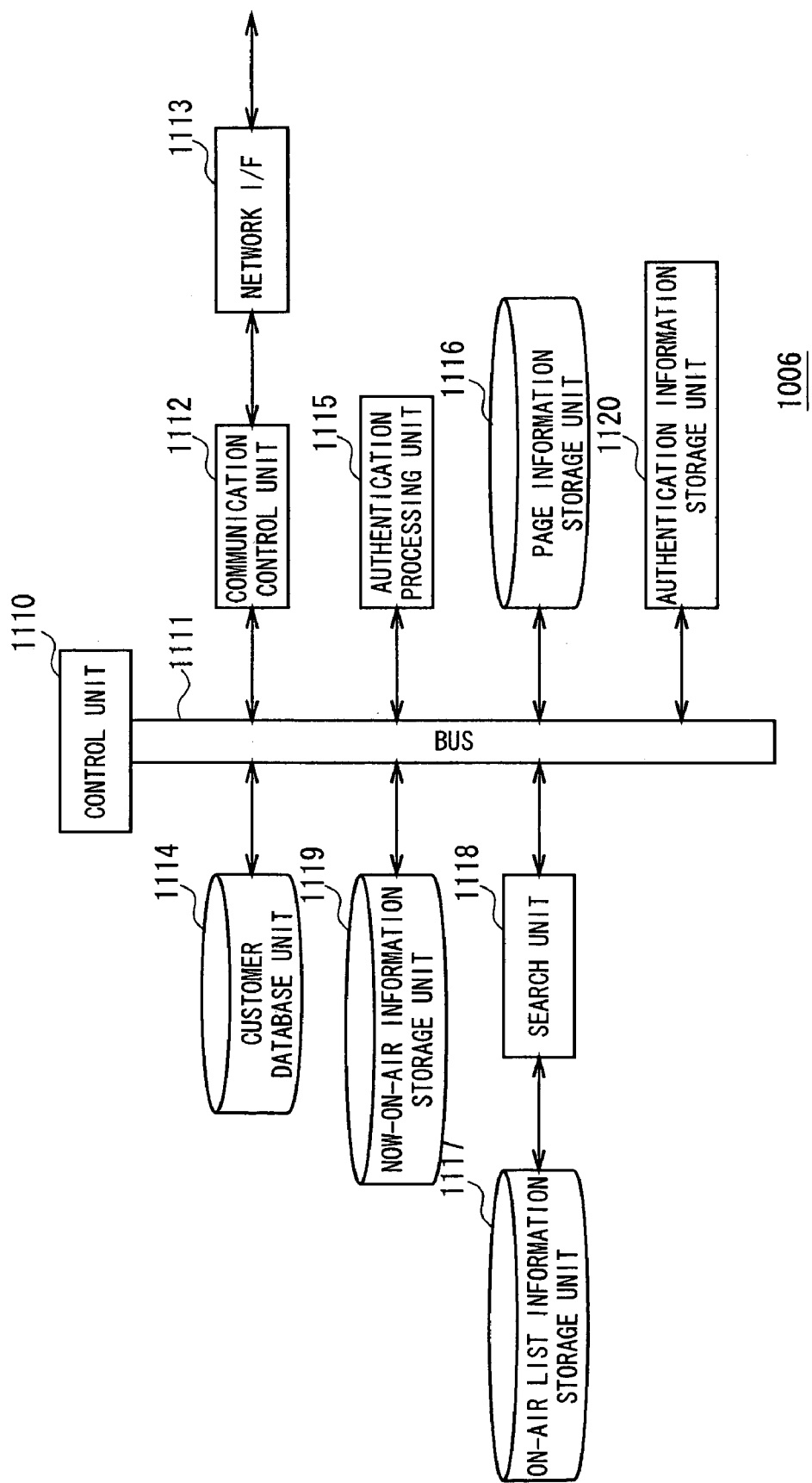
FIG. 19 is a block diagram showing the hardware configuration of function circuit blocks of a radio broadcast information distribution server.

Next, with reference to FIG. 19, a hardware configuration based on the function circuit blocks of the radio broadcast information distribution server 1006 will be described. A control unit 1110 in the radio broadcast information distribution server 1006 controls operations of respective circuits connected through a bus 1111.

A communication control unit 1112 transmits/receives various information to/from the client terminal 1002, the portal server 1003, and the like through a network interface 1113, under control from the control unit 1110.

User ID information and password information of users who have already signed up a contract with the management agency of the radio broadcast information distribution server 1006 are linked to each other and registered as customer information in a customer database unit 1114. However, if an authentication processing unit 1115 has a function to perform an authentication processing for authenticating a user based on portal authentication result information issued from the portal server 1003 and transmitted from the client terminal 1002, there is no need of providing the customer database unit 1114.

A page information storage unit 1116 stores page information or the like for on-air list information distribution, which is used to obtain radio broadcast information (hereinafter called particularly on-air list information) managed by the radio broadcast information distribution server 1006 and concerning radio programs already broadcasted from radio stations corresponding to the radio broadcast information distribution server 1006.

Note that the page information for on-air list information distribution is written in the XML language or the like, and includes input boxes and the like as which allow the user using the client terminal 1002 to input date/time information of a radio program, a program name, or the like as a search key for the on-air list information which the user desires to obtain.

An on-air list information storage unit 1117 stores on-air list information generated by listing program names of radio programs which have already been broadcasted from the radio stations corresponding to the radio broadcast information distribution server 1006, program broadcast start time and end time thereof, titles, artist names, and song broadcast start time of songs broadcasted in the radio programs, and the like.

When the control unit 1110 receives a page information obtaining request signal for requesting page information for on-air list information distribution, which is transmitted from the client terminal 1002, through the network interface 1113 and communication control unit 1112, the control unit 1110 transmits page information for on-air list information distribution stored in the page information storage unit 1116, to the client terminal 1002 continuously through the communication control unit 1112 and network interface 1113, in response to the received page information obtaining request signal.

As a result, the on-air list information request signal containing a search key for searching for desired on-air list information which the user desires to obtain, and requesting download of the on-air list information is transmitted from the client terminal 1002, wherein the search key is inputted on the page information for on-air list information distribution. A search unit 1118 receives the on-air list information request signal continuously through the network interface 1113 and communication control unit 1112, and then picks up the search key from the received on-air list information request signal.

Then, based on the search key, the search unit 1118 searches for, as on-air list information which the user desires to obtain, such part of a predetermined range which coincides with a search condition suggested by the search key, among the entire on-air list information in the on-air list information storage unit 1117.

Thus, the control unit 1110 transmits the desired on-air list information to be obtained, which has thus been searched for, to the client terminal 1002 continuously through the communication control unit 1112 and network interface 1113.

A now-on-air list information storage unit 1119 stores now-on-air information which includes program names of radio programs which are currently broadcasted from the radio stations corresponding to the radio broadcast information distribution server 1006, program broadcast start time and end time thereof, titles, artist names, and song broadcast start time of songs being currently broadcasted in the radio programs, and the like.

When an authentication processing unit 1115 receives user ID information and password information of the user using the client terminal 1002, which are transmitted together with the now-on-air information request signal requesting obtaining of now-on-air information from the client terminal 1002, continuously though the network interface 1113 and communication control unit 1112, the authentication processing unit 1115 confirms whether or not the received user ID information and password information have been registered as customer information in a customer database unit 1114, as a user authentication processing.

In another user authentication method different from the user authentication processing using the user ID information and password information, the authentication processing unit 1115 receives portal authentication result information (e.g., an authentication ticket described later) issued by the portal server 1003 and transmitted from the client terminal 1002 continuously through the network interface 1113 and communication control unit 1112. The unit 1115 then transmits the received portal authentication result information to the portal server 1003 continuously through the communication control unit 1112 and network interface 1113.

In response to the transmission of the portal authentication result information to the portal server 1003, the authentication processing unit 1115 receives confirmation result information returned from the portal server 1003, as a result of execution of an authentication processing (the confirmation processing described above) on the portal authentication result information, continuously through the network interface 1113 and communication control unit 1112. Based on the received confirmation result information, the authentication processing unit 1115 confirms whether or not the user is a valid user who has signed up a contract with the management agency of the music-related service providing system 1000.

Upon completion of the user authentication processing, the authentication processing unit 1115 issues server authentication result information (e.g., service session ID information described later) indicative of a result of the user authentication processing.

At this time, if the user is authenticated as a valid user as a result of the user authentication processing by the authentication processing unit 1115, the control unit 1110 transmits now-on-air information which is stored in the now-on-air information storage unit 1119, together with server authentication result information, to the client terminal 1002 continuously through the communication control unit 1112 and network interface 1113.

Otherwise, if the user is not authenticated as a valid user as a result of the user authentication processing by the authentication processing unit 1115, the control unit 1110 transmits authentication error information together with authentication failure notification page information indicative of a failure in the authentication, which is stored in the page information storage unit 1116, to the client terminal 1002 continuously though the communication control unit 1112 and network interface 1113.

Thus, when obtaining of now-on-air information is requested from a user and the user is then authenticated as a valid user, the control unit 1110 distributes now-on-air information. However, when the user is not authenticated as a valid user, the control unit 1110 does not allow the user to receive the radio broadcast information distribution service such as a now-on-air information distribution service provided by the radio broadcast information distribution server 1006.

Meanwhile, an authentication information storage unit 1120 temporarily stores server authentication result information issued by the authentication processing unit 1115, and also stores various authentication information which the authentication processing unit 1115 requires when performing a user authentication processing for the user using the client terminal 1002.

(1-7) Outlines of Processings in Servers

Next, with reference to sequence charts shown in FIGS. 20 to 25, descriptions will be made of processings executed between the client terminal 1002 and the portal server 1003, and processings executed between the client terminal 1002 and the other servers including the music data distribution server 1004, sales server 1005, and radio broadcast information distribution server 1006.

(1-7-1) A Procedure of User Authentication Processing Between the Client Terminal 1002 and the Portal Server 1003

Figure 20:
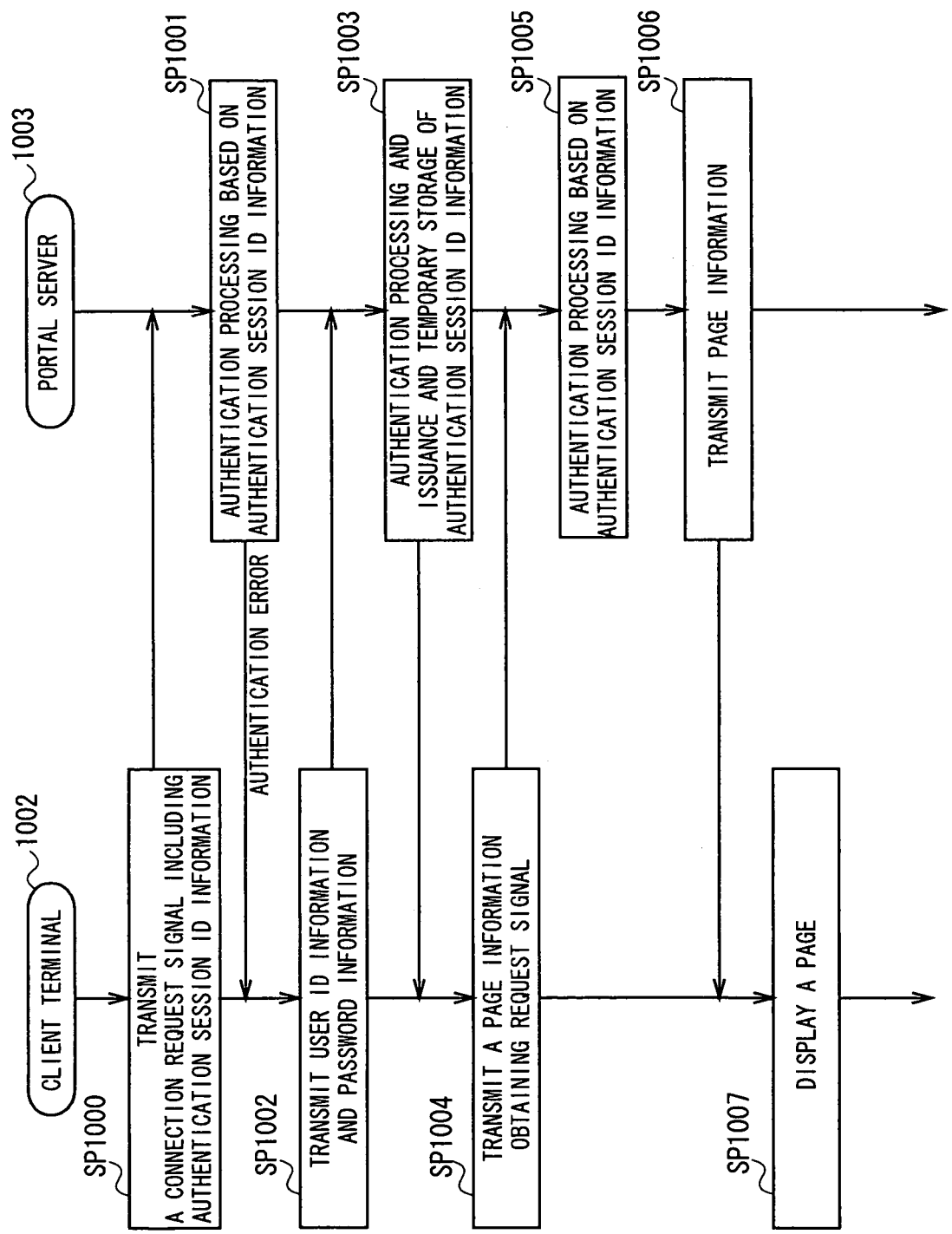
FIG. 20 is a sequence chart showing a user authentication processing procedure between the client terminal and the portal server.

At first, the user authentication processing executed between the client terminal 1002 and the portal server 1003 will be described with reference to FIG. 20.

The control unit 1023 in the client terminal 1002 of a user who has signed up a contract with the management agency of the music-related service providing system 1000 starts an authentication request processing when an operation of powering on the client terminal 1002 is taken or the user presses down a specific operation button of the operation input unit 1020 and an operation input signal recognized by the operation input unit 1020 is converted by the input processing unit 1021 into an operation command and then supplied.

As the client terminal 1002 starts the authentication request processing, the control unit 1023 generates a connection request signal containing authentication session ID information or the like temporarily stored in the authentication information storage unit 1038, in step SP1000, and transmits the generated connection request signal to the portal server 1003 continuously through the communication control unit 1032 and the network interface 1033.

Note that the authentication session ID information is identification information which is issued by the portal server 1003 to identify individual communication connection states (i.e., sessions) whenever the client terminal 1002 and the portal server 1003 connect for communications to execute various processings such as a user authentication processing and the like.

Where used for the user authentication processing or the like, the authentication session ID information has a predetermined validity period (e.g., 1 minute or so) with reference to the time point of issue from the portal server 1003.

Therefore, if the authentication session ID information cannot be presented to the portal server 1003 within the validity period, the client terminal 1002 which has obtained authentication session ID information from the portal server 1003 determines that the communication connection status specified by the authentication session ID information is disconnected by the portal server 1003.

Thus, the portal server 1003 prevents authentication session ID information issued in the past from being illegally used for the user authentication processing or the like by users who have not signed up any contract with the management agency of the music-related service providing system 1000.

The authentication session ID information temporarily stored in the authentication information storage unit 1038 was issued from the portal server 1003 when the client terminal 1002 and the portal server 1003 once connected for communications to execute a user authentication processing or the like.

As the connection request signal is transmitted from the client terminal 1002, the control unit 1050 of the portal server 1003 receives the connection request signal continuously through the network interface 1053 and communication control unit 1052, in step SP1001, and transmits authentication session ID information contained in the received connection request signal, to the authentication processing unit 1056.

Further, the authentication processing unit 1056 executes a user authentication processing based on the authentication session ID information received as a connection request signal from the client terminal 1002, under control from the control unit 1050.

As a result, if the authentication processing unit 1056 cannot authenticate the user using the client terminal 1002 as a valid user due to expiration of the validity period of the authentication session ID information received from the client terminal 1002 or the like, the control unit 1050 transmits authentication error information indicative of the error in authentication, to the client terminal 1002 continuously through the communication control unit 1052 and network interface 1053.

In step SP1002, the control unit 1023 of the client terminal 1002 receives the authentication error information transmitted from the portal server 1003 continuously through the network interface 1033 and communication control unit 1032. In response to this information, the control unit 1023 reads user ID information, password information, and the like stored in an authentication information storage unit 1038, and transmits the read user ID information, password information, and the like to the portal server 1003 continuously through the communication control unit 1032 and the network interface 1033.

In step SP1003, the control unit 1050 of the portal server 1003 receives the user ID information, password information, and the like transmitted from the client terminal 1002 continuously through the network interface 1053 and the communication control unit 1052, and transmits the received user ID information, password information, and the like to the authentication processing unit 1056.

Then, the authentication processing unit 1056 detects whether or not the user ID information, password information, and the like received from the client terminal 1002 are included in customer information registered in the customer database unit 1054, as a user authentication processing under control from the control unit 1050.

As a result, if the user using the client terminal 1002 is authenticated as a valid user, the authentication processing unit 1056 issues, as portal authentication result information, authentication session ID information and the like with respect to the current communication connection state between the client terminal 1002 and the portal server 1003, under control from the control unit 1050, and temporarily stores the authentication session ID information and the like issued to the client terminal 1002, into the authentication information storage unit 1057.

Then, the control unit 1050 transmits the authentication session ID information and the like issued to the client terminal 1002 by the authentication processing unit 1056, to the client terminal 1002 continuously through the communication control unit 1052 and the network interface 1053.

In step SP1004, the control unit 1023 of the client terminal 1002 receives the authentication session ID information and the like transmitted from the portal server 1003 continuously through the network interface 1033 and the communication control unit 1032, and sends the received authentication session ID information and the like to the authentication processing unit 1037.

Further, the authentication processing unit 1037 temporarily stores the authentication session ID information and the like received from the portal server 1003 into the authentication information storage unit 1038, under control from the control unit 1023.

The control unit 1023 then transmits the page information obtaining request signal for requesting page information from the portal server 1003, together with the authentication session ID information and the like received from the portal server 1003 and temporarily stored in the authentication information storage unit 1038, to the portal server 1003 continuously through the communication control unit 1032 and network interface 1033.

In step SP1005, the control unit 1050 of the portal server 1003 receives the page information obtaining request signal, authentication session ID information, and the like transmitted from the client terminal 1002, continuously through the network interface 1053 and communication control unit 1052, and sends the received authentication session ID information and the like, to the authentication processing unit 1056.

The authentication processing unit 1056 hence executes a user authentication processing by comparing the authentication session ID information and the like received from the client terminal 1002, with the authentication session ID information and the like issued to the client terminal 1002 and temporarily stored in the authentication information storage unit 1057 in step SP1003, under control from the control unit 1050.

As a result, if the user using the client terminal 1002 is authenticated as a valid user, the authentication processing unit 1056 determines that the obtaining request for page information from the client terminal 1002 is an authorized request and extends the validity period of the authentication session ID information and the like issued to the client terminal 1002, in step SP1006.

The control unit 1050 hence reads the page information which has been requested from the user, from the page information storage unit 1055, and transmits the read page information together with the authentication session ID information and the like having the extended validity period, to the client terminal 1002 continuously through the communication control unit 1052 and network interface 1053.

The control unit 1023 of the client terminal 1002 receives the page information transmitted from the portal server 1003 and the authentication session ID information and the like having the extended validity period continuously through network interface 1033 and the communication control unit 1032, and sends the received page information to the page information generation unit 1036 as well as the authentication session ID information and the like having the extended validity period to the authentication processing unit 1037, in step SP1007.

Based on the page information given from the control unit 1023, the page information generation unit 1036 generates video data of a page in which links to the music data distribution server 1004, sales server 1005, and radio broadcast information distribution server 1006 are embedded, and sends the generated video data to the display control unit 1024.

The display control unit 1024 performs a digital/analog conversion processing on the video data supplied from the page information generation unit 1036, and sends analog video signals thus obtained to the display unit 1025, thereby to make the display unit 1025 display the page of the portal server 1003 as a video based on the analog video signals.

Also, the authentication processing unit 1037 temporarily stores the authentication session ID information and the like having the extended validity period and received from the portal server 1003, into the authentication information storage unit 1038, by overwriting the authentication session ID information and the like before extension of the validity period, under control from the control unit 1023. In this manner, the authentication session ID information and the like temporarily stored in the foregoing step SP1004 is updated to the authentication session ID information and the like having the extended validity period.

(1-7-2) A Procedure of the User Authentication Processing Between the Client Terminal 1002 and Each of the Servers 1004 to 1006

Next, with reference to FIG. 21, a description will be made of the user authentication processing executed between the client terminal 1002 and the music data distribution server 1004, sales server 1005, and radio broadcast information distribution server 1006.

In this case, there is a user authentication processing of this kind (hereinafter called an indirect access authentication processing) which is executed in a manner that the client terminal 1002 once obtains page information from the portal server 1003 as described previously with reference to FIG. 20 and subsequently accesses the music data distribution server 1004, sales server 1005, and radio broadcast information distribution server 1006, according to links embedded in the page information.

There is another user authentication processing of this kind (hereinafter called a direct access authentication processing) which is executed in a manner that the client terminal 1002 does not obtain page information from the portal server 1003 but directly accesses the music data distribution server 1004, sales server 1005, and radio broadcast information distribution server 1006, according to URL information and the like registered as bookmarks in advance.

The indirect access authentication processing can be carried out in the same manner as described above whichever of the music data distribution server 1004, sales server 1005, and radio broadcast information distribution server 1006 is combined with the client terminal 1002.

The direct access authentication processing can also be carried out in the same manner as described above whichever of the music data distribution server 1004, sales server 1005, and radio broadcast information distribution server 1006 is combined with the client terminal 1002.

Between the indirect and direct access authentication processings, the only difference is in the method of obtaining URL information used to access the music data distribution server 1004, sales server 1005, and radio broadcast information distribution server 1006 from the client terminal 1002. After obtaining the URL information, both the indirect and direct access authentication processings can be carried out in the same procedure.

Therefore, in the following, the music data distribution server 1004 is taken as a representative access destination in order to simplify the following description, and the direct and indirect access authentication processings are explained together representatively as one user authentication processing.

At first, in step SP1010, the control unit 1023 of the client terminal 1002 transmits service session ID information and the like read from the authentication information storage unit 1038, together with a page information obtaining request signal for requesting and obtaining page information for music data distribution (which can be replaced respectively with page information for package media sales and page information for on-air list information distribution in case of the sales server 1005 and the radio broadcast information distribution server 1006), to the music data distribution server 1004 continuously through the communication control unit 1032 and network interface 1033, in accordance with the URL information embedded as a link in page information or the URL information or the like registered in advance as a bookmark.

Note that the service session ID information is identification information which is issued by the music data distribution server 1004, sales server 1005, and radio broadcast information distribution server 1006 accessed from the client terminal 1002 to identify individual communication connection states (i.e., sessions) whenever the client terminal 1002 connects to the music data distribution server 1004, sales server 1005, and radio broadcast information distribution server 1006 for communications to execute various processings such as a user authentication processing and the like.

Where used for the user authentication processing or the like, the service session ID information has a predetermined validity period (e.g., 1 minute or so) with reference to the time point of issue from the music data distribution server 1004, sales server 1005, or radio broadcast information distribution server 1006, like the authentication session ID information described previously.

Therefore, if the service session ID information cannot be presented to the music data distribution server 1004, sales server 1005, or the radio broadcast information distribution server 1006 as an issuer within the validity period, the client terminal 1002 which has obtained the service session ID information from any of the servers 1004 to 1006 determines that the communication connection status specified by the service session ID information is disconnected by the music data distribution server 1004, sales server 1005, or the radio broadcast information distribution server 1006 as the issuer.

Thus, the music data distribution server 1004, sales server 1005, and the radio broadcast information distribution server 1006 prevent service session ID information issued in the past from being illegally used for the user authentication processing or the like by users who have not signed up any contract with the management agency of the music-related service providing system 1000.

The service session ID information temporarily stored in the authentication information storage unit 1038 was issued from the music data distribution server 1004, sales server 1005, or radio broadcast information distribution server 1006 as the access destination when the client terminal 1002 connected to the music data distribution server 1004, sales server 1005, or the radio broadcast information distribution server 1006 for communications to execute a user authentication processing or the like.

In step SP1011, the control unit 1070 of the music data distribution server 1004 receives the page information obtaining request signal, service session ID information, and the like transmitted from the client terminal 1002, continuously through the network interface 1073 and the communication control unit 1072, and sends the received service session ID information and the like to the authentication processing unit 1075.

The authentication processing unit 1075 hence executes an user authentication processing by comparing the service session ID information and the like received from the client terminal 1002, with the service session ID information and the like which has already been temporarily stored in the authentication information storage unit 1077, under control from the control unit 1070.

As a result, if the authentication processing unit 1075 cannot authenticate the user using the client terminal 1002 as a valid user, for example, because the validity period of the service session ID information received from the client terminal 1002 has already expired, the authentication processing unit 1075 determines that the request from the client terminal 1002 for obtaining page information for music data distribution is not a valid request.

Further, if the authentication processing unit 1075 thus cannot authenticate the user using the client terminal 1002 as a valid user, the control unit 1070 transmits authentication error information indicative of the error in authentication and a shop code identifying the music data distribution server 1004, to the client terminal 1002 continuously through the communication control unit 1072 and network interface 1073.

In step SP1012, the control unit 1023 of the client terminal 1002 receives the authentication error information and shop code transmitted from the music data distribution server 1004 continuously through the network interface 1033 and communication control unit 1032. From the authentication error information received, the control unit 1023 recognizes that the user has not been authenticated as a valid user by the music data distribution server 1004, and the control unit 1023 temporarily stores the shop code received from the music data distribution server 1004 into the authentication information storage unit 1038.

Then, the control unit 1023 generates an authentication ticket issuance request signal which requests issuance of an authentication ticket from the portal server 1003 to access the music data distribution server 1004, and transmits the generated authentication ticket issuance request signal together with the shop code of the music data distribution server 1004 and the authentication session ID information received already from the portal server 1003 and stored temporarily in the authentication information storage unit 1038, to the portal server 1003 continuously through the communication control unit 1032 and network interface 1033.

In step SP1013, the control unit 1050 of the portal server 1003 receives the authentication ticket issuance request signal, the shop code, and the authentication session ID information transmitted from the client terminal 1002, continuously through the network interface 1053 and communication control unit 1032, and sends them to the authentication processing unit 1056.

The authentication processing unit 1056 hence executes an user authentication processing by comparing the authentication session ID information and the like received from the client terminal 1002, with the authentication session ID information and the like stored already in the authentication information storage unit 1057, under control from the control unit 1050.

As a result, if the authentication processing unit 1056 cannot authenticate the user using the client terminal 1002 as a valid user, for example, because the validity period of the authentication session ID information received from the client terminal 1002 has already expired, the authentication processing unit 1056 determines that the request from the client terminal 1002 for issuance of an authentication ticket is not a valid request.

Further, if the authentication processing unit 1056 thus cannot authenticate the user using the client terminal 1002 as a valid user, the control unit 1050 transmits authentication error information indicative of the error in authentication to the client terminal 1002 continuously through the communication control unit 1052 and network interface 1053.

Otherwise, if the user using the client terminal 1002 is authenticated as a valid user, for example, because the validity period of the authentication session ID information received from the client terminal 1002 has not yet expired, the authentication processing unit 1056 determines that the request from the client terminal 1002 for issuance of an authentication ticket is a valid request.

If the user using the client terminal 1002 is thus authenticated as a valid user by the authentication processing unit 1056, the control unit 1050 goes to step SP1018 described later.

In step SP1014, the control unit 1023 of the client terminal 1002 receives the authentication error information transmitted from the portal server 1003 continuously through the network interface 1033 and communication control unit 1032. Then, the control unit 1023 reads user ID information, password information, and the like stored in the authentication information storage unit 1038, and transmits the read user ID information, password information, and the like to the portal server 1003 continuously through the communication control unit 1032 and the network interface 1033.

In step SP1015, the control unit 1050 of the portal server 1003 receives the user ID information, password information, and the like transmitted from the client terminal 1002 continuously through the network interface 1053 and the communication control unit 1052, and sends the received user ID information, password information, and the like to the authentication processing unit 1056.

The authentication processing unit 1056 hence detects whether or not the user ID information, password information, and the like received from the client terminal 1002 are included in customer information registered in the customer database unit 1054, thus executing a user authentication processing, under control from the control unit 1050.

As a result, if the user using the client terminal 1002 is authenticated as a valid user, the authentication processing unit 1056 issues, as portal authentication result information, authentication session ID information and the like with respect to the current communication connection state between the client terminal 1002 and the portal server 1003, under control from the control unit 1050, and temporarily stores the authentication session ID information and the like issued to the client terminal 1002, into the authentication information storage unit 1057.

Then, the control unit 1050 transmits the authentication session ID information and the like issued to the client terminal 1002 by the authentication processing unit 1056, to the client terminal 1002 continuously through the communication control unit 1052 and the network interface 1053.

In step SP1016, the control unit 1023 of the client terminal 1002 receives the authentication session ID information and the like transmitted from the portal server 1003 continuously through the network interface 1033 and the communication control unit 1032, and temporarily stores the received authentication session ID information and the like into the authentication information storage unit 1038.

The control unit 1023 then generates an authentication ticket issuance request signal which requests issuance of an authentication ticket from the portal server 1003, and transmits the generated authentication ticket issuance request signal together with the shop code already stored temporarily in the authentication information storage unit 1038 and the authentication session ID information and the like also stored temporarily at this time, to the portal server 1003 continuously through the communication control unit 1032 and network interface 1033.

In the present embodiment, the shop code has been temporarily stored in the authentication information storage unit 1038 in the client terminal 1002. The embodiment is not limited hitherto but it is possible to transmit the shop code to the portal server 1003 in step SP1016 without temporarily storing the shop code into the authentication information storage unit 1038 in the client terminal 1002 if the shop code is continuously transmitted/received when the processings from step SP1012 to step SP1016 are executed between the client terminal 1002 and the portal server 1003.

In step SP1017, the control unit 1050 of the portal server 1003 receives the authentication ticket issuance request signal, shop code, authentication session ID information, and the like transmitted from the client terminal 1002, continuously through the network interface 1053 and communication control unit 1052, and sends them to the authentication processing unit 1056.

The authentication processing unit 1056 hence executes a user authentication processing by comparing the authentication session ID information and the like received from the client terminal 1002, with the authentication session ID information and the like already stored temporarily in the authentication information storage unit 1057, under control from the control unit 1050.

As a result, if the user using the client terminal 1002 is authenticated as a valid user, for example, because the validity period of the authentication session ID information received from the client terminal 1002 has not yet expired, the authentication processing unit 1056 determines that the request from the client terminal 1002 for issuance of an authentication ticket is a valid request.

If the user using the client terminal 1002 is thus authenticated as a valid user by the authentication processing unit 1056, the control unit 1050 goes to the next step SP1018 described later.

In step SP1018, the authentication processing unit 1056 issues an authentication ticket and the like, as portal authentication result information which enable access to the music data distribution server 1004 designated by the shop code, based on the shop code and authentication ticket issuance request signal received from the client terminal 1002 in the foregoing step SP1017, under control from the control unit 1050.

The authentication processing unit 1056 temporarily stores the issued authentication ticket and the like into the authentication information storage unit 1057, and extends the validity period of the authentication session ID information and the like issued to the client terminal 1002, under control from the control unit 1050.

Hence, the control unit 1050 transmits the authentication ticket and the like together with the authentication session ID information and the like having a validity period extended by the authentication processing unit 1056, to the client terminal 1002 continuously through the communication control unit 1052 and network interface 1053.

In step SP1019, the control unit 1023 of the client terminal 1002 receives the authentication ticket and the like transmitted from the portal server 1003, and the authentication session ID information and the like having the extended validity period, continuously through the network interface 1033 and the communication control unit 1032, and sends the received authentication session ID information and the like to the authentication processing unit 1037.

Then, the control unit 1023 transmits the authentication ticket and the like received from the portal server 1003, together with an authentication request signal, to the music data distribution server 1004 continuously through the communication control unit 1032 and network interface 1033.

Also, the authentication processing unit 1037 temporarily stores the authentication session ID information and the like having the extended validity period and received from the portal server 1003, into the authentication information storage unit 1038, by overwriting the authentication session ID information and the like before extension of the validity period, under control from the control unit 1023. In this manner, the authentication session ID information and the like temporarily stored in the foregoing step SP1016 are updated to the authentication session ID information and the like having the extended validity period.

In step SP1020, the control unit 1070 of the music data distribution server 1004 receives the authentication request signal, authentication ticket, and the like transmitted from the client terminal 1002, continuously through the network interface 1073 and communication control unit 1072.

The control unit 1070 then transmits the authentication ticket and the like received from the client terminal 1002, together with an authentication ticket confirmation request signal for requesting confirmation of the authentication ticket and the like, to the portal server 1003 continuously through the communication control unit 1072 and network interface 1073.

In step SP1021, the control unit 1050 of the portal server 1003 receives the authentication ticket confirmation request signal, authentication ticket, and the like transmitted from the music data distribution server 1004, continuously through the network interface 1053 and communication control unit 1052, and sends the received authentication ticket confirmation request signal, authentication ticket, and the like to the authentication processing unit 1056.

Then, in response to the authentication ticket confirmation request signal, the authentication processing unit 1056 executes a confirmation processing on the authentication ticket received from the music data distribution server 1004, by comparing the authentication ticket and the like received from the music data distribution server 1004 with the authentication ticket and the like temporarily stored already in the authentication information storage unit 1057, under control from the control unit 1050.

As a result, if the authentication processing unit 1056 confirms that the authentication ticket and the like received from the music data distribution server 1004 are a valid authentication ticket and the like, the control unit 1050 transmits confirmation result information indicating that the authentication ticket and the like are a valid authentication ticket and the like, to the music data distribution server 1004 continuously through the communication control unit 1052 and network interface 1053.

In step SP1022, the control unit 1070 of the music data distribution server 1004 receives the confirmation result information transmitted from the portal server 1003, continuously through the network interface 1073 and communication control unit 1072, and sends the received confirmation result information to the authentication processing unit 1075.

In response to the confirmation result information, the authentication processing unit 1075 hence issues service session ID information and the like, as server authentication result information, with respect to the communication connection state at present between the client terminal 1002 and the music data distribution server 1004, under control from the control unit 1070, and temporarily stores the issued service session ID information and the like into the authentication information storage unit 1077.

Also, the control unit 1070 transmits the service session ID information and the like issued to the client terminal 1002 from the authentication processing unit 1075, to the client terminal 1002 continuously through the communication control unit 1072 and network interface 1073.

In step SP1023, the control unit 1023 of the client terminal 1002 receives the service session ID information and the like transmitted from the music data distribution server 1004, continuously through the network interface 1033 and communication control unit 1032, and temporarily stores the received service session ID information and the like into the authentication information storage unit 1038 by the authentication processing unit 1037.

The control unit 1023 hence transmits a page information obtaining request signal which requests page information for music data distribution, together with the service session ID information and the like received from the music data distribution server 1004 and temporarily stored in the authentication information storage unit 1038, to the music data distribution server 1004 continuously through the communication control unit 1032 and network interface 1033.

In step SP1024, the control unit 1070 of the music data distribution server 1004 receives the page information obtaining request signal, service session ID information, and the like transmitted from the client terminal 1002, continuously through the network interface 1073 and communication control unit 1072, and sends the received service session ID information and the like to the authentication processing unit 1075.

The authentication processing unit 1075 hence executes an user authentication processing by comparing the service session ID information and the like received from the client terminal 1002, with the service session ID information and the like issued to the client terminal 1002 in step SP1022 and already stored temporarily in the authentication information storage unit 1077, under control from the control unit 1070.

As a result, if the user using the client terminal 1002 is authenticated as a valid user, for example, because the validity period of the service session ID information and the like received from the client terminal 1002 has not yet expired, the authentication processing unit 1075 determines that the request from the client terminal 1002 for obtaining page information for music data distribution is a valid request.

If the user using the client terminal 1002 is thus authenticated as a valid user by the authentication processing unit 1075, the control unit 1070 goes to the next step SP1025.

In step SP1025, the control unit 1070 reads from the page information storage unit 1076 the page information for music data distribution, which has been requested from the user, and extends the validity period of the service session ID information and the like issued to the client terminal 1002, by the authentication processing unit 1075.

Further, the control unit 1070 transmits the page information for music data distribution, read from the page information storage unit 1076, together with the service session ID information and the like having the validity period extended by the authentication processing unit 1075, to the client terminal 1002 continuously through the communication control unit 1072 and network interface 1073.

In step SP1026, the control unit 1023 of the client terminal 1002 receives the page information for music data distribution transmitted from the music data distribution server 1004 and the service session ID information and the like having the extended validity period, continuously through the network interface 1033 and communication control unit 1032, sends the received page information for music data distribution to the page information generation unit 1036, and sends the service session ID information and the like received from the music data distribution server 1004 to the authentication processing unit 1037.

Hence, the authentication processing unit 1037 temporarily stores the service session ID information and the like having the extended validity period and received from the music data distribution server 1004, into the authentication information storage unit 1038, by overwriting the service session ID information and the like before extension of the validity period, under control from the control unit 1023. In this manner, the service session ID information and the like temporarily stored in the foregoing step SP1023 are updated to the service session ID information and the like having the extended validity period.

In addition, the page information generation unit 1036 generates video data based on the page information for music data distribution, and sends the video data to the display control unit 1024.

The display control unit 1024 hence performs a digital/analog conversion processing on the video data supplied from the page information generation unit 1036, and sends analog video signals thus obtained, to the display unit 1025, to display a page for music data distribution as a video based on the analog video signals, on the display unit 1025.

(1-7-3) Music-Related Service Providing Processing

With reference to next FIG. 22 to FIG. 25, a description will be made of a music-related service providing processing to be performed when the client terminal 1002 receives a music data distribution service, sales service, or radio broadcast information distribution service with use of the page information for music data distribution, page information for package media sales, page information for on-air list information distribution, or the like from the music data distribution server 1004, sales serer 1005 or radio broadcast information distribution server 1006 through the user authentication processing procedure, after completion of the user authentication processing procedure described above with reference to FIG. 21 and executed between the client terminal 1002 and the music data distribution server 1004, sales server 1005, or radio broadcast information distribution server 1006.

(1-7-3-1) Music Data Distribution Service Providing Procedure

Figure 22:
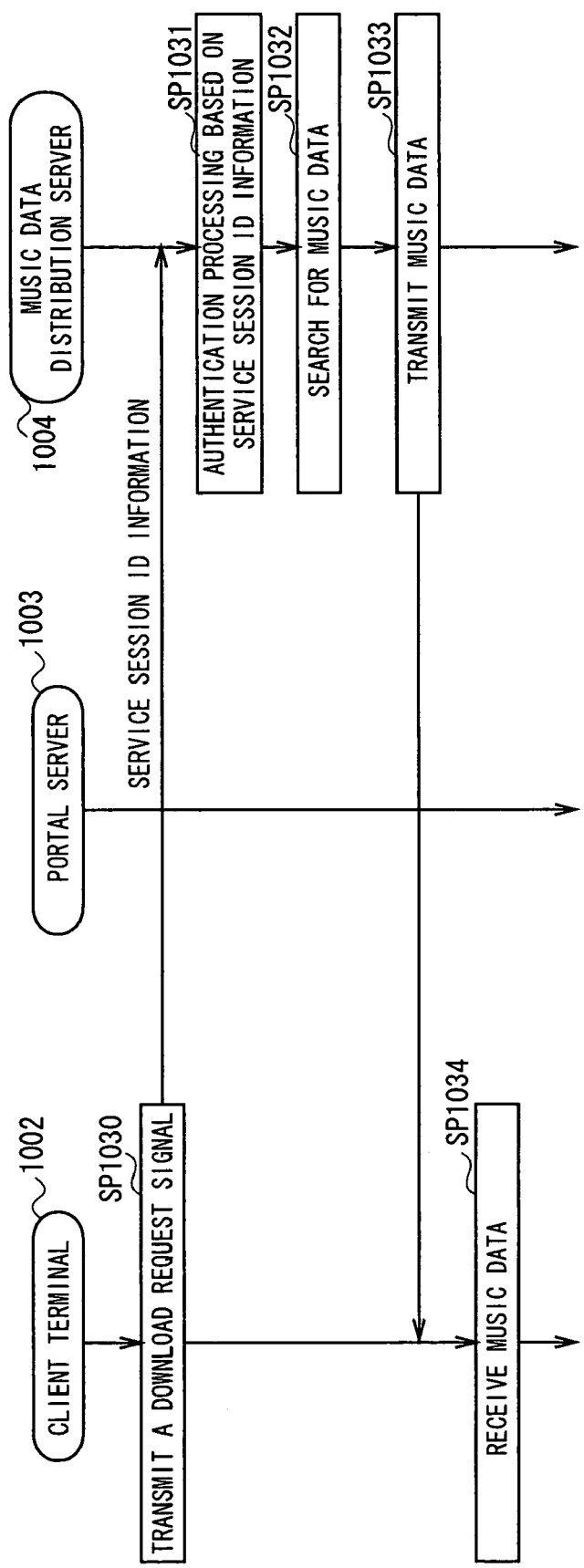
FIG. 22 is a sequence chart showing a music data distribution service providing processing procedure.

At first, with reference to FIG. 22, a description will be made of the procedure of processing of providing the music data distribution service when the client terminal 1002 receives a music data distribution service from the music data distribution server 1004.

In step SP1030, the control unit 1023 of the client terminal 1002 generates a download request signal for requesting download of desired music data, in response to an inputted control command, when the control command to select part of a page for music data distribution displayed as a video on the display unit 1025 is inputted from the input processing unit 1021.

Then, the control unit 1023 transmits the download request signal together with service session ID information and the like issued by the music data distribution server 1004 and temporarily stored in the authentication information storage unit 1038, to the music data distribution server 1004 continuously through the communication control unit 1032 and network interface 1033.

In step SP1031, the control unit 1070 of the music data distribution server 1004 receives the download request signal, service session ID information, and the like transmitted from the client terminal 1002, continuously through the network interface 1073 and communication control unit 1072, and sends the service session ID information and the like to the authentication processing unit 1075.

The authentication processing unit 1075 hence executes a user authentication processing by comparing the service session ID information and the like received from the client terminal 1002, with the service session ID information and the like already stored temporarily in the authentication information storage unit 1077, under control from the control unit 1070.

As a result, if the user who has requested the download of music data with use of the client terminal 1002 is authenticated as a valid user by the authentication processing unit 1075, the control unit 1070 goes to the next step SP1032.

In step SP1032, based on a search key included in the download request signal, the search unit 1079 searches for the desired music data to be downloaded, which satisfies a search condition suggested by the search key, among plural music data items in the music data storage unit 1078.

Further, as the music data is searched for by the search unit 1079, the control unit 1070 extends the validity period of the service session ID information and the like issued to the client terminal 1002, by the authentication processing unit 1075, and goes to the next step SP1033.

In step SP1033, the control unit 1070 reads the desired music data to be downloaded, which has been searched for by the search unit 1079 from the music data storage unit 1078, and transmits the desired music data thus read, together with the service session ID information and the like having the validity period extended by the authentication processing unit 1075, to the client terminal 1002 continuously through the communication control unit 1072 and network interface 1073.

In step SP1034, the control unit 1023 of the client terminal 1002 receives the desired music data to be downloaded, which has been transmitted from the music data distribution server 1004, and the service session ID information and the like having the extended validity period, continuously through the network interface 1033 and the communication control unit 1032. The control unit 1023 stores the received music data into the storage medium 1029 and sends the service session ID information and the like received from the music data distribution server 1004 to the authentication processing unit 1037.

The authentication processing unit 1037 temporarily stores the service session ID information and the like having the extended validity period and received from the music data distribution server 1004, into the authentication information storage unit 1038, by overwriting the service session ID information and the like before extension of the validity period, under control from the control unit 1023. In this manner, the service session ID information and the like already stored temporarily in the authentication information storage unit 1038 are updated to the service session ID information and the like having the extended validity period.

Thus, the client terminal 1002 can download music data which the user desires to obtain, by using the music data distribution service provided by the music data distribution server 1004.

(1-7-3-2) Sales Service Providing Procedure

Figure 23:
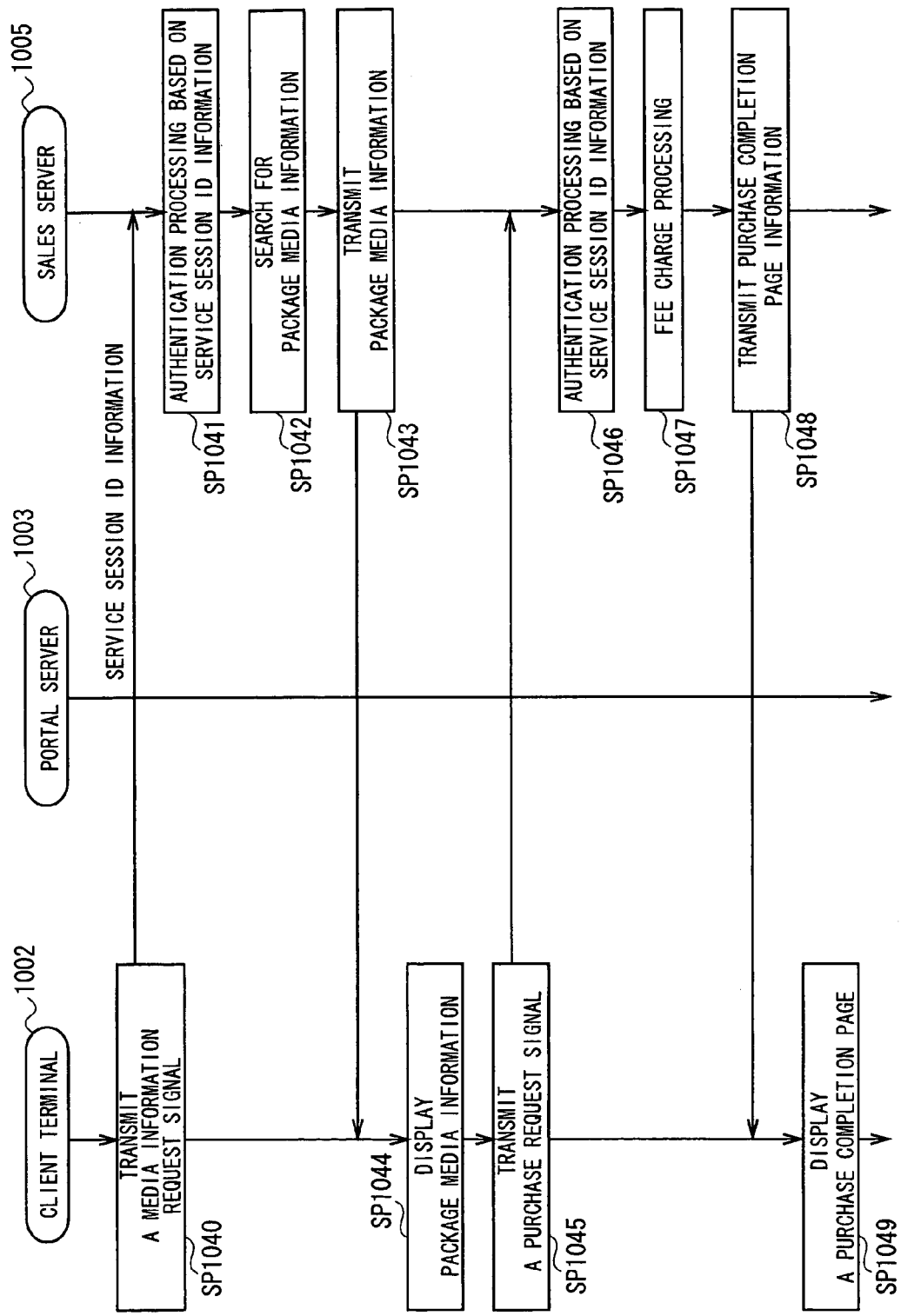
FIG. 23 is a sequence chart showing a sales service providing processing procedure.

Next, with reference to FIG. 23, a description will be made of the procedure of processing of providing sales service when the client terminal 1002 receives a sales service from the sales server 1005.

In step SP1040, when a control command to select part of a page for package media sales displayed as a video on the display unit 1025 is inputted from the input processing unit 1021, the control unit 1023 of the client terminal 1002 generates a media information request signal for requesting specific package media information corresponding to the inputted control command.

Then, the control unit 1023 transmits the media information request signal together with service session ID information and the like issued already by the sales server 1005 and temporarily stored in the authentication information storage unit 1038, to the sales server 1005 continuously through the communication control unit 1032 and network interface 1033.

In step SP1041, the control unit 1090 of the sales server 1005 receives the media information request signal, service session ID information, and the like transmitted from the client terminal 1002, continuously through the network interface 1093 and communication control unit 1092, and sends the service session ID information and the like to the authentication processing unit 1095.

The authentication processing unit 1095 hence executes an user authentication processing by comparing the service session ID information and the like received from the client terminal 1002, with the service session ID information and the like already stored temporarily in the authentication information storage unit 1097, under control from the control unit 1090.

As a result, if the user who has requested the package media information concerning a package medium with use of the client terminal 1002 is authenticated as a valid user by the authentication processing unit 1095, the control unit 1090 goes to the next step SP1042.

In step SP1042, based on a search key included in the media information request signal, the search unit 1099 searches for package media information of the specific package medium which satisfies a search condition suggested by the search key, among plural package media information items in the package media information storage unit 1098.

Further, as the package media information is searched for by the search unit 1099, the control unit 1090 extends the validity period of the service session ID information and the like issued to the client terminal 1002, by the authentication processing unit 1095, and goes to the next step SP1043.

In step SP1043, the control unit 1090 reads the package media information which has been searched for by the search unit 1099, and transmits the package media information thus read, together with the service session ID information and the like having the validity period extended by the authentication processing unit 1095, to the client terminal 1002 continuously through the communication control unit 1092 and network interface 1093.

In step SP1044, the control unit 1023 of the client terminal 1002 receives the package media information which has been transmitted from the sales server 1005, and the service session ID information and the like having the extended validity period, continuously through the network interface 1033 and the communication control unit 1032. The control unit 1023 sends the received package media information to the page information generation unit 1036, and sends the service session ID information and the like received from the sales server 1005 to the authentication processing unit 1037.

The authentication processing unit 1037 temporarily stores the service session ID information and the like having the extended validity period and received from the sales server 1005, into the authentication information storage unit 1038, by overwriting the service session ID information and the like before extension of the validity period, under control from the control unit 1023. In this manner, the service session ID information and the like already stored temporarily in the authentication information storage unit 1038 are updated to the service session ID information and the like having the extended validity period.

In addition, the page information generation unit 1036 generates video data based on the package media information supplied from the control unit 1023, converts the generated video data into analog video signals by the display control unit 1024, and sends the signals to the display unit 1025.

The control unit 1023 thus displays the package media information as a video based on the analog video signals, on the display unit 1025, and goes to the next step SP1045.

In step SP1045, when a control command requesting purchase of the package medium corresponding to the package media information displayed as a video on the display unit 1025 is inputted from the input processing unit 1021, the control unit 1023 generates a purchase request signal requesting purchase of the package medium corresponding to the inputted control command.

Then, the control unit 1023 transmits the purchase request signal together with service session ID information and the like already received from the sales server 1005 and temporarily stored in the authentication information storage unit 1038 (i.e., service session ID information and the like having an extended validity period), to the sales server 1005 continuously through the communication control unit 1032 and network interface 1033.

In step SP1046, the control unit 1090 of the sales server 1005 receives the purchase request signal and the service session ID information and the like transmitted from the client terminal 1002, continuously through the network interface 1093 and communication control unit 1092, and sends the received service session ID information and the like to the authentication processing unit 1095.

The authentication processing unit 1095 executes an user authentication processing by comparing the service session ID information and the like received from the client terminal 1002, with the service session ID information and the like already stored temporarily in the authentication information storage unit 1097, under control from the control unit 1090.

As a result, if the user who has requested the purchase of a package medium with use of the client terminal 1002 is authenticated as a valid user by the authentication processing unit 1095, the control unit 1090 goes to the next step SP1047.

In step SP1047, the control unit 1090 executes a purchase processing such as a procedure for shipping the requested package medium, for the user using the client terminal 1002, and transmits fee charge information for a processing of charging the user a fee issued by purchase of the package medium, to the accounting server 1008 continuously through the communication control unit 1092 and network interface 1093, thereby to make the accounting server 1008 execute a fee charge processing of charging the user a fee corresponding to the purchase of the package medium.

Also, the control unit 1090 makes the authentication processing unit 1095 extend the validity period of the service session ID information and the like issued to the client terminal 1002.

In step SP1048, after completion of the fee charge processing, the control unit 1090 transmits purchase completion page information indicative of completion of the purchase processing of the package medium, together with the service session ID information and the like having a validity period extended by the authentication processing unit 1095, to the client terminal 1002 continuously through the communication control unit 1092 and network interface 1093.

In step SP1049, the control unit 1023 of the client terminal 1002 receives the purchase completion page information and the service session ID information and the like transmitted from the sales server 1005, continuously through the network interface 1033 and communication control unit 1032, and sends the received purchase completion page information to the page information generation unit 1036 as well as the service session ID information and the like received from the sales server 1005 to the authentication processing unit 1037.

The authentication processing unit 1037 temporarily stores the service session ID information and the like having the extended validity period and received from the sales server 1005, into the authentication information storage unit 1038, by overwriting the service session ID information and the like before extension of the validity period, under control from the control unit 1023, thereby to update the contents of the service session ID information and the like already stored temporarily in the authentication information storage unit 1038.

In addition, the page information generation unit 1036 generates video data based on the purchase completion page information supplied from the control unit 1023, converts the generated video data into analog video signals by the display control unit 1024, and sends the signals to the display unit 1025.

The control unit 1023 thus displays a purchase completion page as a video based on the analog video signals, on the display unit 1025.

Thus, the client terminal 1002 allows users to purchase desired package media, with use of the sales service provided by the sales server 1005.

Figure 24:
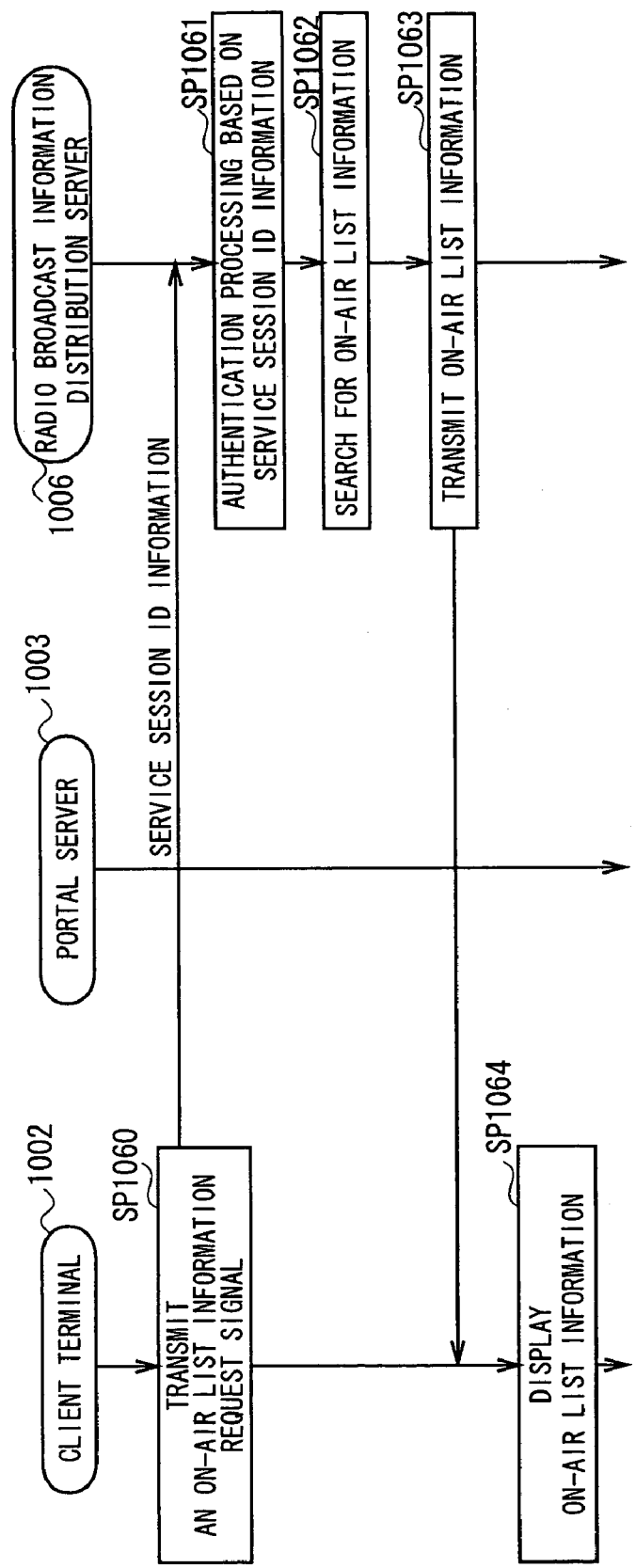
FIG. 24 is a sequence chart showing a radio broadcast information (on-air list information) distribution service providing processing procedure (1)

(1-7-3-3) On-Air List Information Distribution Service Providing Processing Procedure Next, with reference to FIG. 24, a description will be made of the procedure of processing of providing the radio broadcast information distribution service when the client terminal 1002 receives particularly an on-air list information distribution service as the radio broadcast information distribution service from the radio broadcast information distribution server 1006.

In step SP1060, when a search key for searching for desired on-air list information to be obtained is inputted to an input box on a page for on-air list information distribution, which is displayed as a video on the display unit 1025, and a control command corresponding to a string of letters indicating the inputted search key is inputted from the input processing unit 1021, the control unit 1023 of the client terminal 1002 generates an on-air list information request signal requesting download of the desired on-air list information to be downloaded.

Then, the control unit 1023 transmits the on-air list information request signal together with service session ID information and the like already received from the radio broadcast information distribution server 1006 and temporarily stored in the authentication information storage unit 1038, to the radio broadcast information distribution server 1006 continuously through the communication control unit 1032 and network interface 1033.

In step SP1061, the control unit 1110 of the radio broadcast information distribution server 1006 receives the on-air list information request signal and the service session ID information and the like transmitted from the client terminal 1002, continuously through the network interface 1113 and communication control unit 1112, and sends the received service session ID information and the like to the authentication processing unit 1115.

The authentication processing unit 1115 executes a user authentication processing by comparing the service session ID information and the like received from the client terminal 1002, with the service session ID information and the like already stored temporarily in the authentication information storage unit 1120, under control from the control unit 1110.

As a result, if the user who has requested the on-air list information with use of the client terminal 1002 is authenticated as a valid user by the authentication processing unit 1115, the control unit 1110 goes to the next step SP1062.

In step SP1062, based on the search key included in the on-air list information request signal, the search unit 1118 searches for part of a predetermined range which coincides with a search condition suggested by the search key, as the desired on-air list information to be obtained, from the entire on-air-list information.

Further, as the on-air list information is searched for by the search unit 1118, the control unit 1110 extends the validity period of the service session ID information and the like issued to the client terminal 1002, by the authentication processing unit 1115, and goes to the next step SP1063.

In step SP1063, the control unit 1110 reads the on-air list information which has been searched for by the search unit 1118, and transmits the on-air list information thus read, together with the service session ID information and the like having the validity period extended by the authentication processing unit 1115, to the client terminal 1002 continuously through the communication control unit 1112 and network interface 1113.

In step SP1064, the control unit 1023 of the client terminal 1002 receives the on-air list information which has been transmitted from the radio broadcast information distribution server 1006, and the service session ID information and the like having the extended validity period, continuously through the network interface 1033 and the communication control unit 1032. The control unit 1023 sends the received on-air list information to the page information generation unit 1036, and sends the service session ID information and the like received from the radio broadcast information distribution server 1006 to the authentication processing unit 1037.

The authentication processing unit 1037 temporarily stores the service session ID information and the like having the extended validity period and received from the radio broadcast information distribution server 1006, into the authentication information storage unit 1038, by overwriting the service session ID information and the like before extension of the validity period, under control from the control unit 1023, thereby to update the contents of the service session ID information and the like already stored temporarily in the authentication information storage unit 1038.

In addition, the page information generation unit 1036 generates video data based on the on-air list information supplied from the control unit 1023, converts the generated video data into analog video signals by the display control unit 1024, and sends the signals to the display unit 1025, thereby to display the video data as a video based on the analog video signals on the display unit 1025.

Thus, the client terminal 1002 allows users to obtain desired on-air list information, with use of the radio broadcast information distribution service provided by the radio broadcast information distribution server 1006.

(1-7-3-4) Now-On-Air Information Distribution Service Providing Processing Procedure Next, with reference to FIG. 25, a description will be made of the procedure of processing of providing the radio broadcast information distribution service when the client terminal 1002 receives particularly a now-on-air information distribution service as the radio broadcast information distribution service from the radio broadcast information distribution server 1006.

The radio broadcast information distribution server 1006 which provides now-on-air information is provided for every radio station (or call sign).

In some cases, the client terminal 1002 does not store URL information of radio broadcast information distribution servers 1006 corresponding to radio stations, in its initial state.

Therefore, the processing procedure of providing the radio broadcast information distribution service will be described below with reference to an example in which the URL information of the radio broadcast information distribution servers 1006 are managed respectively for call signs of radio stations, by the portal server 1003.

This radio broadcast information distribution service providing processing procedure supposes a case that authentication session ID information or the like is not stored temporarily in the authentication information storage unit 1038 when the client terminal 1002 requests frequency information indicative of a broadcast frequency to the portal server 1003 in order to automatically presets the broadcast frequency for every radio station. Therefore, the client terminal 1002 transmits, at first, user ID information, password information, and the like to the portal server 1003.

In step SP1070, when an operation command requesting automatic presetting of the broadcast frequencies of radio stations is inputted from the input processing unit 1021, the control unit 1023 of the client terminal 1002 transmits a frequency information request signal which requests frequency information concerning receivable broadcast frequencies of respective radio stations, together with an area code inputted by the user and user ID information, password information, and the like stored in the authentication information storage unit 1038, to the portal server 1003 continuously through the communication control unit 1032 and network interface 1033, in response to the inputted operation command.

In step SP1071, the control unit 1050 of the portal server 1003 receives the frequency information request signal, area code, user ID information, password information, and the like transmitted from the client terminal 1002, continuously through the network interface 1053 and communication control unit 1052, and sends the user ID information, password information, and the like received from the client terminal 1002, to the authentication processing unit 1056.

The authentication processing unit 1056 executes a user authentication processing by comparing the user ID information, password information, and the like received from the client terminal 1002, with customer information registered in the customer database unit 1054, under control from the control unit 1050.

As a result, if the user using the client terminal 1002 is authenticated as a valid user and the request for obtaining frequency information from the client terminal 1002 is determined to be a valid request, the authentication processing unit 1056 issues authentication session ID information and the like with respect to the communication connection state at present between the client terminal 1002 and the portal server 1003, and temporarily stores the issued authentication session ID information and the like into the authentication information storage unit 1057, under control from the control unit 1050.

If the user is authenticated as a valid user by the authentication processing unit 1056, the control unit 1050 goes to the next step SP1072.

In step SP1072, based on the area code received from the client terminal 1002, the control unit 1050 searches for, lists up, and reads frequency information, radio station names, and call signs corresponding to the area code from the list of plural frequency information, radio station names, and call signs in the frequency information storage unit 1058.

The control unit 1050 hence transmits the frequency information, radio station names, and call signs listed up and read from the frequency information storage unit 1058, together with the authentication session ID information and the like issued to the client terminal 1002 by the authentication processing unit 1056 in the foregoing step SP1071, to the client terminal 1002 continuously through the communication control unit 1052 and network interface 1053.

In step SP1073, the control unit 1023 of the client terminal 1002 receives the list of frequency information, radio station names, and call signs and the authentication session ID information and the like transmitted from the portal server 1003, continuously through the network interface 1033 and communication control unit 1032, and sends the authentication session ID information and the like received from the portal server 1003 to the authentication processing unit 1037 as well as the list of frequency information, radio station names, and call signs to the display control unit 1024.

The authentication processing unit 1037 hence temporarily stores the authentication session ID information and the like received from the portal server 1003, into the authentication information storage unit 1038, under control from the control unit 1023.

The display control unit 1024 sends the list of frequency information, radio station names, and call signs supplied from the control unit 1023, to the display unit 1025, thereby to display the list on the display unit 1025.

Further, the control unit 1023 stores the frequency information, radio station name, and call sign which are selected on the basis of a select command inputted from the input processing unit 1021 at this time, as preset items, and goes to the next step SP1074.

In step SP1074, the control unit 1023 controls the tuner unit 1031 to extract radio broadcast signals of the radio broadcast broadcasted at the broadcast frequency corresponding to a tuning control command inputted from the input processing unit 1021, from the radio broadcast waves.

The tuner unit 1031 thus extracts the radio broadcast signals broadcasted at the broadcast frequency from the radio broadcast waves received by the broadcast signal reception unit 30, performs a predetermined processing such as decoding or the like on the signals, and sends audio data obtained as a result, to the audio control unit 1026.

Therefore, the audio control unit 1026 converts the audio data supplied from the tuner unit 1031 into analog audio signals and sends the analog audio signals to the loudspeaker 1027. Thus, sounds of the selected radio program can be outputted.

In step SP1075, the radio broadcast display control unit 1039 reads a call sign stored in correspondence with the frequency information indicative of the broadcast frequency according to the tuning control command described above, from the storage medium 1029, under control from the control unit 1023, and transmits the read call sign together with the authentication session ID information and the like already stored temporarily in the authentication information storage unit 1038, to the portal server 1003 continuously through the communication control unit 1032 and network interface 1033.

In step SP1076, the control unit 1050 of the portal server 1003 receives the call sign and the authentication session ID information and the like transmitted from the client terminal 1002, continuously through the network interface 1053 and communication control unit 1052, and sends the received authentication session ID information and the like to the authentication processing unit 1056.

The authentication processing unit 1056 hence executes a user authentication processing by comparing the authentication session ID information and the like received from the client terminal 1002, with the authentication session ID information and the like which has already been stored temporarily in the authentication information storage unit 1057, under control from the control unit 1050.

As a result, if the validity period of the authentication session ID information received from the client terminal 1002 has not yet expired and the user who has transmitted the call sign using the client terminal 1002 is therefore authenticated as a valid user by the authentication processing unit 1056, the control unit 1050 goes to the next step SP1077.

In step SP1077, the control unit 1050 searches for URL information linked to the call sign among plural URL information in the URL storage unit 1059, based on the call sign received from the client terminal 1002.

Also, the control unit 1050 extends the validity period of the authentication session ID information and the like issued to the client terminal 1002, by the authentication processing unit 1056.

Then, the control unit 1050 reads the URL information thus searched for, from the URL storage unit 1059, and transmits the read URL information together with the authentication session ID information and the like having the validity period extended by the authentication processing unit 1056, to the client terminal 1002 continuously through the communication control unit 1052 and network interface 1053.

In step SP1078, the control unit 1023 of the client terminal 1002 receives the URL information and the authentication session ID information and the like having the extended validity period, which have been transmitted from the portal server 1003, continuously through the network interface 1033 and communication control unit 1032, and sends the received authentication session ID information and the like to the authentication processing unit 1037 as well as the URL information to the radio broadcast display control unit 1039.

The authentication processing unit 1037 temporarily stores in the authentication information storage unit 1038 the authentication session ID information and the like having the extended validity period, which have been received from the portal server 1003, by overwriting authentication session ID information and the like before extension of the validity period, under control from the control unit 1023, thereby to update the contents of the authentication session ID information and the like already stored temporarily in the authentication information storage unit 1038.

Also, the radio broadcast display control unit 1039 temporarily stores the URL information supplied from the control unit 1023 into the storage medium 1029 or the like, with the information linked to a call sign stored also in the storage medium 1029, under control from the control unit 1023.

Further, the radio broadcast display control unit 1039 transmits a now-on-air information request signal requesting obtaining of now-on-air information, together with service session ID information and the like already received from the radio broadcast information distribution server 1006 and stored temporarily in the authentication information storage unit 1038, to the radio broadcast information distribution server 1006 continuously through the communication control unit 1032 and network interface.1033, in accordance with the URL information temporarily stored in the storage medium 1029 or the like, under control from the control unit 1023.

In this radio broadcast information distribution service providing processing procedure, the processing of transmitting the now-on-air information request signal and service session ID information and the like from the client terminal 1002 to the radio broadcast information distribution server 1006 in step SP1078 corresponds to the processing of step SP1010 which has been described with reference to FIG. 21.

Figure 21:
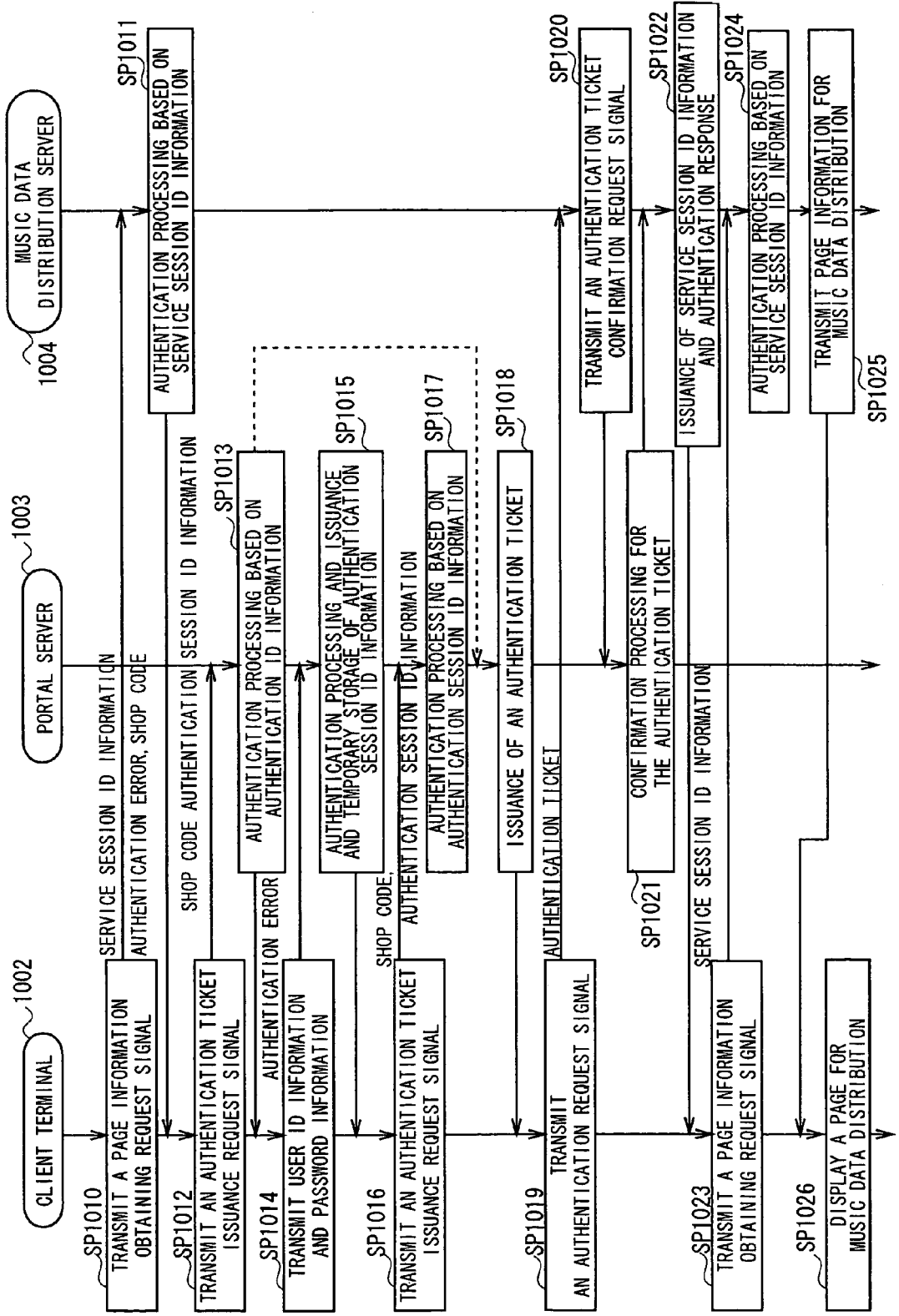
FIG. 21 is a sequence chart showing a user authentication processing procedure between the client terminal and the music data distribution server.

Therefore, in this radio broadcast information distribution service providing processing procedure, the same user authentication processings as those in steps SP1011 to SP1013 and SP1018 to SP1022 described with reference to FIG. 21 are sequentially executed in the client terminal 1002, radio broadcast information distribution server 1006, and portal server 1003, following the processing of step SP1078. Thereafter, the procedure goes to the subsequent step SP1079.

In step SP1079, the radio broadcast display control unit 1039 of the client terminal 1002 transmits again the now-on-air information request signal together with service session ID information and the like already received from the radio broadcast information distribution server 1006 and stored temporarily in the authentication information storage unit 1038, to the radio broadcast information distribution server 1006 continuously through the communication control unit 1032 and network interface 1033, in accordance with the URL information temporarily stored in the storage medium 1029 or the like, under control from the control unit 1023.

In step SP1080, the control unit 1110 of the radio broadcast information distribution server 1006 receives the now-on-air information request signal and the service session ID information and the like transmitted from the client terminal 1002, continuously through the network interface 1113 and communication control unit 1112, and sends the received authentication session ID information and the like to the authentication processing unit 1115.

The authentication processing unit 1115 hence executes a user authentication processing by comparing the service session ID information and the like received from the client terminal 1002, with the service session ID information and the like which has already been stored temporarily in the authentication information storage unit 1120, under control from the control unit 1110.

As a result, if the user using the client terminal 1002 is authenticated as a valid user, the authentication processing unit 1115 determines that the request for obtaining now-on-air information from the client terminal 1002 is a valid request.

Further, as the user using the client terminal 1002 is authenticated as a valid user by the authentication processing unit 1115, the control unit 1110 extends the validity period of the service session ID information and the like issued to the client terminal 1002, by the authentication processing unit 1115, and goes to the next step SP1081.

In step SP1081, the control unit 1110 reads now-on-air information from the now-on-air information storage unit 1119, and transmits the now-on-air information thus read, together with the service session ID information and the like having the validity period extended by the authentication processing unit 1115, to the client terminal 1002 continuously through the communication control unit 1112 and network interface 1113.

In step SP1082, the control unit 1023 of the client terminal 1002 receives the now-on-air information transmitted from the radio broadcast information distribution server 1006 and the service session ID information and the like having the extended validity period, continuously through the network interface 1033 and the communication control unit 1032, and sends the received service session ID information and the like to the authentication processing unit 1037 as well as the now-on-air information to the radio broadcast display control unit 1039.

The authentication processing unit 1037 temporarily stores the service session ID information and the like having the extended validity period and received from the radio broadcast information distribution server 1006, into the authentication information storage unit 1038, by overwriting the service session ID information and the like before extension of the validity period, under control from the control unit 1023, thereby to update the service session ID information and the like already stored temporarily in the authentication information storage unit 1038.

Also, the radio broadcast display control unit 1039 sends the now-on-air information supplied from the control unit 1023 to the display unit 1025 through the display control unit 1024, thereby to display the now-on-air information concerning the radio program of the radio broadcast being received at present, on the display unit 1025.

Thereafter, in this radio broadcast information distribution service providing procedure, the client terminal 1002 periodically and repeatedly executes the request for obtaining now-on-air information in step SP1079, and the radio broadcast information distribution server 1006 receives the request from the client terminal 1002 and executes the processings of step SP1080 and SP1081 sequentially.

In this manner, the client terminal 1002 can display the program name of the radio program being received at present, the start time of broadcast of the program, the end time of broadcast of the program, the title and artist name of the song being broadcasted currently in the radio program, the start time of broadcast of the song, and the like, as now-on-air information being updated moment by moment, on the display unit 1025 of the client terminal 1002.

Of the program modules described with reference to FIG. 6, the HTTP message program 111 and the communicator program 112 are program modules capable of realizing the same functions as those of the communication control unit 1032 of the client terminal 1002 described previously with reference to FIG. 14.

The content reproducing module 113 is a program module capable of realizing the same functions as those of the encoder/decoder unit 1034 of the client terminal 1002 described previously with reference to FIG. 14.

Further, the copyright protect information management unit 114 is a program module capable of realizing the same functions as those of the copyright management unit 1035 of the client terminal 1002 described previously with reference to FIG. 14.

Further, the Internet radio tuning/reproducing module 118 is a program module capable of realizing the same functions as those of the control unit 1023 and audio control unit 1026 of the client terminal 1002 described previously with reference to FIG. 14.

Further, the song purchase/reproducing module 119 is a program module capable of realizing the same functions as those of the control unit 1023 and audio control unit 1026 of the client terminal 1002 described previously with reference to FIG. 14.

Further, the XML browser 151 is a program module capable of realizing the same functions as those of the input processing unit 1021 and page information generation unit 1036 of the client terminal 1002 described previously with reference to FIG. 14.

Further, the hard disc content controller 117, database access module 115, and content data access module 116 are program modules capable of realizing the same functions as those of the control unit 1023 of the client terminal 1002 described previously with reference to FIG. 14.

Further, the authentication library 131 of the library 130 is a program module capable of realizing the same functions as those of the authentication processing unit 1037 and authentication information storage unit 1038 of the client terminal 1002 described previously with reference to FIG. 14.

Further, the clip library 132 of the library 130 is a program module capable of realizing the same functions as those of the control unit 1023 of the client terminal 1002 described previously with reference to FIG. 14.

Further, the related-information display module 120 is a program module capable of realizing the same functions as those of the radio broadcast display control unit 1039 of the client terminal 1002 described previously with reference to FIG. 14.

Further, the tuner tuning/reproducing/recording module 121 is a program module capable of realizing the same functions as those of the control unit 1023, audio control unit 1026, and tuner unit 1031 of the client terminal 1002 described previously with reference to FIG. 14.

Further, the audio user interface 152 is a program module capable of realizing the same functions as those of the input processing unit 1021, control unit 1023, and display control unit 1024 of the client terminal 1002 described previously with reference to FIG. 14.

Further, the CD playback module 141 is a program module capable of realizing the same functions as those of the audio control unit 1026 and external recording medium recording/reproducing unit 1028 of the client terminal 1002 described previously with reference to FIG. 14.

Further, the HDD reproducing module 142 is a program module capable of realizing the same functions as those of the control unit 1023 and audio control unit 1026 of the client terminal 1002 described previously with reference to FIG. 14.

Figure 16:
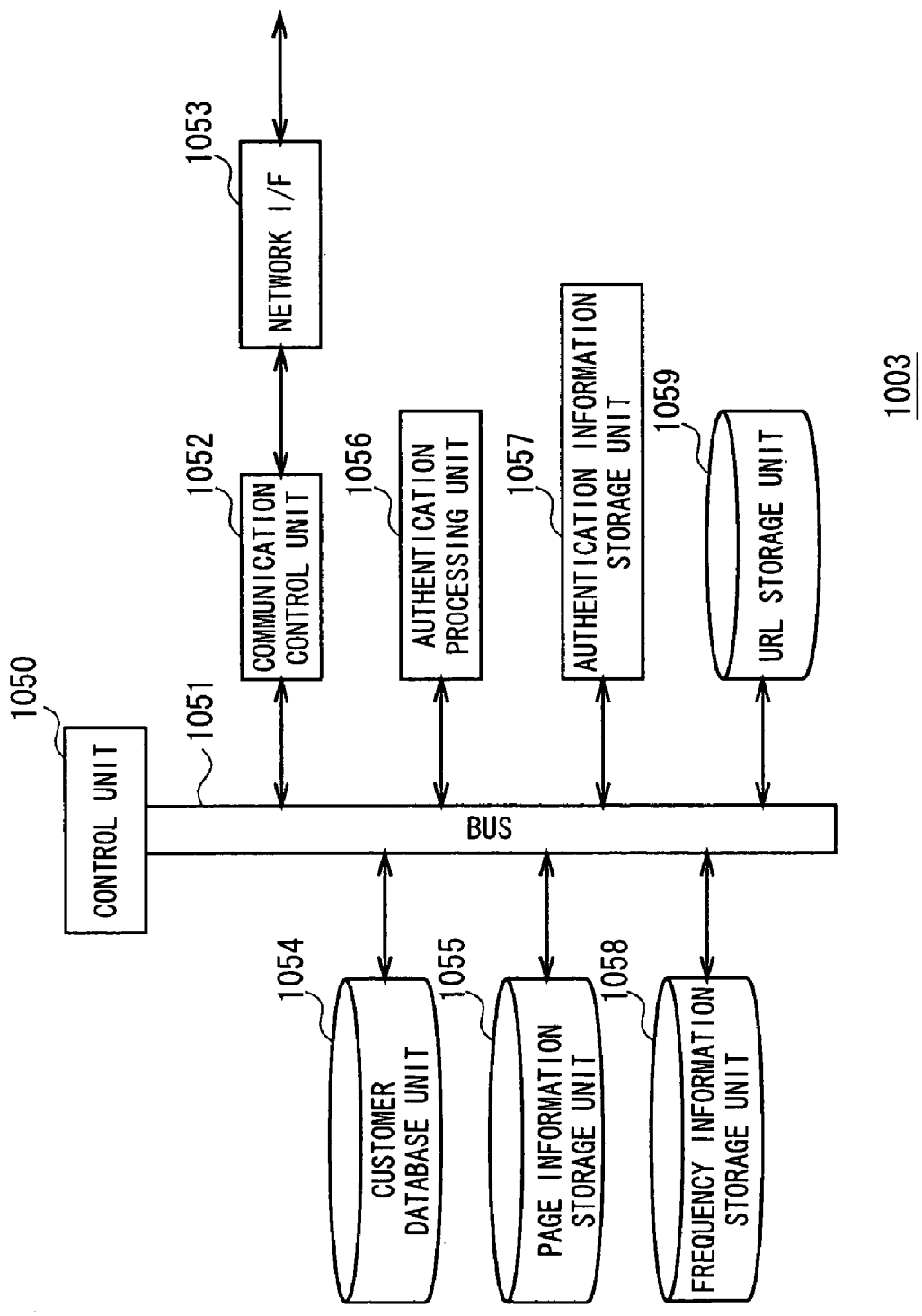
FIG. 16 is a block diagram showing the hardware configuration of function circuit blocks of a portal server.

The total service server 36 described with reference to FIG. 3 is configured such that the CPU 36a controls respective circuit units in accordance with various programs stored in the hard disc drive 36c and the like, thereby to realize the same functions as those of the communication control unit 1052, the authentication processing unit 1056, and the like of the portal server 1003 (FIG. 16). The hard disc drive 36c of the total service server 36 is configured to realize the same functions as those of the authentication information storage unit 1057, URL storage unit 1059, frequency information storage unit 1058, page information storage unit 1055, customer database unit 1054, and the like of the portal server 1003, under control from the CPU 36a.

The embodiment described above has been described with reference to a case where the client terminal 1002 (the reproducing apparatus 1 and terminal device 10) receives a broadcast signal corresponding to a frequency (reception frequency) selected by a user operation or the like, among plural kinds of broadcast signals outputted from radio stations. However, the embodiment is not limited hitherto. The present invention may be applied to such a case that based on the URL of an internet radio server selected by a user's operation or the like, the client terminal 1002 (the reproducing apparatus 1 and terminal device 10) receives radio program data from the internet radio server.

Also, radio broadcasts broadcasted from radio stations which the client terminal 1002 can receive are applied to the present embodiment. However, the present invention is not limited hitherto. The present invention may be configured such that the client terminal 1002 receives internet radio broadcast or satellite radio broadcast and obtains related information and radio broadcast information thereof. Alternatively, the client terminal 1002 may receive television broadcast broadcasted from television broadcast stations and may obtain various broadcast information and the like concerning television programs of the television broadcast from a server on the network NT1000.

Also, the above embodiment has been described with reference to a case where hardware circuit blocks, function circuit blocks, and program modules (FIG. 6) are mounted on the client terminal 1002 (the reproducing apparatus 1 and terminal device 10). The present invention is not limited hitherto but may be configured such that these blocks and modules are mounted on various terminals such as a cellular phone, personal computer, or the like other then the client terminal 1002. Any terminal on which these hardware circuit blocks, function circuit blocks, and program modules are mounted can realize the same processings as the client terminal 1002 described above.

Further, the above embodiment has been described with reference to a case where setting information includes area information (a postal code or the like) indicative of the area where, for example, the reproducing apparatus 1 is installed. In place of this area information, the setting information may include user identification information assigned uniquely to the user of the reproducing apparatus 1. Alternatively, the setting information may include device identification information assigned uniquely to the reproducing apparatus 1.

A description will now be made of a case where, for example, the reproducing apparatus 1 transmits the setting information including user identification information to the broadcast station specify server 2. There is a precondition that the broadcast station specify server 2 stores user identification information, and broadcast station information (broadcast station names, broadcast station identification information, broadcast frequencies, and the like) concerning broadcasts which the reproducing apparatus 1 of the user corresponding to the user identification information can receive, in a database of the server 2 itself, with the user identification information linked to the broadcast station information. Upon receipt of user identification information from the reproducing apparatus 1, the broadcast station specify server 2 searches the database to obtain broadcast station information corresponding to the received user identification information, and transmits list information including the obtained broadcast station information to the reproducing apparatus 1.

Next, a description will be made of a case where the reproducing apparatus 1 transmits the setting information including device identification information to the broadcast station specify server 2. There is a precondition that the broadcast station specify server 2 stores device identification information and broadcast station information (broadcast station names, broadcast station identification information, broadcast frequencies, and the like) concerning broadcasts which the reproducing apparatus 1 corresponding to the device identification information can receive, in a database of the server 2 itself, with the device identification information linked to the broadcast station information. Upon receipt of device identification information from the reproducing apparatus 1, the broadcast station specify server 2 searches the database to obtain broadcast station information corresponding to the received device identification information, and transmits list information including the obtained broadcast station information to the reproducing apparatus 1.

INDUSTRIAL APPLICABILITY

The present invention is applicable to a reproducing apparatus or the like capable of receiving, for example, a broadcast signal selected by calling a reception frequency which has been set in advance and reproducing the broadcast signal.

The invention claimed is:

1. A reproducing apparatus capable of receiving and reproducing a broadcast signal selected by calling a reception frequency set in advance, comprising:
broadcast signal reception means for receiving a broadcast signal of a specific frequency;
broadcast signal reproducing means for reproducing the broadcast signal received by the broadcast signal reception means;
setting information transmission means for transmitting setting information concerning broadcast reception of the reproducing apparatus itself and set by a user, to an external device, the setting information including area information indicative of an area where the reproducing apparatus receives broadcasts;
list information reception means for receiving list information detected by the external device, as a list including broadcast station names of receivable broadcast stations corresponding to the setting information, broadcast station identification information of the stations, and frequencies of the stations;
display means for displaying the names of the broadcast stations included in the list information received by the list information reception means; and
recording means for recording parts of the received list information onto a recording medium, based on the user'input, with the parts linked to each other.

2. The reproducing apparatus according to claim 1, further comprising frequency specify means for varying the reception frequency of the broadcast signal reception means to specify a frequency at which the broadcast signal is received,
wherein the recording means records such a frequency that agrees with any of the frequencies included in the list information received by the list information reception means, among frequencies specified by the frequency specify means, and at least a broadcast station name and broadcast station identification information in the list information, onto the recording medium, with the frequency, broadcast station name, and broadcast station identification information automatically linked to each other.

3. The reproducing apparatus according to claim 2, wherein the recording means further records remaining frequencies that disagree with the frequencies in the list information received by the list information reception means, among the frequencies specified by the frequency specify means, and at least remaining broadcast station names and remaining broadcast station identification information in the list information, onto the recording medium, with the remaining frequencies, the remaining broadcast station names, and the remaining broadcast station identification information linked to each other based on the user'input.

4. The reproducing apparatus according to claim 3, further comprising request information transmission means for transmitting request information requesting the list information including information concerning another broadcast station than those corresponding to the setting information, in response to the user'operation, after receipt of the list information by the list information reception means,
wherein the list information reception means receives the list information transmitted from the external device in response to the request information,
the display means displays broadcast station names included in the list information corresponding to the request information, and
the recording means records parts of the list information corresponding to the request information onto the recording medium, based on the user'input, with the parts linked to each other.

5. The reproducing apparatus according to claim 1, wherein the setting information has been inputted in advance by the user and recorded.

6. The reproducing apparatus according to claim 1, wherein the setting information is inputted by the user immediately before being transmitted by the transmission means.

7. The reproducing apparatus according to claim 1, further comprising:
identification information transmission means for transmitting the broadcast station identification information included in the list information recorded by the recording means, to the external device; and
position information reception means for receiving, from the external device, position information indicative of a position of a provider on a network, which provides related information related to broadcast contents of broadcast stations corresponding to the broadcast station identification information transmitted from the identification information transmission means.

8. An information setting method of setting a reception frequency in advance in a reproducing apparatus which receives and reproduces a broadcast signal, the method comprising:
a setting information transmission step of transmitting setting information concerning broadcast reception of the reproducing apparatus itself and set by a user, to an external device, the setting information including area information indicative of an area where the reproducing apparatus receives broadcasts;
a list information reception step of receiving list information detected by the external device, as a list including broadcast station names of receivable broadcast stations corresponding to the setting information, broadcast station identification information of the stations, and frequencies of the stations;

a display step of displaying the names of the broadcast stations included in the received list information; and a recording step of recording parts of the received list information onto a recording medium, based on the user'input, with the parts linked to each other.

9. The information setting method according to claim 8, further comprising a frequency specify step of varying the frequency to be received, to specify a frequency at which a broadcast signal is received, before the recording step, wherein in the recording step, such a frequency that agrees with any of the frequencies included in the list information received in the list information reception step, among frequencies specified in the frequency specify step, and at least a broadcast station name and broadcast station identification information in the list information, onto the recording medium, with the frequency, broadcast station name, and broadcast station identification information automatically linked to each other.

10. The information setting method according to claim 9, wherein in the recording step, remaining frequencies that disagree with the frequencies in the list information received in the list information reception step, among the frequencies specified in the frequency specify step, and at least remaining broadcast station names and remaining broadcast station identification information in the list information are further recorded onto the recording medium, with the remaining frequencies, the remaining broadcast station names, and the remaining broadcast station identification information linked to each other based on the user'input.

11. The information setting method according to claim 10, further comprising an unreceived-information request step of requesting the external device to transmit the list information including information concerning another broadcast station than those corresponding to the setting information, after the recording step, wherein the list information reception step, the display step, and the recording step are further executed with use of the list information transmitted from the external device in response to the unreceived-information request step.

12. A communication method for a reproducing apparatus which receives and reproduces a broadcast signal, comprising:

transmitting from the reproducing apparatus setting information concerning broadcast reception of the reproducing apparatus itself, together with user ID and a password, to a portal server, the setting information including area information indicative of an area where the reproducing apparatus receives broadcasts;

the portal server which issues an authentication ticket to allow the reproducing apparatus to access plural service servers performing an authentication processing, based on the user ID and the password, and transmitting list information as a list including broadcast station names of receivable broadcast stations corresponding to the setting information, broadcast station identification information of the stations, and frequencies of the stations, when allowing authentication; and the reproducing apparatus displaying the broadcast station names included in the received list information, and recording parts of the received list information, onto a recording medium, based on an input, with the parts linked to each other.

13. A computer-readable recording medium for storing therein an information setting program that includes instructions for making a computer execute a process of setting a reception frequency of a broadcast signal, the process comprising:

a setting information transmission step of transmitting setting information concerning broadcast reception of a reproducing apparatus itself and set by a user, to an external device, the setting information including area information indicative of an area where the reproducing apparatus receives broadcasts;

a list information reception step of receiving list information as a list including broadcast station names, broadcast station identification information, and frequencies of receivable broadcast stations corresponding to the setting information;

a display step of displaying the broadcast station names in the received list information; and a recording step of recording parts of the received list information onto a recording medium, based on the user'input, with the parts linked to each other.

14. A reproducing apparatus capable of receiving and reproducing a broadcast signal selected by calling a reception frequency set in advance, comprising:

a broadcast signal reception unit configured to receive a broadcast signal of a specific frequency;

a broadcast signal reproducing unit configured to reproduce the broadcast signal received by the broadcast signal reception unit;

a setting information transmission unit configured to transmit setting information concerning broadcast reception of the reproducing apparatus itself and set by a user, to an external device, the setting information including area information indicative of an area where the reproducing apparatus receives broadcasts;

a list information reception unit configured to receive list information detected by the external device, as a list including broadcast station names of receivable broadcast stations corresponding to the setting information, broadcast station identification information of the stations, and frequencies of the stations;

a display unit configured to display the names of the broadcast stations included in the list information received by the list information reception unit; and a recording unit configured to record parts of the received list information onto a recording medium, based on the user'input, with the parts linked to each other.

* * * * *

UNITED STATES PATENT AND TRADEMARK OFFICE
CERTIFICATE OF CORRECTION

| | | |
|---|---|---|
| PATENT NO. | : 7,373,122 B2 | |
| APPLICATION NO. | : 10/564062 | |
| DATED | : May 13, 2008 | |
| INVENTOR(S) | : Hiroyuki Kikkoji et al. | |

It is certified that error appears in the above-identified patent and that said Letters Patent is hereby corrected as shown below:

Column 14, line 42, change "extensible" to read --eXtensible--.

Column 24, line 57, change "extensible" to read --eXtensible--.

Column 57, Claim 1, line 55, change "user'" to read --user's--.

Column 58, Claim 3, line 15, change "user'" to read --user's--.

Claim 4, line 31, change "user'" to read --user's--.

Column 59, Claim 8, line 7, change "user'" to read --user's--.

Claim 10, line 32, change "user'" to read --user's--.

Column 60, Claim 13, line 29, change "user'" to read --user's--.

Claim 14, line 56, change "user'" to read --user's--.

Signed and Sealed this

Twenty-third Day of December, 2008

JON W. DUDAS
*Director of the United States Patent and Trademark Office*